United States Patent
Zarandioon et al.

(10) Patent No.: US 10,713,589 B1
(45) Date of Patent: Jul. 14, 2020

(54) CONSISTENT SORT-BASED RECORD-LEVEL SHUFFLING OF MACHINE LEARNING DATA

(71) Applicant: Amazon Technologies, Inc., Seattle, WA (US)

(72) Inventors: Saman Zarandioon, Seattle, WA (US); Nicolle M. Correa, Seattle, WA (US); Leo Parker Dirac, Seattle, WA (US); Aleksandr Mikhaylovich Ingerman, Seattle, WA (US); Steven Andrew Loeppky, Seattle, WA (US); Robert Matthias Steele, Seattle, WA (US); Tianming Zheng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 15/060,439

(22) Filed: Mar. 3, 2016

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 4,821,333 A | 4/1989 | Gillies | |
| 7,743,003 B1 | 6/2010 | Tong et al. | |
| 7,814,078 B1 * | 10/2010 | Forman | G06F 17/30486 707/698 |
| 8,078,556 B2 | 12/2011 | Adi et al. | |
| 8,209,271 B1 * | 6/2012 | Lin | G06N 99/005 706/12 |
| 8,229,864 B1 | 7/2012 | Lin et al. | |
| 8,370,280 B1 | 2/2013 | Lin et al. | |
| 8,429,103 B1 | 4/2013 | Aradhye et al. | |
| 8,606,730 B1 | 12/2013 | Tong et al. | |
| 8,682,814 B2 | 3/2014 | DiCorpo et al. | |
| 9,235,813 B1 * | 1/2016 | Qian | G06N 99/005 |
| 10,366,053 B1 * | 7/2019 | Zheng | G06N 20/00 |
| 2004/0220975 A1 * | 11/2004 | Carpentier | G06F 17/30097 |
| 2005/0105712 A1 | 5/2005 | Williams et al. | |
| 2006/0179016 A1 | 8/2006 | Forman et al. | |

(Continued)

FOREIGN PATENT DOCUMENTS

| | | |
|---|---|---|
| JP | 2009282577 | 12/2009 |
| WO | 2012151198 | 11/2012 |

OTHER PUBLICATIONS

Bottou, Large-Scale Machine Learning With Stochastic Gradient Descent, COMPSTAT (2010) at p. 177-186 (Year: 2010).*

(Continued)

*Primary Examiner* — Kamran Afshar
*Assistant Examiner* — Benjamin J Buss
(74) *Attorney, Agent, or Firm* — Robert C. Kowert; Kowert, Hood, Munyon, Rankin & Goetzel, P.C.

(57) ABSTRACT

A determination that a machine learning data set is to be shuffled is made. Tokens corresponding to the individual observation records are generated based on respective identifiers of the records' storage objects and record key values. Respective representative values are derived from the tokens. The observation records are rearranged based on a result of sorting the representative values and provided to a shuffle result destination.

21 Claims, 38 Drawing Sheets

(56) References Cited

U.S. PATENT DOCUMENTS

| | | | |
|---|---|---|---|
| 2009/0019524 A1* | 1/2009 | Fowler | H04L 9/3265 726/3 |
| 2011/0185230 A1 | 7/2011 | Agrawal et al. | |
| 2011/0313953 A1 | 12/2011 | Lane et al. | |
| 2012/0054658 A1 | 3/2012 | Chuat et al. | |
| 2012/0191631 A1 | 7/2012 | Breckenridge et al. | |
| 2012/0253927 A1 | 10/2012 | Qin et al. | |
| 2013/0217333 A1* | 8/2013 | Sprigg | H04W 4/80 455/41.2 |
| 2014/0046879 A1 | 2/2014 | Maclennan et al. | |
| 2015/0113538 A1* | 4/2015 | Giroux | G06F 9/5011 718/104 |
| 2015/0220583 A1* | 8/2015 | Teletia | G06F 17/30336 707/696 |
| 2015/0279072 A1* | 10/2015 | Black | G06T 11/60 382/109 |
| 2015/0379072 A1* | 12/2015 | Dirac | G06N 20/00 707/693 |
| 2015/0379425 A1* | 12/2015 | Dirac | G06N 20/00 706/12 |
| 2015/0379426 A1* | 12/2015 | Steele | G06N 20/00 706/12 |
| 2015/0379427 A1* | 12/2015 | Dirac | G06N 20/00 706/12 |
| 2015/0379428 A1* | 12/2015 | Dirac | G06N 20/00 706/12 |
| 2015/0379430 A1* | 12/2015 | Dirac | G06N 20/00 706/12 |
| 2015/0379729 A1* | 12/2015 | Datta | G06T 7/251 382/103 |
| 2016/0110176 A1* | 4/2016 | Fink | G06F 8/443 717/137 |

OTHER PUBLICATIONS

Sanders, Random Permutations on Distributed, External and Hierarchical Memory, Information Processing Letters vol. 67 at p. 305-309 (1998) (Year: 1998).*
Tran et al., Scaling Up Stochastic Dual Coordinate Ascent, SIGKDD Int'l Conference on Knowledge Discovery and Data Mining at p. 1185-1194 (Aug. 2015) (Year: 2015).*
Wikipedia, "Multilayer perception", Retrieved from URL: https://en.wikipedia.org/wiki/Multilayer_perceptron on Jan. 21, 2016, pp. 1-5.
Spark, "Spark Programming Guide—Spark 1.2.0 Documentation", Retrieved from URL: https://spark.apache.org/docs/1.2.0/programmingguide.html on Jan. 15, 2016, pp. 1-18.
Wikipedia, "Stochastic gradient descent", Retrieved from URL: https://en.wikipedia.org/wiki/Stochastic_gradient_descent on Jan. 21, 2016, pp. 1-9.
International Search Report and Written Opinion from PCT/US2015/038610, dated Sep. 25, 2015, Amazon Technologies, Inc., pp. 1-12.
Kolo, B., "Binary and Multiclass Classification, Passage", Binary and Multiclass Classification, XP002744526, Aug. 12, 2010, pp. 78-80.
Gamma, E., et al., "Design Patterns, Passage", XP002286644, Jan. 1, 1995, pp. 293-294; 297, 300-301.
International Search Report and Written Opinion from PCT/US2015/038589, dated Sep. 23, 2015, Amazon Technologies, Inc., pp. 1-12.
"API Reference", Google Prediction API, Jun. 12, 2013, 1 Page.
"Google Prediction API", Google developers, Jun. 9, 2014, 1 Page.
"Amazon Machine Learning API Reference", Amazon Web Services, Dec. 12, 2012, pp. 1-124.
"Amazon Machine Learning Developer Guide", Amazon Web Services, Aug. 27, 2015, pp. 1-128.

* cited by examiner

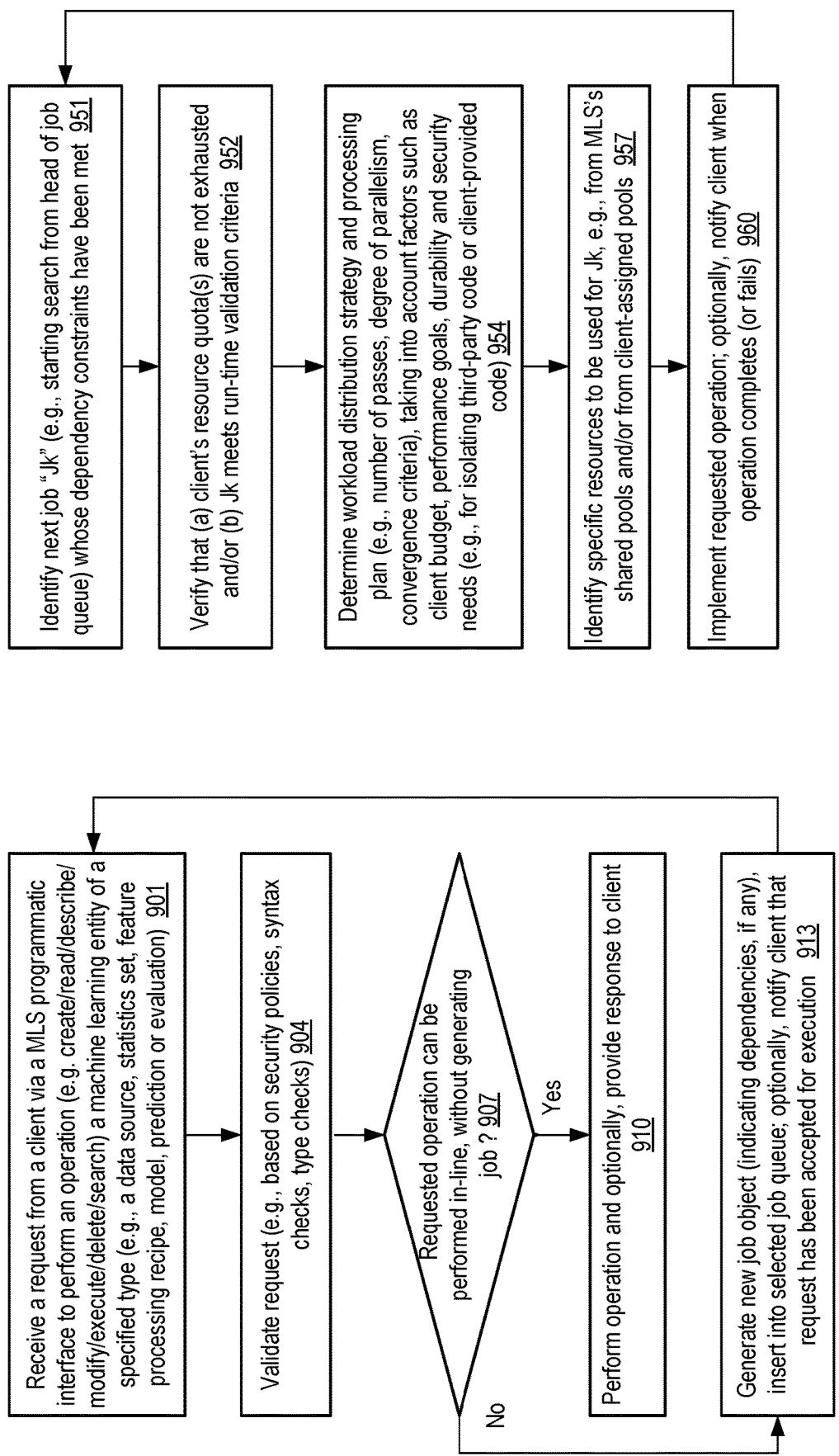

```
grammar MLS-Recipe;
expr
    : BAREID
    | QUOTEDID
    | NUMBER
    | functioncall
    ;

functioncall
    : BAREID '('
              functionparams?
      ')'
    ;

functionparams
    : expr ( ',' expr )*
    ;

BAREID : [A-Za-z][a-zA-Z0-9_]* ;
QUOTEDID : '\'' ('\\\''|'\\'|.)*? '\'' ;
NUMBER
    : '-'? INT '.' INT EXP?  // 1.35, 1.35E-9, 0.3, -4.5
    | '-'? INT EXP           // 1e10 -3e4
    | '-'? INT               // -3, 45
    ;

fragment INT : '0' | [1-9] [0-9]* ;  // no leading zeros
fragment EXP : [Ee] [+\-]? INT ;
WHITESPACE : [ \t\r\n]+ -> skip ;    // skip spaces, tabs, newlines
COMMENT : '//' (~[\r\n])* -> skip ;
```

Grammar 1320 for recipe expressions

*FIG. 13*

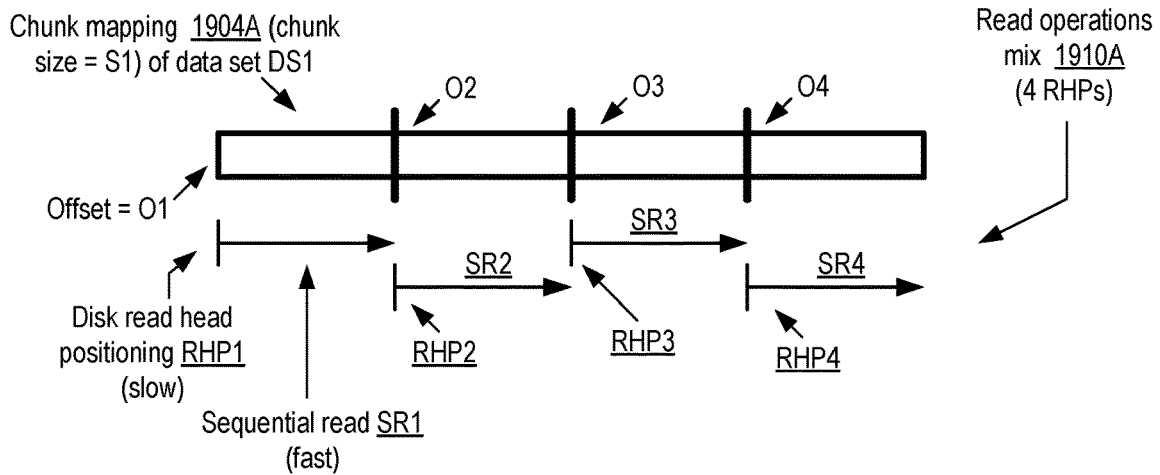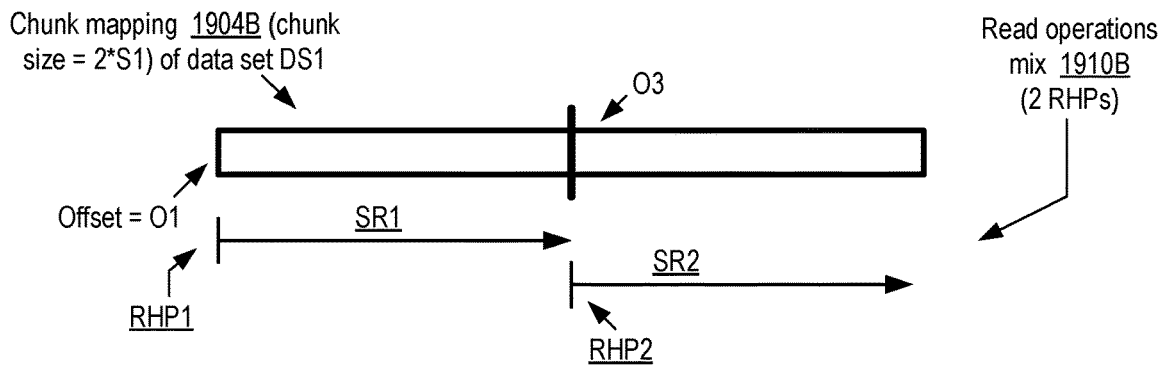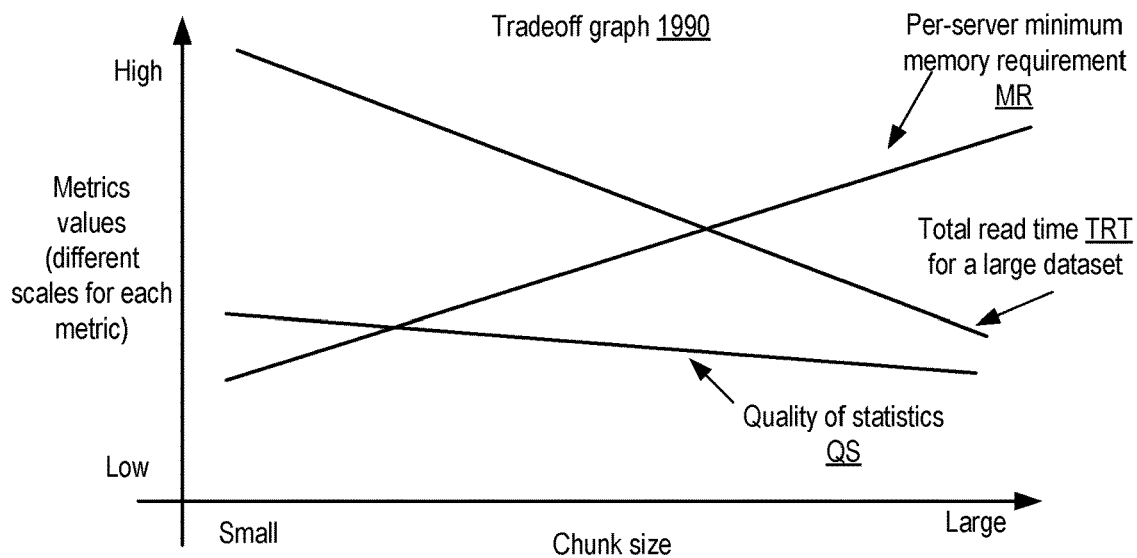
FIG. 19

CONSISTENT SORT-BASED RECORD-LEVEL SHUFFLING OF MACHINE LEARNING DATA

BACKGROUND

Machine learning combines techniques from statistics and artificial intelligence to create algorithms that can learn from empirical data and generalize to solve problems in various domains such as natural language processing, financial fraud detection, terrorism threat level detection, human health diagnosis and the like. In recent years, more and more raw data that can potentially be utilized for machine learning models is being collected from a large variety of sources, such as sensors of various kinds, web server logs, social media services, financial transaction records, security cameras, and the like.

Traditionally, expertise in statistics and in artificial intelligence has been a prerequisite for developing and using machine learning models. For many business analysts and even for highly qualified subject matter experts, the difficulty of acquiring such expertise is sometimes too high a barrier to be able to take full advantage of the large amounts of data potentially available to make improved business predictions and decisions. Furthermore, many machine learning techniques can be computationally intensive, and in at least some cases it can be hard to predict exactly how much computing power may be required for various phases of the techniques. Given such unpredictability, it may not always be advisable or viable for business organizations to build out their own machine learning computational facilities.

The quality of the results obtained from machine learning algorithms may depend on how well the empirical data used for training the models captures key relationships among different variables represented in the data, and on how effectively and efficiently these relationships can be identified. Depending on the nature of the problem that is to be solved using machine learning, very large data sets may have to be analyzed in order to be able to make accurate predictions, especially predictions of relatively infrequent but significant events. For example, in financial fraud detection applications, where the number of fraudulent transactions is typically a very small fraction of the total number of transactions, identifying factors that can be used to label a transaction as fraudulent may potentially require analysis of millions of transaction records, each representing dozens or even hundreds of variables. For some types of machine learning algorithms, observation records may have to be analyzed in random order (e.g., in an effort to ensure that records examined in close temporal proximity are not strongly correlated with one another) to achieve the best results. Imposing such randomness in a consistent manner without excessive I/O overhead may present a non-trivial challenge for some large data sets.

BRIEF DESCRIPTION OF DRAWINGS

FIGS. 9a and 9b are flow diagrams illustrating aspects of operations that may be performed at a machine learning service that supports asynchronous scheduling of machine learning jobs, according to at least some embodiments.

FIG. 13 illustrates an example grammar that may be used to define recipe syntax, according to at least some embodiments.

FIG. 19 illustrates tradeoffs associated with varying the chunk size used for filtering operation sequences on machine learning data sets, according to at least some embodiments.

Figure 1:
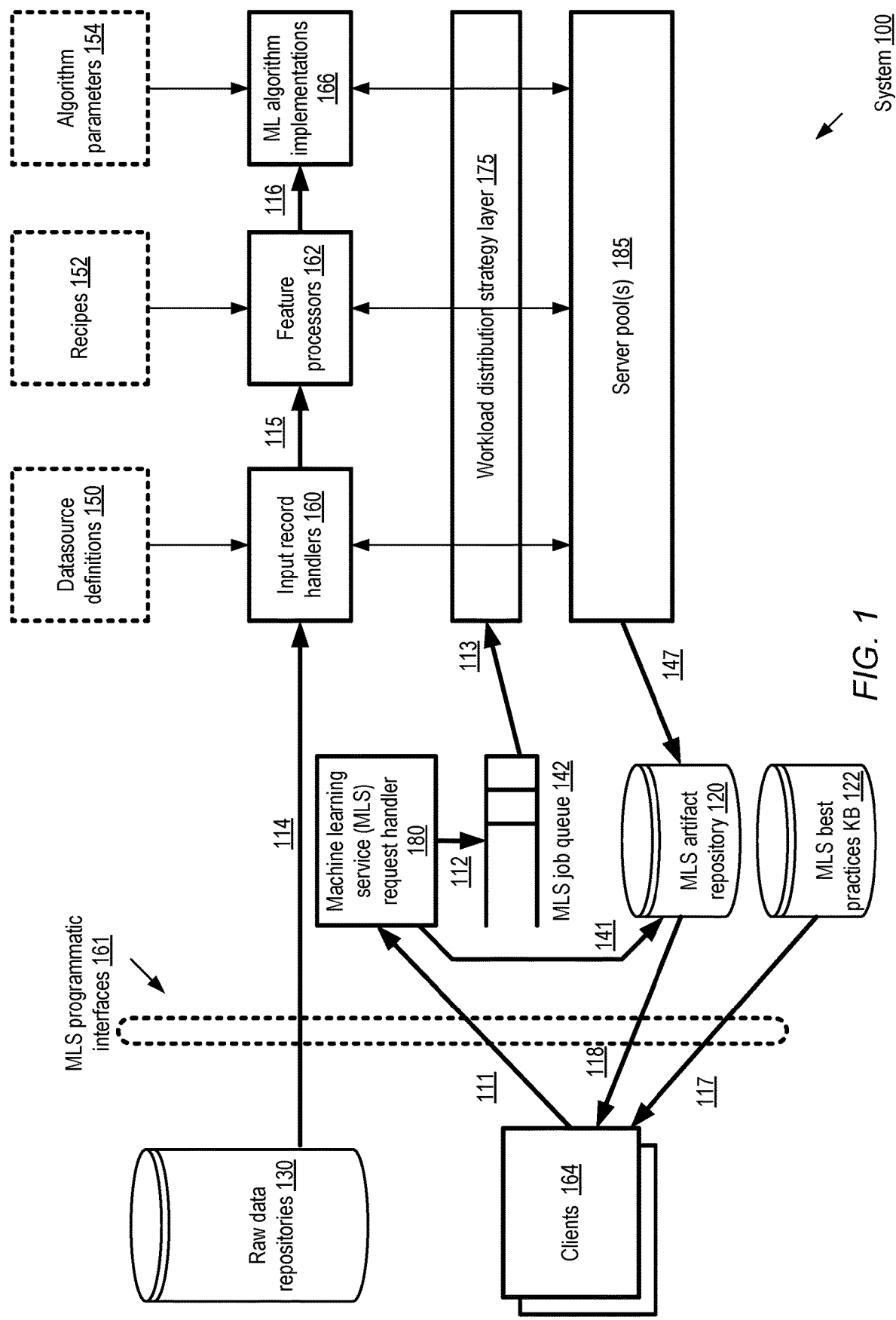
FIG. 1 illustrates an example system environment in which various components of a machine learning service may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for a customizable, easy-to-use machine learning service (MLS) designed to support large numbers of users and a wide variety of algorithms and problem sizes are described. In one embodiment, a number of MLS programmatic interfaces (such as application programming interfaces (APIs)) may be defined by the service, which guide non-expert users to start using machine learning best practices relatively quickly, without the users having to expend a lot of time and effort on tuning models, or on learning advanced statistics or artificial intelligence techniques. The interfaces may, for example, allow non-experts to rely on default settings or parameters for various aspects of the procedures used for building, training and using machine learning models, where the defaults are derived from the accumulated experience of other practitioners addressing similar types of machine learning problems. At the same time, expert users may customize the parameters or settings they wish to use for various types of machine learning tasks, such as input record handling, feature processing, model building, execution and evaluation. In at least some embodiments, in addition to or instead of using pre-defined libraries implementing various types of machine learning tasks, MLS clients may be able to extend the built-in capabilities of the service, e.g., by registering their own customized functions with the service. Depending on the business needs or goals of the clients that implement such customized modules or functions, the modules may in some cases be shared with other users of the service, while in other cases the use of the customized modules may be restricted to their implementers/owners.

In some embodiments, a relatively straightforward recipe language may be supported, allowing MLS users to indicate various feature processing steps that they wish to have applied on data sets. Such recipes may be specified in text format, and then compiled into executable formats that can be re-used with different data sets on different resource sets as needed. In at least some embodiments, the MLS may be implemented at a provider network that comprises numerous data centers with hundreds of thousands of computing and storage devices distributed around the world, allowing machine learning problems with terabyte-scale or petabyte-scale data sets and correspondingly large compute requirements to be addressed in a relatively transparent fashion while still ensuring high levels of isolation and security for sensitive data. Pre-existing services of the provider network, such as storage services that support arbitrarily large data objects accessible via web service interfaces, database services, virtual computing services, parallel-computing services, high-performance computing services, load-balancing services, and the like may be used for various machine learning tasks in at least some embodiments. For MLS clients that have high availability and data durability requirements, machine learning data (e.g., raw input data, transformed/manipulated input data, intermediate results, or final results) and/or models may be replicated across different geographical locations or availability containers as described below. To meet an MLS client's data security needs, selected data sets, models or code implementing user-defined functions or third-party functions may be restricted to security containers defined by the provider network in some embodiments, in which for example the client's machine learning tasks are executed in an isolated, single-tenant fashion instead of the multi-tenant approach that may typically be used for some of the provider network's services. The term "MLS control plane" may be used herein to refer to a collection of hardware and/or software entities that are responsible for implementing various types of machine learning functionality on behalf of clients of the MLS, and for administrative tasks not necessarily visible to external MLS clients, such as ensuring that an adequate set of resources is provisioned to meet client demands, detecting and recovering from failures, generating bills, and so on. The term "MLS data plane" may refer to the pathways and resources used for the processing, transfer, and storage of the input data used for client-requested operations, as well as the processing, transfer and storage of output data produced as a result of client-requested operations.

According to some embodiments, a number of different types of entities related to machine learning tasks may be generated, modified, read, executed, and/or queried/searched via MLS programmatic interfaces. Supported entity types in one embodiment may include, among others, data sources (e.g., descriptors of locations or objects from which input records for machine learning can be obtained), sets of statistics generated by analyzing the input data, recipes (e.g., descriptors of feature processing transformations to be applied to input data for training models), processing plans (e.g., templates for executing various machine learning tasks), models (which may also be referred to as predictors), parameter sets to be used for recipes and/or models, model execution results such as predictions or evaluations, online access points for models that are to be used on streaming or real-time data, and/or aliases (e.g., pointers to model versions that have been "published" for use as described below). Instances of these entity types may be referred to as machine learning artifacts herein—for example, a specific recipe or a specific model may each be considered an artifact. Each of the entity types is discussed in further detail below.

The MLS programmatic interfaces may enable users to submit respective requests for several related tasks of a given machine learning workflow, such as tasks for extracting records from data sources, generating statistics on the records, feature processing, model training, prediction, and so on. A given invocation of a programmatic interface (such as an API) may correspond to a request for one or more operations or tasks on one or more instances of a supported type of entity. Some tasks (and the corresponding APIs) may involve multiple different entity types—e.g., an API requesting a creation of a data source may result in the generation of a data source entity instance as well as a statistics entity instance. Some of the tasks of a given workflow may be dependent on the results of other tasks. Depending on the amount of data, and/or on the nature of the processing to be performed, some tasks may take hours or even days to complete. In at least some embodiments, an asynchronous approach may be taken to scheduling the tasks, in which MLS clients can submit additional tasks that depend on the output of earlier-submitted tasks without waiting for the earlier-submitted tasks to complete. For example, a client may submit respective requests for tasks T2 and T3 before an earlier-submitted task T1 completes, even though the execution of T2 depends at least partly on the results of T1, and the execution of T3 depends at least partly on the results of T2. In such embodiments, the MLS may take care of ensuring that a given task is scheduled for execution only when its dependencies (if any dependencies exist) have been met.

A queue or collection of job objects may be used for storing internal representations of requested tasks in some implementations. The term "task", as used herein, refers to a set of logical operations corresponding to a given request from a client, while the term "job" refers to the internal representation of a task within the MLS. In some embodiments, a given job object may represent the operations to be performed as a result of a client's invocation of a particular programmatic interface, as well as dependencies on other jobs. The MLS may be responsible for ensuring that the dependencies of a given job have been met before the corresponding operations are initiated. The MLS may also be responsible in such embodiments for generating a processing plan for each job, identifying the appropriate set of resources (e.g., CPUs/cores, storage or memory) for the plan, scheduling the execution of the plan, gathering results, providing/saving the results in an appropriate destination, and at least in some cases for providing status updates or responses to the requesting clients. The MLS may also ensure that the execution of one client's jobs do not affect or interfere with the execution of other clients' jobs. In some embodiments, partial dependencies among tasks may be supported—e.g., in a sequence of tasks (T1, T2, T3), T2 may depend on partial completion of T1, and T2 may therefore be scheduled before T1 completes. For example, T1 may comprise two phases or passes P1 and P2 of statistics calculations, and T2 may be able to proceed as soon as phase P1 is completed, without waiting for phase P2 to complete. Partial results of T1 (e.g., at least some statistics computed during phase P1) may be provided to the requesting client as soon as they become available in some cases, instead of waiting for the entire task to be completed.

A single shared queue that includes jobs corresponding to requests from a plurality of clients of the MLS may be used in some implementations, while in other implementations respective queues may be used for different clients. In some implementations, lists or other data structures that can be used to model object collections may be used as containers of to-be-scheduled jobs instead of or in addition to queues. In some embodiments, a single API request from a client may lead to the generation of several different job objects by the MLS. In at least one embodiment, not all client API requests may be implemented using jobs—e.g., a relatively short or lightweight task may be performed synchronously with respect to the corresponding request, without incurring the overhead of job creation and asynchronous job scheduling.

The APIs implemented by the MLS may in some embodiments allow clients to submit requests to create, query the attributes of, read, update/modify, search, or delete an instance of at least some of the various entity types supported. For example, for the entity type "DataSource", respective APIs similar to "createDataSource", "describeDataSource" (to obtain the values of attributes of the data source), "updateDataSource", "searchForDataSource", and "deleteDataSource" may be supported by the MLS. A similar set of APIs may be supported for recipes, models, and so on. Some entity types may also have APIs for executing or running the entities, such as "executeModel" or "executeRecipe" in various embodiments. The APIs may be designed to be easy to learn and self-documenting (e.g., such that the correct way to use a given API is obvious to non-experts), with an emphasis on making it simple to perform the most common tasks without making it too hard to perform more complex tasks. In at least some embodiments multiple versions of the APIs may be supported: e.g., one version for a wire protocol (at the application level of a networking stack), another version as a Java™ library or SDK (software development kit), another version as a Python library, and so on. API requests may be submitted by clients using HTTP (Hypertext Transfer Protocol), HTTPS (secure HTTP), Javascript, XML, or the like in various implementations.

In some embodiments, some machine learning models may be created and trained, e.g., by a group of model developers or data scientists using the MLS APIs, and then published for use by another community of users. In order to facilitate publishing of models for use by a wider audience than just the creators of the model, while preventing potentially unsuitable modifications to the models by unskilled members of the wider audience, the "alias" entity type may be supported in such embodiments. In one embodiment, an alias may comprise an immutable name (e.g., "SentimentAnalysisModel1") and a pointer to a model that has already been created and stored in an MLS artifact repository (e.g., "samModel-23adf-2013-12-13-08-06-01", an internal identifier generated for the model by the MLS). Different sets of permissions on aliases may be granted to model developers than are granted to the users to whom the aliases are being made available for execution. For example, in one implementation, members of a business analyst group may be allowed to run the model using its alias name, but may not be allowed to change the pointer, while model developers may be allowed to modify the pointer and/or modify the underlying model. For the business analysts, the machine learning model exposed via the alias may represent a "black box" tool, already validated by experts, which is expected to provide useful predictions for various input data sets. The business analysts may not be particularly concerned about the internal working of such a model. The model developers may continue to experiment with various algorithms, parameters and/or input data sets to obtain improved versions of the underlying model, and may be able to change the pointer to point to an enhanced version to improve the quality of predictions obtained by the business analysts. In at least some embodiments, to isolate alias users from changes to the underlying models, the MLS may guarantee that (a) an alias can only point to a model that has been successfully trained and (b) when an alias pointer is changed, both the original model and the new model (i.e., the respective models being pointed to by the old pointer and the new pointer) consume the same type of input and provide the same type of prediction (e.g., binary classification, multi-class classification or regression). In some implementations, a given model may itself be designated as un-modifiable if an alias is created for it—e.g., the model referred to by the pointer "samModel-23adf-2013-12-13-08-06-01" may no longer be modified even by its developers after the alias is created in such an implementation. Such clean separation of roles and capabilities with respect to model development and use may allow larger audiences within a business organization to benefit from machine learning models than simply those skilled enough to develop the models.

A number of choices may be available with respect to the manner in which the operations corresponding to a given job are mapped to MLS servers. For example, it may be possible to partition the work required for a given job among many different servers to achieve better performance. As part of developing the processing plan for a job, the MLS may select a workload distribution strategy for the job in some embodiments. The parameters determined for workload distribution in various embodiments may differ based on the nature of the job. Such factors may include, for example, (a) determining a number of passes of processing, (b) determining a parallelization level (e.g., the number of "mappers" and "reducers" in the case of a job that is to be implemented using the Map-Reduce technique), (c) determining a convergence criterion to be used to terminate the job, (d) determining a target durability level for intermediate data produced during the job, or (e) determining a resource capacity limit for the job (e.g., a maximum number of servers that can be assigned to the job based on the number of servers available in MLS server pools, or on the client's budget limit). After the workload strategy is selected, the actual set of resources to be used may be identified in accordance with the strategy, and the job's operations may be scheduled on the identified resources. In some embodiments, a pool of compute servers and/or storage servers may be pre-configured for the MLS, and the resources for a given job may be selected from such a pool. In other embodiments, the resources may be selected from a pool assigned to the client on whose behalf the job is to be executed—e.g., the client may acquire resources from a computing service of the provider network prior to submitting API requests, and may provide an indication of the acquired resources to the MLS for job scheduling. If client-provided code (e.g., code that has not necessarily been thoroughly tested by the MLS, and/or is not included in the MLS's libraries) is being used for a given job, in some embodiments the client may be required to acquire the resources to be used for the job, so that any side effects of running the client-provided code may be restricted to the client's own resources instead of potentially affecting other clients.

Example System Environments

FIG. 1 illustrates an example system environment in which various components of a machine learning service (MLS) may be implemented, according to at least some embodiments. In system 100, the MLS may implement a set of programmatic interfaces 161 (e.g., APIs, command-line tools, web pages, or standalone GUIs) that can be used by clients 164 (e.g., hardware or software entities owned by or assigned to customers of the MLS) to submit requests 111 for a variety of machine learning tasks or operations. The administrative or control plane portion of the MLS may include MLS request handler 180, which accepts the client requests 111 and inserts corresponding job objects into MLS job queue 142, as indicated by arrow 112. In general, the control plane of the MLS may comprise a plurality of components (including the request handler, workload distribution strategy selectors, one or more job schedulers, metrics collectors, and modules that act as interfaces with other services) which may also be referred to collectively as the MLS manager. The data plane of the MLS may include, for example, at least a subset of the servers of pool(s) 185, storage devices that are used to store input data sets, intermediate results or final results (some of which may be part of the MLS artifact repository), and the network pathways used for transferring client input data and results.

As mentioned earlier, each job object may indicate one or more operations that are to be performed as a result of the invocation of a programmatic interface 161, and the scheduling of a given job may in some cases depend upon the successful completion of at least a subset of the operations of an earlier-generated job. In at least some implementations, job queue 142 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 111, the next job whose dependency requirements have been met may be removed from job queue 142 in the depicted embodiment, as indicated by arrow 113, and a processing plan comprising a workload distribution strategy may be identified for it. The workload distribution strategy layer 175, which may also be a component of the MLS control plane as mentioned earlier, may determine the manner in which the lower level operations of the job are to be distributed among one or more compute servers (e.g., servers selected from pool 185), and/or the manner in which the data analyzed or manipulated for the job is to be distributed among one or more storage devices or servers. After the processing plan has been generated and the appropriate set of resources to be utilized for the job has been identified, the job's operations may be scheduled on the resources. Results of some jobs may be stored as MLS artifacts within repository 120 in some embodiments, as indicated by arrow 147.

In at least one embodiment, some relatively simple types of client requests 111 may result in the immediate generation, retrieval, storage, or modification of corresponding artifacts within MLS artifact repository 120 by the MLS request handler 180 (as indicated by arrow 141). Thus, the insertion of a job object in job queue 142 may not be required for all types of client requests. For example, a creation or removal of an alias for an existing model may not require the creation of a new job in such embodiments. In the embodiment shown in FIG. 1, clients 164 may be able to view at least a subset of the artifacts stored in repository 120, e.g., by issuing read requests 118 via programmatic interfaces 161.

A client request 111 may indicate one or more parameters that may be used by the MLS to perform the operations, such as a data source definition 150, a feature processing transformation recipe 152, or parameters 154 to be used for a particular machine learning algorithm. In some embodiments, artifacts respectively representing the parameters may also be stored in repository 120. Some machine learning workflows, which may correspond to a sequence of API requests from a client 164, may include the extraction and cleansing of input data records from raw data repositories 130 (e.g., repositories indicated in data source definitions 150) by input record handlers 160 of the MLS, as indicated by arrow 114. This first portion of the workflow may be initiated in response to a particular API invocation from a client 164, and may be executed using a first set of resources from pool 185. The input record handlers may, for example, perform such tasks as splitting the data records, sampling the data records, and so on, in accordance with a set of functions defined in an I/O (input/output) library of the MLS. The input data may comprise data records that include variables of any of a variety of data types, such as, for example text, a numeric data type (e.g., real or integer), Boolean, a binary data type, a categorical data type, an image processing data type, an audio processing data type, a bioinformatics data type, a structured data type such as a data type compliant with the Unstructured Information Management Architecture (UIMA), and so on.

In at least some embodiments, the input data reaching the MLS may be encrypted or compressed, and the MLS input data handling machinery may have to perform decryption or decompression before the input data records can be used for machine learning tasks. In some embodiments in which encryption is used, MLS clients may have to provide decryption metadata (e.g., keys, passwords, or other credentials) to the MLS to allow the MLS to decrypt data records. Similarly, an indication of the compression technique used may be provided by the clients in some implementations to enable the MLS to decompress the input data records appropriately. The output produced by the input record handlers may be fed to feature processors 162 (as indicated by arrow 115), where a set of transformation operations may be performed in accordance with recipes 152 using another set of resources from pool 185. Any of a variety of feature processing approaches may be used depending on the problem domain: e.g., the recipes typically used for computer vision problems may differ from those used for voice recognition problems, natural language processing, and so on. The output 116 of the feature processing transformations may in turn be used as input for a selected machine learning algorithm 166, which may be executed in accordance with algorithm parameters 154 using yet another set of resources from pool 185. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS. In some embodiments, some of the intermediate results (e.g., summarized statistics produced by the input record handlers) of a machine learning workflow may be stored in MLS artifact repository 120.

In the embodiment depicted in FIG. 1, the MLS may maintain knowledge base 122 containing information on best practices for various machine learning tasks. Entries may be added into the best practices KB 122 by various control-plane components of the MLS, e.g., based on metrics collected from server pools 185, feedback provided by clients 164, and so on. Clients 164 may be able to search for and retrieve KB entries via programmatic interfaces 161, as indicated by arrow 117, and may use the information contained in the entries to select parameters (such as specific recipes or algorithms to be used) for their request submissions. In at least some embodiments, new APIs may be implemented (or default values for API parameters may be selected) by the MLS on the basis of best practices identified over time for various types of machine learning practices.

Figure 2:
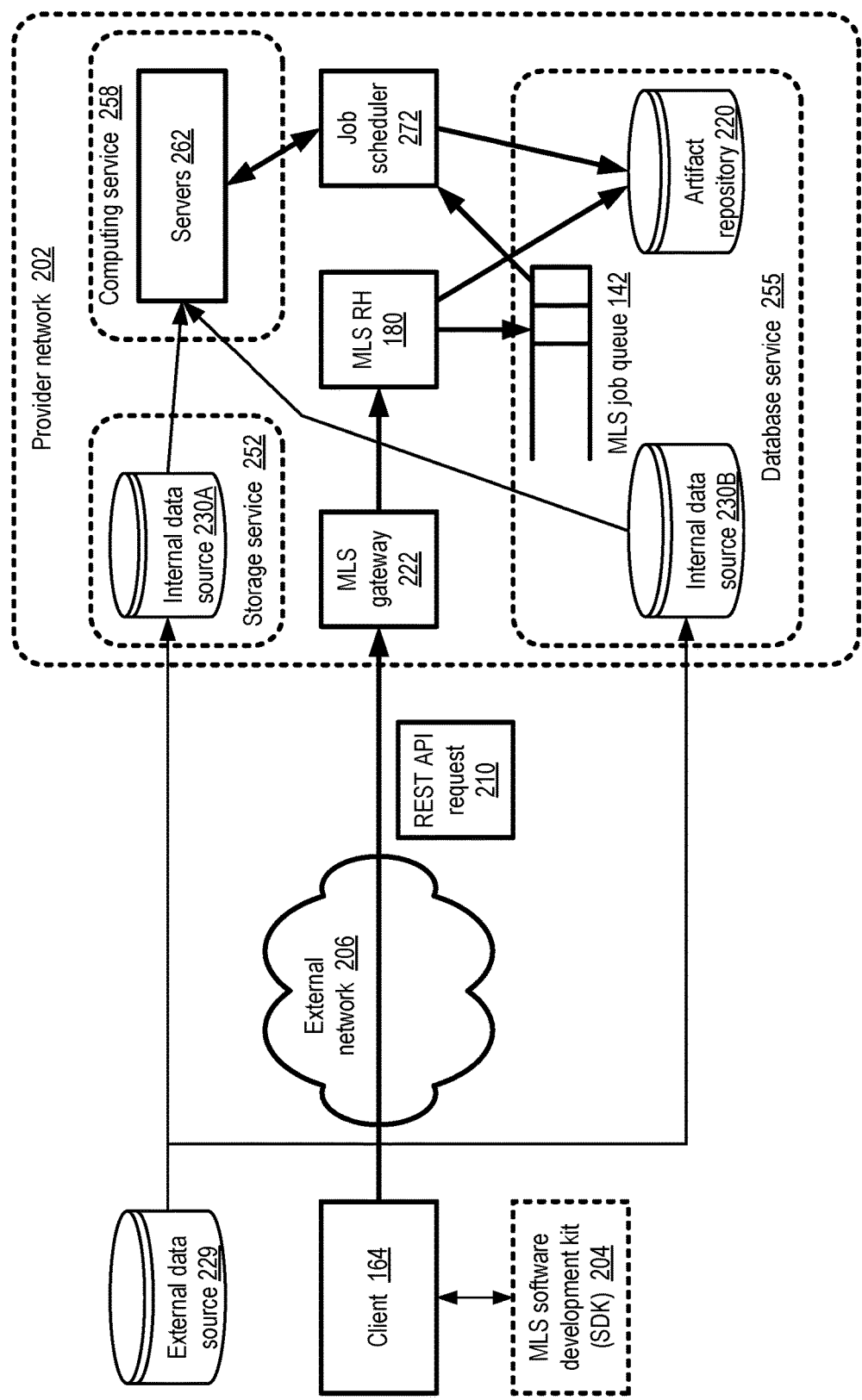
FIG. 2 illustrates an example of a machine learning service implemented using a plurality of network-accessible services of a provider network, according to at least some embodiments.

FIG. 2 illustrates an example of a machine learning service implemented using a plurality of network-accessible services of a provider network, according to at least some embodiments. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service such as the MLS may be distributed among several such locations to achieve desired levels of availability, fault-resilience and performance, as described below in greater detail with reference to FIG. 3.

In the embodiment shown in FIG. 2, the MLS utilizes storage service 202, computing service 258, and database service 255 of provider network 202. At least some of these services may also be used concurrently by other customers (e.g., other services implemented at the provider network, and/or external customers outside the provider network) in the depicted embodiment, i.e., the services may not be restricted to MLS use. MLS gateway 222 may be established to receive client requests 210 submitted over external network 206 (such as portions of the Internet) by clients 164. MLS gateway 222 may, for example, be configured with a set of publicly accessible IP (Internet Protocol) addresses that can be used to access the MLS. The client requests may be formatted in accordance with a representational state transfer (REST) API implemented by the MLS in some embodiments. In one embodiment, MLS customers may be provided an SDK (software development kit) 204 for local installation at client computing devices, and the requests 210 may be submitted from within programs written in conformance with the SDK. A client may also or instead access MLS functions from a compute server 262 of computing service 262 that has been allocated to the client in various embodiments.

Storage service 252 may, for example, implement a web services interface that can be used to create and manipulate unstructured data objects of arbitrary size. Database service 255 may implement either relational or non-relational databases. The storage service 252 and/or the database service 255 may play a variety of roles with respect to the MLS in the depicted embodiment. The MLS may require clients 164 to define data sources within the provider network boundary for their machine learning tasks in some embodiments. In such a scenario, clients may first transfer data from external data sources 229 into internal data sources within the provider network, such as internal data source 230A managed by storage service 252, or internal data source 230B managed by database service 255. In some cases, the clients of the MLS may already be using the provider network services for other applications, and some of the output of those applications (e.g., web server logs or video files), saved at the storage service 252 or the database service 255, may serve as the data sources for MLS workflows.

In response to at least some client requests 210, the MLS request handler 180 may generate and store corresponding job objects within a job queue 142, as discussed above. In the embodiment depicted in FIG. 2, the job queue 142 may itself be represented by a database object (e.g., a table) stored at database service 255. A job scheduler 272 may retrieve a job from queue 142, e.g., after checking that the job's dependency requirements have been met, and identify one or more servers 262 from computing service 258 to execute the job's computational operations. Input data for the computations may be read from the internal or external data sources by the servers 262. The MLS artifact repository 220 may be implemented within the database service 255 (and/or within the storage service 252) in various embodiments. In some embodiments, intermediate or final results of various machine learning tasks may also be stored within the storage service 252 and/or the database service 255.

Other services of the provider network, e.g., including load balancing services, parallel computing services, automated scaling services, and/or identity management services, may also be used by the MLS in some embodiments. A load balancing service may, for example, be used to automatically distribute computational load among a set of servers 262. A parallel computing service that implements the Map-reduce programming model may be used for some types of machine learning tasks. Automated scaling services may be used to add or remove servers assigned to a particular long-lasting machine learning task. Authorization and authentication of client requests may be performed with the help of an identity management service of the provider network in some embodiments.

In some embodiments a provider network may be organized into a plurality of geographical regions, and each region may include one or more availability containers, which may also be termed "availability zones". An availability container in turn may comprise portions or all of one or more distinct physical premises or data centers, engineered in such a way (e.g., with independent infrastructure components such as power-related equipment, cooling equipment, and/or physical security components) that the resources in a given availability container are insulated from failures in other availability containers. A failure in one availability container may not be expected to result in a failure in any other availability container; thus, the availability profile of a given physical host or server is intended to be independent of the availability profile of other hosts or servers in a different availability container.

In addition to their distribution among different availability containers, provider network resources may also be partitioned into distinct security containers in some embodiments. For example, while in general various types of servers of the provider network may be shared among different customers' applications, some resources may be restricted for use by a single customer. A security policy may be defined to ensure that specified group of resources (which may include resources managed by several different provider network services, such as a computing service, a storage service, or a database service, for example) are only used by a specified customer or a specified set of clients. Such a group of resources may be referred to as "security containers" or "security groups" herein.

Figure 3:
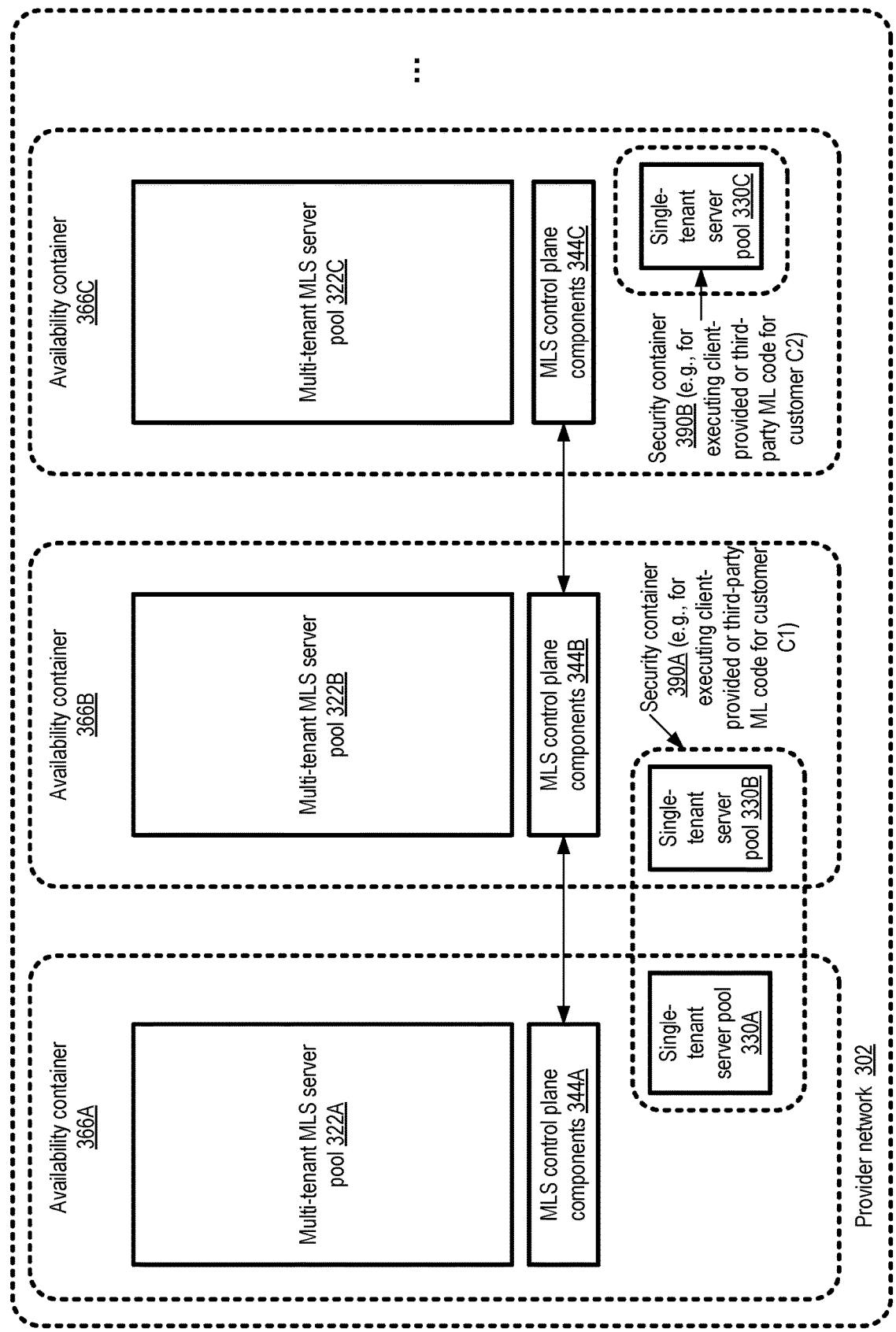
FIG. 3 illustrates an example of the use of a plurality of availability containers and security containers of a provider network for a machine learning service, according to at least some embodiments.

FIG. 3 illustrates an example of the use of a plurality of availability containers and security containers of a provider network for a machine learning service, according to at least some embodiments. In the depicted embodiment, provider network 302 comprises availability containers 366A, 366B and 366C, each of which may comprise portions or all of one or more data centers. Each availability container 366 has its own set of MLS control-plane components 344: e.g., control plane components 344A-344C in availability containers 366A-366C respectively. The control plane components in a given availability container may include, for example, an instance of an MLS request handler, one or more MLS job queues, a job scheduler, workload distribution components, and so on. The control plane components in different availability containers may communicate with each other as needed, e.g., to coordinate tasks that utilize resources at more than one data center. Each availability container 366 has a respective pool 322 (e.g., 322A-322C) of MLS servers to be used in a multi-tenant fashion. The servers of the pools 322 may each be used to perform a variety of MLS operations, potentially for different MLS clients concurrently. In contrast, for executing MLS tasks that require a higher level of security or isolation, single-tenant server pools that are designated for only a single client's workload may be used, such as single tenant server pools 330A, 330B and 330C. Pools 330A and 330B belong to security container 390A, while pool 330C is part of security container 390B. Security container 390A may be used exclusively for a customer C1 (e.g., to run customer-provided machine learning modules, or third-party modules specified by the customer), while security container 390B may be used exclusively for a different customer C2 in the depicted example.

In some embodiments, at least some of the resources used by the MLS may be arranged in redundancy groups that cross availability container boundaries, such that MLS tasks can continue despite a failure that affects MLS resources of a given availability container. For example, in one embodiment, a redundancy group RG1 comprising at least one server S1 in availability container 366A, and at least one server S2 in availability container 366B may be established, such that S1's MLS-related workload may be failed over to S2 (or vice versa). For long-lasting MLS tasks (such as tasks that involve terabyte or petabyte-scale data sets), the state of a given MLS job may be check-pointed to persistent storage (e.g., at a storage service or a database service of the provider network that is also designed to withstand single-availability-container failures) periodically, so that a failover server can resume a partially-completed task from the most recent checkpoint instead of having to start over from the beginning. The storage service and/or the database service of the provider network may inherently provide very high levels of data durability, e.g., using erasure coding or other replication techniques, so the data sets may not necessarily have to be copied in the event of a failure. In some embodiments, clients of the MLS may be able to specify the levels of data durability desired for their input data sets, intermediate data sets, artifacts, and the like, as well as the level of compute server availability desired. The MLS control plane may determine, based on the client requirements, whether resources in multiple availability containers should be used for a given task or a given client. The billing amounts that the clients have to pay for various MLS tasks may be based at least in part on their durability and availability requirements. In some embodiments, some clients may indicate to the MLS control-plane that they only wish to use resources within a given availability container or a given security container. For certain types of tasks, the costs of transmitting data sets and/or results over long distances may be so high, or the time required for the transmissions may so long, that the MLS may restrict the tasks to within a single geographical region of the provider network (or even within a single data center).

Processing Plans

Figure 4:
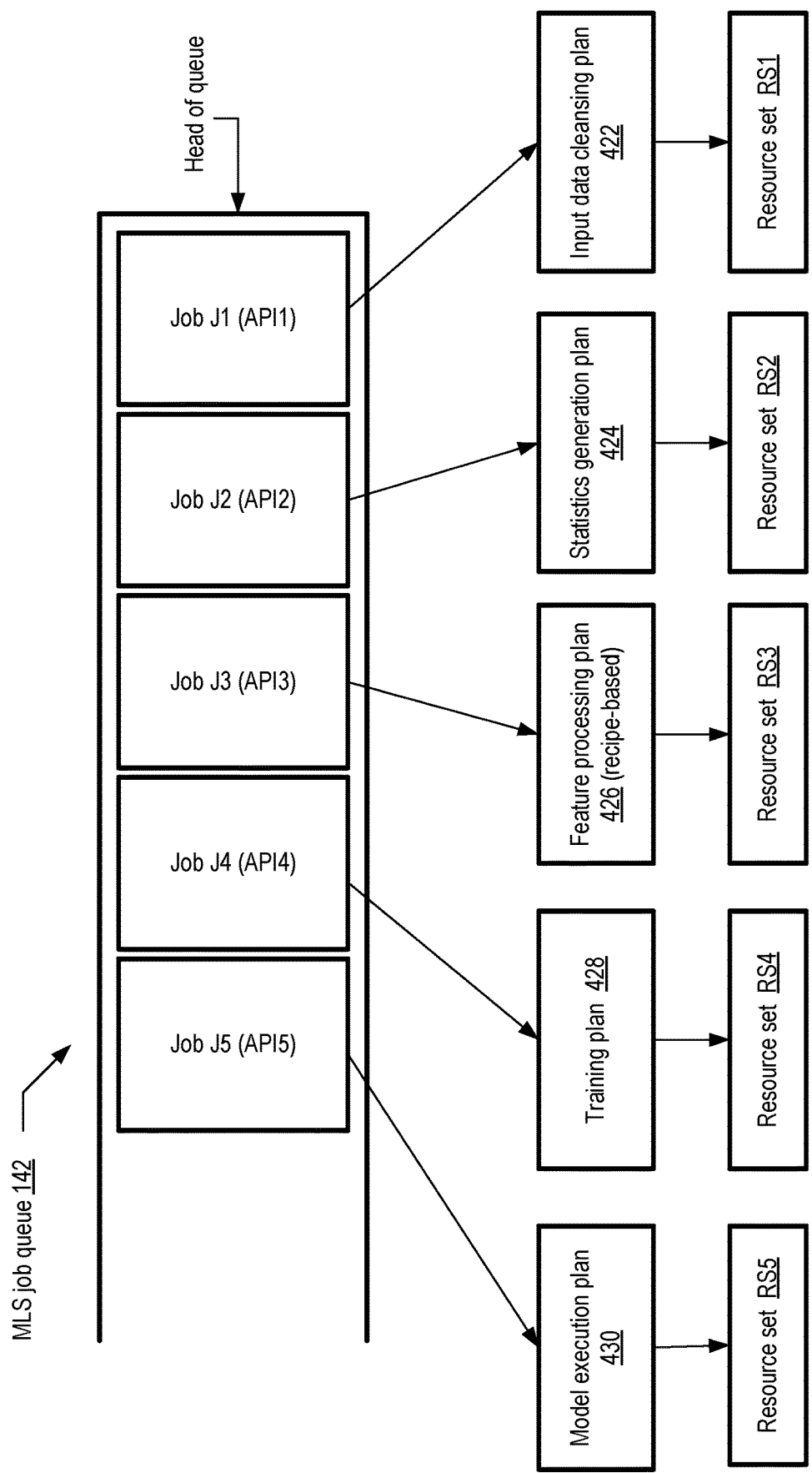
FIG. 4 illustrates examples of a plurality of processing plans and corresponding resource sets that may be generated at a machine learning service, according to at least some embodiments.

As mentioned earlier, the MLS control plane may be responsible for generating processing plans corresponding to each of the job objects generated in response to client requests in at least some embodiments. For each processing plan, a corresponding set of resources may then have to be identified to execute the plan, e.g., based on the workload distribution strategy selected for the plan, the available resources, and so on. FIG. 4 illustrates examples of various types of processing plans and corresponding resource sets that may be generated at a machine learning service, according to at least some embodiments.

In the illustrated scenario, MLS job queue 142 comprises five jobs, each corresponding to the invocation of a respective API by a client. Job J1 (shown at the head of the queue) was created in response to an invocation of API1. Jobs J2 through J5 were created respectively in response to invocations of API2 through API5. Corresponding to job J1, an input data cleansing plan 422 may be generated, and the plan may be executed using resource set RS1. The input data cleansing plan may include operations to read and validate the contents of a specified data source, fill in missing values, identify and discard (or otherwise respond to) input records containing errors, and so on. In some cases the input data may also have to be decompressed, decrypted, or otherwise manipulated before it can be read for cleansing purposes. Corresponding to job J2, a statistics generation plan 424 may be generated, and subsequently executed on resource set RS2. The types of statistics to be generated for each data attribute (e.g., mean, minimum, maximum, standard deviation, quantile binning, and so on for numeric attributes) and the manner in which the statistics are to be generated (e.g., whether all the records generated by the data cleansing plan 422 are to be used for the statistics, or a sub-sample is to be used) may be indicated in the statistics generation plan. The execution of job J2 may be dependent on the completion of job J1 in the depicted embodiment, although the client request that led to the generation of job J2 may have been submitted well before J1 is completed.

A recipe-based feature processing plan 426 corresponding to job J3 (and API3) may be generated, and executed on resource set RS3. Further details regarding the syntax and management of recipes are provided below. Job J4 may result in the generation of a model training plan 428 (which may in turn involve several iterations of training, e.g., with different sets of parameters). The model training may be performed using resource set RS4. Model execution plan 430 may correspond to job J5 (resulting from the client's invocation of API5), and the model may eventually be executed using resource set RS5. In some embodiments, the same set of resources (or an overlapping set of resources) may be used for performing several or all of a client's jobs—e.g., the resource sets RS1-RS5 may not necessarily differ from one another. In at least one embodiment, a client may indicate, e.g., via parameters included in an API call, various elements or properties of a desired processing plan, and the MLS may take such client preferences into account. For example, for a particular statistics generation job, a client may indicate that a randomly-selected sample of 25% of the cleansed input records may be used, and the MLS may generate a statistics generation plan that includes a step of generating a random sample of 25% of the data accordingly. In other cases, the MLS control plane may be given more freedom to decide exactly how a particular job is to be implemented, and it may consult its knowledge base of best practices to select the parameters to be used.

Job Scheduling

Figure 5:
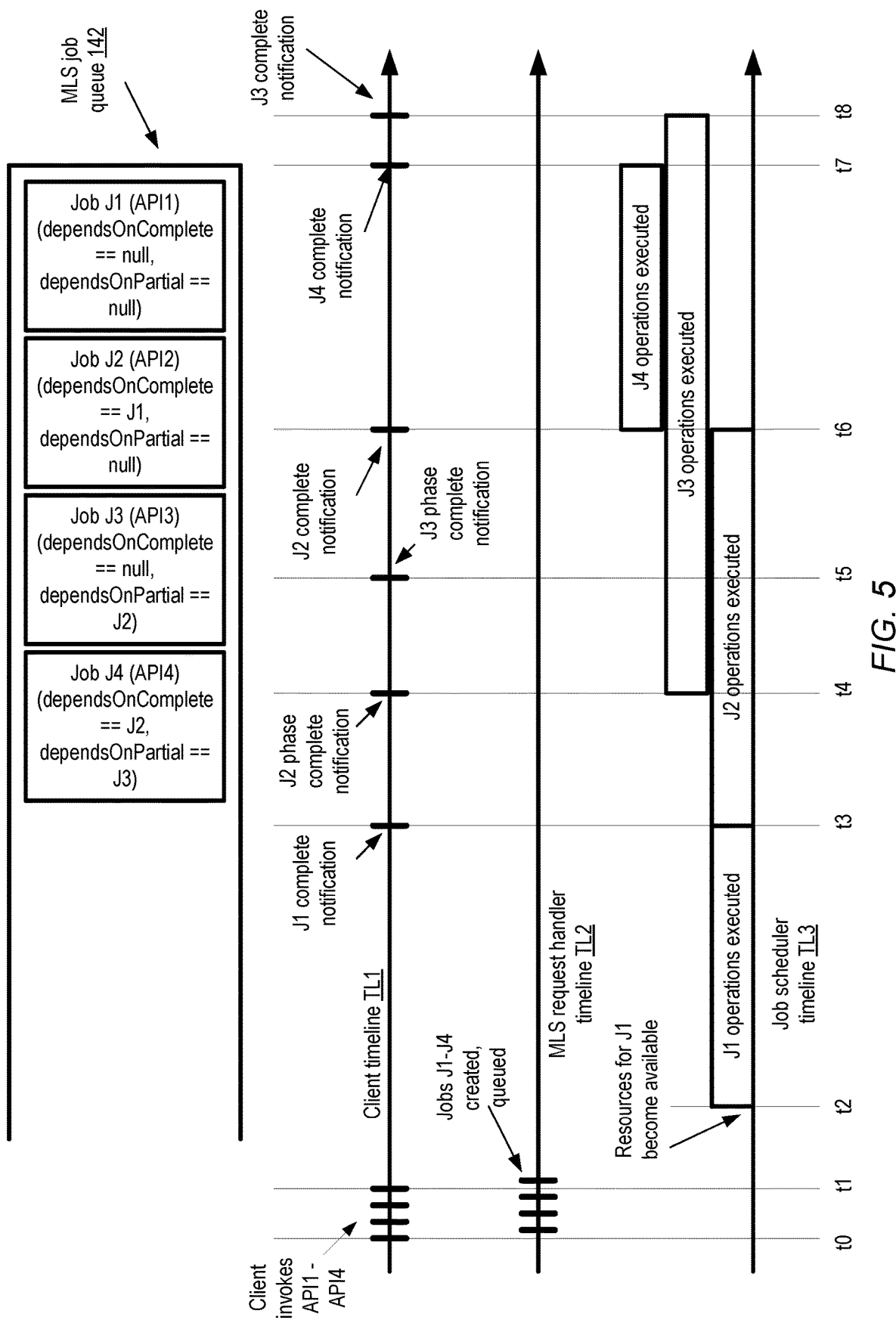
FIG. 5 illustrates an example of asynchronous scheduling of jobs at a machine learning service, according to at least some embodiments.

FIG. 5 illustrates an example of asynchronous scheduling of jobs at a machine learning service, according to at least some embodiments. In the depicted example, a client has invoked four MLS APIs, API1 through API4, and four corresponding job objects J1 through J4 are created and placed in job queue 142. Timelines TL1, TL2, and TL3 show the sequence of events from the perspective of the client that invokes the APIs, the request handler that creates and inserts the jobs in queue 142, and a job scheduler that removes the jobs from the queue and schedules the jobs at selected resources.

In the depicted embodiment, in addition to the base case of no dependency on other jobs, two types of inter-job dependencies may be supported. In one case, termed "completion dependency", the execution of one job Jp cannot be started until another job Jq is completed successfully (e.g., because the final output of Jq is required as input for Jp). Full dependency is indicated in FIG. 5 by the parameter "dependsOnComplete" shown in the job objects—e.g., J2 is dependent on J1 completing execution, and J4 depends on J2 completing successfully. In the other type of dependency, the execution of one job Jp may be started as soon as some specified phase of another job Jq is completed. This latter type of dependency may be termed a "partial dependency", and is indicated in FIG. 5 by the "dependsOnPartial" parameter. For example, J3 depends on the partial completion of J2, and J4 depends on the partial completion of J3. It is noted that in some embodiments, to simplify the scheduling, such phase-based dependencies may be handled by splitting a job with N phases into N smaller jobs, thereby converting partial dependencies into full dependencies. J1 has no dependencies of either type in the depicted example.

As indicated on client timeline TL1, API1 through API4 may be invoked within the time period t0 to t1. Even though some of the operations requested by the client depend on the completion of operations corresponding to earlier-invoked APIs, the MLS may allow the client to submit the dependent operation requests much earlier than the processing of the earlier-invoked APIs' jobs in the depicted embodiment. In at least some embodiments, parameters specified by the client in the API calls may indicate the inter-job dependencies. For example, in one implementation, in response to API1, the client may be provided with a job identifier for J1, and that job identifier may be included as a parameter in API2 to indicate that the results of API1 are required to perform the operations corresponding to API2. As indicated by the request handler's timeline TL2, the jobs corresponding to each API call may be created and queued shortly after the API is invoked. Thus, all four jobs have been generated and placed within the job queue 142 by a short time after t1.

As shown in the job scheduler timeline TL3, job J1 may be scheduled for execution at time t2. The delay between the insertion of J1 in queue 142 (shortly after t0) and the scheduling of J1 may occur for a number of reasons in the depicted embodiment—e.g., because there may have been other jobs ahead of J1 in the queue 142, or because it takes some time to generate a processing plan for J1 and identify the resources to be used for J1, or because enough resources were not available until t2. J1's execution lasts until t3. In the depicted embodiment, when J1 completes, (a) the client is notified and (b) J2 is scheduled for execution. As indicated by J2's dependsOnComplete parameter value, J2 depends on Ws completion, and J2's execution could therefore not have been begun until t3, even if J2's processing plan were ready and J2's resource set had been available prior to t3.

As indicated by J3's "dependsOnPartial" parameter value, J3 can be started when a specified phase or subset of J2's work is complete in the depicted example. The portion of J2 upon which J3 depends completes at time t4 in the illustrated example, and the execution of J3 therefore begins (in parallel with the execution of the remaining portion of J2) at t4. In the depicted example, the client may be notified at time t4 regarding the partial completion of J2 (e.g., the results of the completed phase of J2 may be provided to the client).

At t5, the portion of J3 on which J4 depends may be complete, and the client may be notified accordingly. However, J4 also depends on the completion of J2, so J4 cannot be started until J2 completes at t6. J3 continues execution until t8. J4 completes at t7, earlier than t8. The client is notified regarding the completion of each of the jobs corresponding to the respective API invocations API1-API4 in the depicted example scenario. In some embodiments, partial dependencies between jobs may not be supported—instead, as mentioned earlier, in some cases such dependencies may be converted into full dependencies by splitting multi-phase jobs into smaller jobs. In at least one implementation, instead of or in addition to being notified when the jobs corresponding to the API invocations are complete (or when phases of the jobs are complete), clients may be able to submit queries to the MLS to determine the status (or the extent of completion) of the operations corresponding to various API calls. For example, an MLS job monitoring web page may be implemented, enabling clients to view the progress of their requests (e.g., via a "percent complete" indicator for each job), expected completion times, and so on. In some embodiments, a polling mechanism may be used by clients to determine the progress or completion of the jobs.

MILS Artifacts

Figure 6:
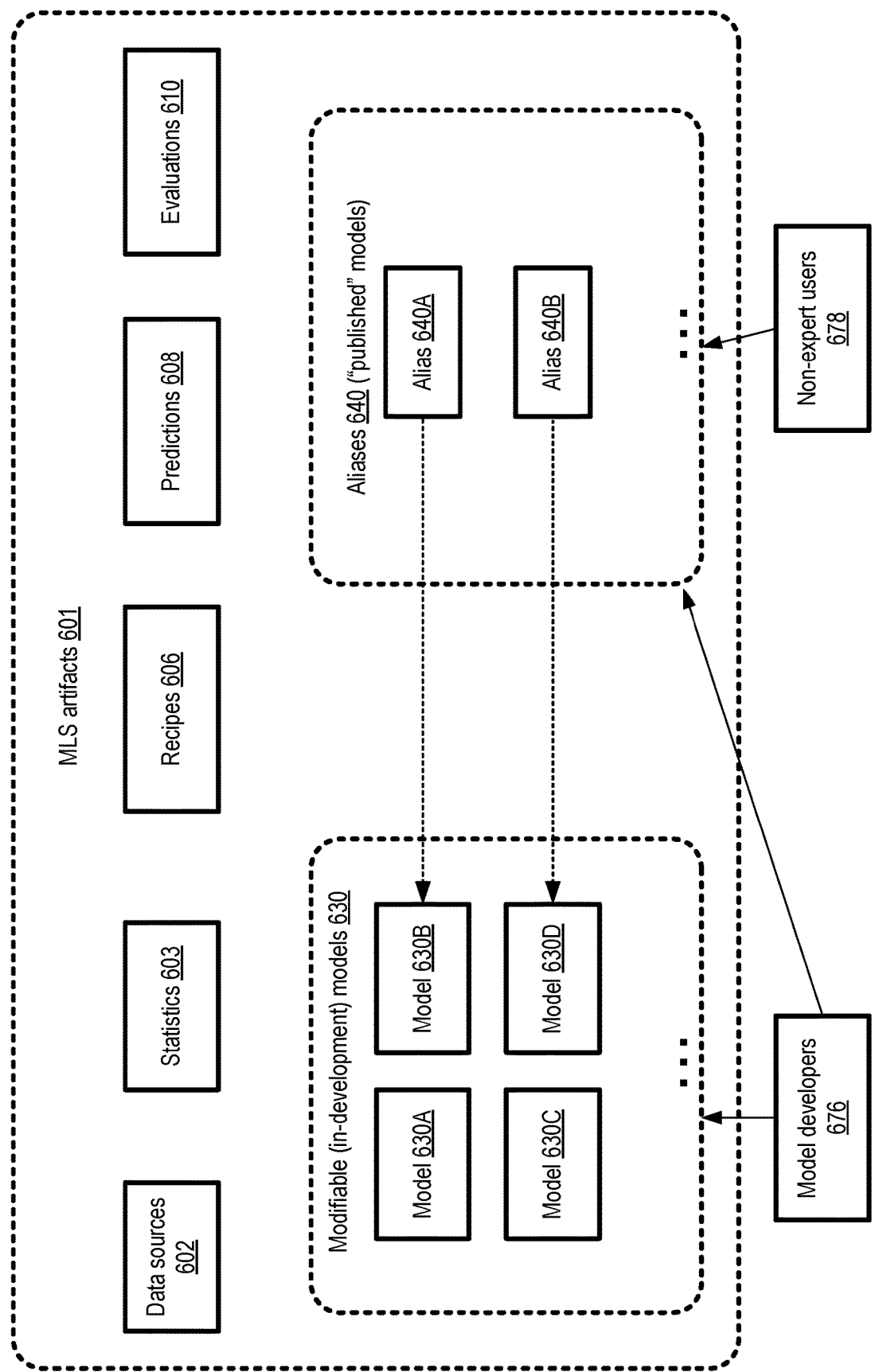
FIG. 6 illustrates example artifacts that may be generated and stored using a machine learning service, according to at least some embodiments.

FIG. 6 illustrates example artifacts that may be generated and stored using a machine learning service, according to at least some embodiments. In general, MLS artifacts may comprise any of the objects that may be stored in a persistent manner as a result of an invocation of an MLS programmatic interface. In some implementations, some API parameters (e.g., text versions of recipes) that are passed to the MLS may be stored as artifacts. As shown, in the depicted embodiment, MLS artifacts 601 may include, among others, data sources 602, statistics 603, feature processing recipes 606, model predictions 608, evaluations 610, modifiable or in-development models 630, and published models or aliases 640. In some implementations the MLS may generate a respective unique identifier for each instance of at least some of the types of artifacts shown and provide the identifiers to the clients. The identifiers may subsequently be used by clients to refer to the artifact (e.g., in subsequent API calls, in status queries, and so on).

A client request to create a data source artifact 602 may include, for example, an indication of an address or location from which data records can be read, and some indication of the format or schema of the data records. For example, an indication of a source URI (universal resource identifier) to which HTTP GET requests can be directed to retrieve the data records, an address of a storage object at a provider network storage service, or a database table identifier may be provided. The format (e.g., the sequence and types of the fields or columns of the data records) may be indicated in some implementations via a separate comma separated variable (csv) file. In some embodiments, the MLS may be able to deduce at least part of the address and/or format information needed to create the data source artifact—e.g., based on the client's identifier, it may be possible to infer the root directory or root URI of the client's data source, and based on an analysis of the first few records, it may be possible to deduce at least the data types of the columns of the schema. In some embodiments, the client request to create a data source may also include a request to re-arrange the raw input data, e.g., by sampling or splitting the data records using an I/O library of the MLS. When requesting a creation of a data source, in some implementations clients may also be required to provide security credentials that can be used by the MLS to access the data records. In one embodiment, one or more data sources may be created from the output of a particular job or API invocation. For example, a split operation may be performed on one data source DS1 to obtain 80% of the observation records of DS1 for training a model M1, and the output of the split may be designated as a data source DS2 to be used for training M1. Several different data sources may be defined for a pipelined machine learning workflow, in which the result of one or more jobs is considered a data source for another job.

Figure 7:
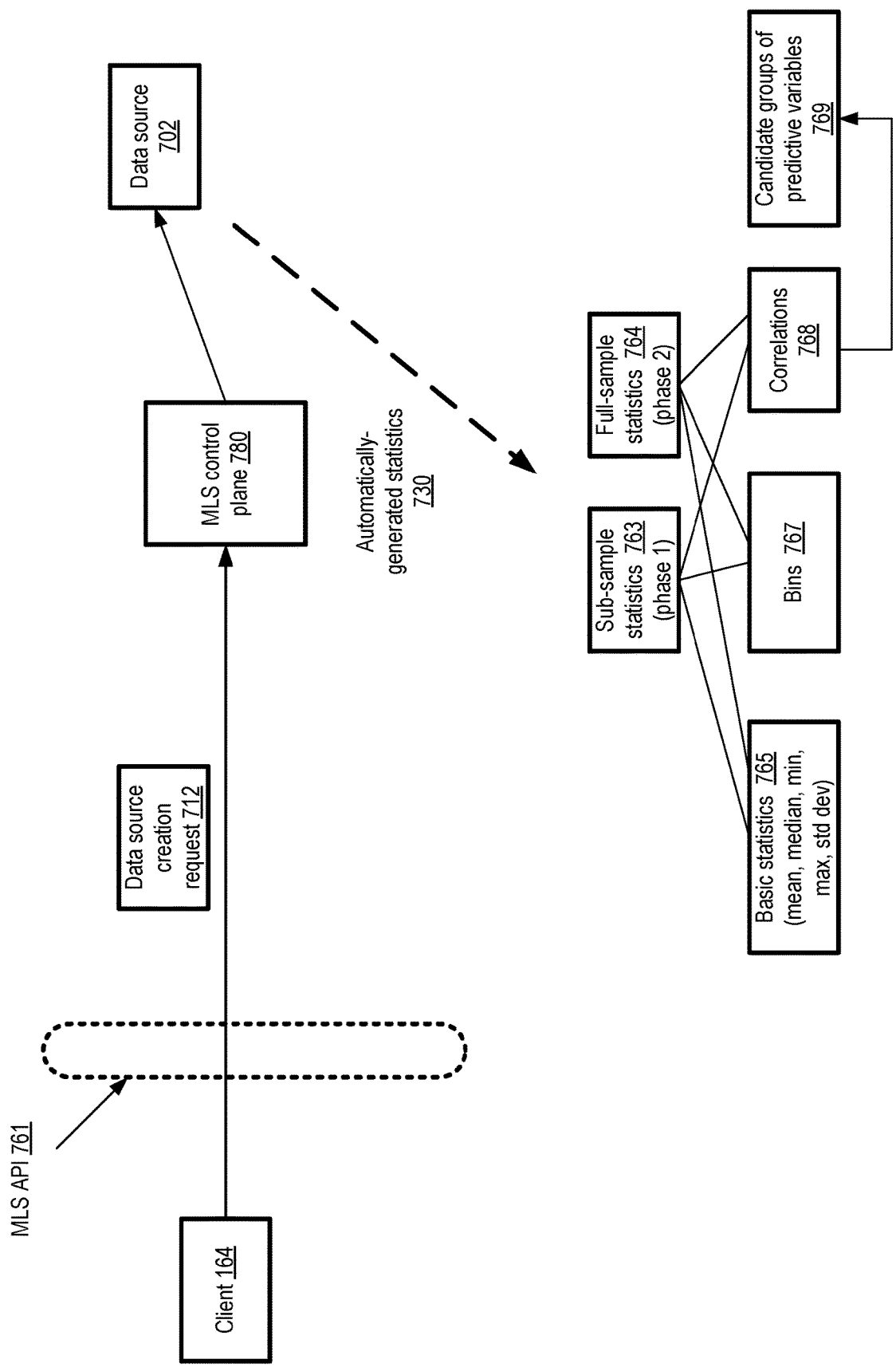
FIG. 7 illustrates an example of automated generation of statistics in response to a client request to instantiate a data source, according to at least some embodiments.

In some embodiments, as described in further detail below with respect to FIG. 7, at least some statistics 603 may be generated automatically for the data records of a data source. In other embodiments, the MLS may also or instead enable clients to explicitly request the generation of various types of statistics, e.g., via the equivalent of a createStatistics(dataSourceID, statisticsDescriptor) request in which the client indicates the types of statistics to be generated for a specified data source. The types of statistics artifacts that are generated may vary based on the data types of the input record variables—e.g., for numeric variables, the mean, median, minimum, maximum, standard deviation, quantile bins, number of nulls or "not-applicable" values and the like may be generated. Cross-variable statistics such as correlations may also be generated, either automatically or on demand, in at least some embodiments.

Recipes 606 comprising feature processing transformation instructions may be provided by a client (or selected from among a set of available recipes accessible from an MLS recipe collection) in some embodiments. A recipe language allowing clients to define groups of variables, assignments, dependencies upon other artifacts such as models, and transformation outputs may be supported by the MLS in such embodiments, as described below in greater detail. Recipes submitted in text form may be compiled into executable versions and re-used on a variety of data sets in some implementations.

At least two types of artifacts representing machine learning models or predictors may be generated and stored in the depicted embodiment. Often, the process of developing and refining a model may take a long time, as the developer may try to improve the accuracy of the predictions using a variety of data sets and a variety of parameters. Some models may be improved over a number of weeks or months, for example. In such scenarios it may be worthwhile to enable other users (e.g., business analysts) to utilize one version of a model, while model developers continue to generate other, improved versions. Accordingly, the artifacts representing models may belong to one of two categories in some embodiments: modifiable models 630, and published models or aliases 640. An alias may comprise an alias name or identifier, and a pointer to a model (e.g., alias 640A points to model 630B, and alias 640B points to model 630D in the depicted embodiment). As used herein, the phrase "publishing a model" refers to making a particular version of a model executable by a set of users by reference to an alias name or identifier. In some cases, at least some of the users of the set may not be permitted to modify the model or the alias. Non-expert users 678 may be granted read and execute permissions to the aliases, while model developers 676 may also be allowed to modify models 630 (and/or the pointers of the aliases 640) in some embodiments. In some embodiments, a set of guarantees may be provided to alias users: e.g., that the format of the input and output of an alias (and the underlying model referred to by the alias) will not change once the alias is published, and that the model developers have thoroughly tested and validated the underlying model pointed to by the alias.

In addition, a number of other logical constraints may be enforced with respect to aliases in such embodiments. For example, if the alias is created for a model used in online mode (model usage modes are described in further detail below with respect to FIG. 8), the MLS may guarantee that the model pointed to remains online (i.e., the model cannot be un-mounted). In some implementations a distinction may be drawn between aliases that are currently in production mode and those that are in internal-use or test mode, and the MLS may ensure that the underlying model is not deleted or un-mounted for an alias in production mode. When creating aliases to online-mode models, a minimum throughput rate of predictions/evaluations may be determined for the alias, and the MLS may ensure that the resources assigned to the model can meet the minimum throughput rate in some embodiments. After model developers 676 improve the accuracy and/or performance characteristics of a newer version of a model 630 relative to an older version for which an alias 640 has been created, they may switch the pointer of the alias so that it now points to the improved version. Thus, non-expert users may not have to change anything in the way that they have been using the aliases, while benefiting from the improvements. In some embodiments, alias users may be able to submit a query to learn when the underlying model was last changed, or may be notified when they request an execution of an alias that the underlying model has been changes since the last execution.

Results of model executions, such as predictions 608 (values predicted by a model for an output or dependent variable in a scenario in which the actual values of the input or independent variable are not known) and model evaluations 610 (measures of the accuracy of a model, computed when the predictions of the model can be compared to known values of dependent/output variables) may also be stored as artifacts by the MLS in some embodiments. In addition to the artifact types illustrated in FIG. 6, other artifact types may also be supported in some embodiments—e.g., objects representing network endpoints that can be used for real-time model execution on streaming data (as opposed to batch-mode execution on a static set of data) may be stored as artifacts in some embodiments, and client session logs (e.g., recordings of all the interactions between a client and the MLS during a given session) may be stored as artifacts in other embodiments.

In some embodiments, the MLS may support recurring scheduling of related jobs. For example, a client may create an artifact such as a model, and may want that same model to be re-trained and/or re-executed for different input data sets (e.g., using the same configuration of resources for each of the training or prediction iterations) at specified points in time. In some cases the points in time may be specified explicitly (e.g., by the client requesting the equivalent of "re-run model M1 on the currently available data set at data source DS1 at 11:00, 15:00 and 19:00 every day"). In other cases the client may indicate the conditions under which the iterations are to be scheduled (e.g., by the client requesting the equivalent of "re-run model M1 whenever the next set of 1000000 new records becomes available from data source DS1"). A respective job may be placed in the MLS job queue for each recurring training or execution iteration. The MLS may implement a set of programmatic interface enabling such scheduled recurring operations in some embodiments. Using such an interface, a client may specify a set of model/alias/recipe artifacts (or respective versions of the same underling artifact) to be used for each of the iterations, and/or the resource configurations to be used. Such programmatic interfaces may be referred to as "pipelining APIs" in some embodiments. In addition to the artifact types shown in FIG. 6, pipeline artifacts may be stored in the MLS artifact repository in some embodiments, with each instance of a pipeline artifact representing a named set of recurring operations requested via such APIs. In one embodiment, a separately-managed data pipelining service implemented at the provider network may be used in conjunction with the MLS for supporting such recurrent operations.

As mentioned above, in some embodiments, the MLS may automatically generate statistics when a data source is created. FIG. 7 illustrates an example of automated generation of statistics in response to a client request to instantiate a data source, according to at least some embodiments. As shown, a client 764 submits a data source creation request 712 to the MLS control plane 780 via an MLS API 761. The creation request may specify an address or location from which data records can be retrieved, and optionally a schema or format document indicating the columns or fields of the data records.

In response to receiving request 712, the MLS control plane 780 may generate and store a data source artifact 702 in the MLS artifact repository. In addition, and depending in some cases on the current availability of resources at the MLS, the MLS may also initiate the generation of one or more statistics objects 730 in the depicted embodiment, even if the client request did not explicitly request such statistics. Any combination of a number of different types of statistics may be generated automatically in one of two modes in various embodiments. For example, for very large data sets, an initial set of statistics 763 based on a sub-sample (e.g., a randomly-selected subset of the large data set) may be obtained in a first phase, while the generation of full-sample statistics 764 derived from the entire data set may be deferred to a second phase. Such a multi-phase approach towards statistics generation may be implemented, for example, to allow the client to get a rough or approximate summary of the data set values fairly rapidly in the first phase, so that the client may begin planning subsequent machine learning workflow steps without waiting for a statistical analysis of the complete data set.

As shown, a variety of different statistics may be obtained in either phase. For numeric variables, basic statistics 765 may include the mean, median, minimum, maximum, and standard deviation. Numeric variables may also be binned (categorized into a set of ranges such as quartiles or quintiles); such bins 767 may be used for the construction of histograms that may be displayed to the client. Depending on the nature of the distribution of the variable, either linear or logarithmic bin boundaries may be selected. In some embodiments, correlations 768 between different variables may be computed as well. In at least one embodiment, the MLS may utilize the automatically generated statistics (such as the correlation values) to identify candidate groups 769 of variables that may have greater predictive power than others. For example, to avoid over-fitting for certain classes of models, only one variable among a set of variables that correlate very strongly with one another may be recommended as a candidate for input to a model. In such scenarios, the client may be able to avoid the time and effort required to explore the significance of other variables. In many problem domains in which a given data record may have hundreds or even thousands of variables, such an automated selection of candidate variables expected to have greater predictive effectiveness may be very valuable to clients of the MLS.

Figure 8:
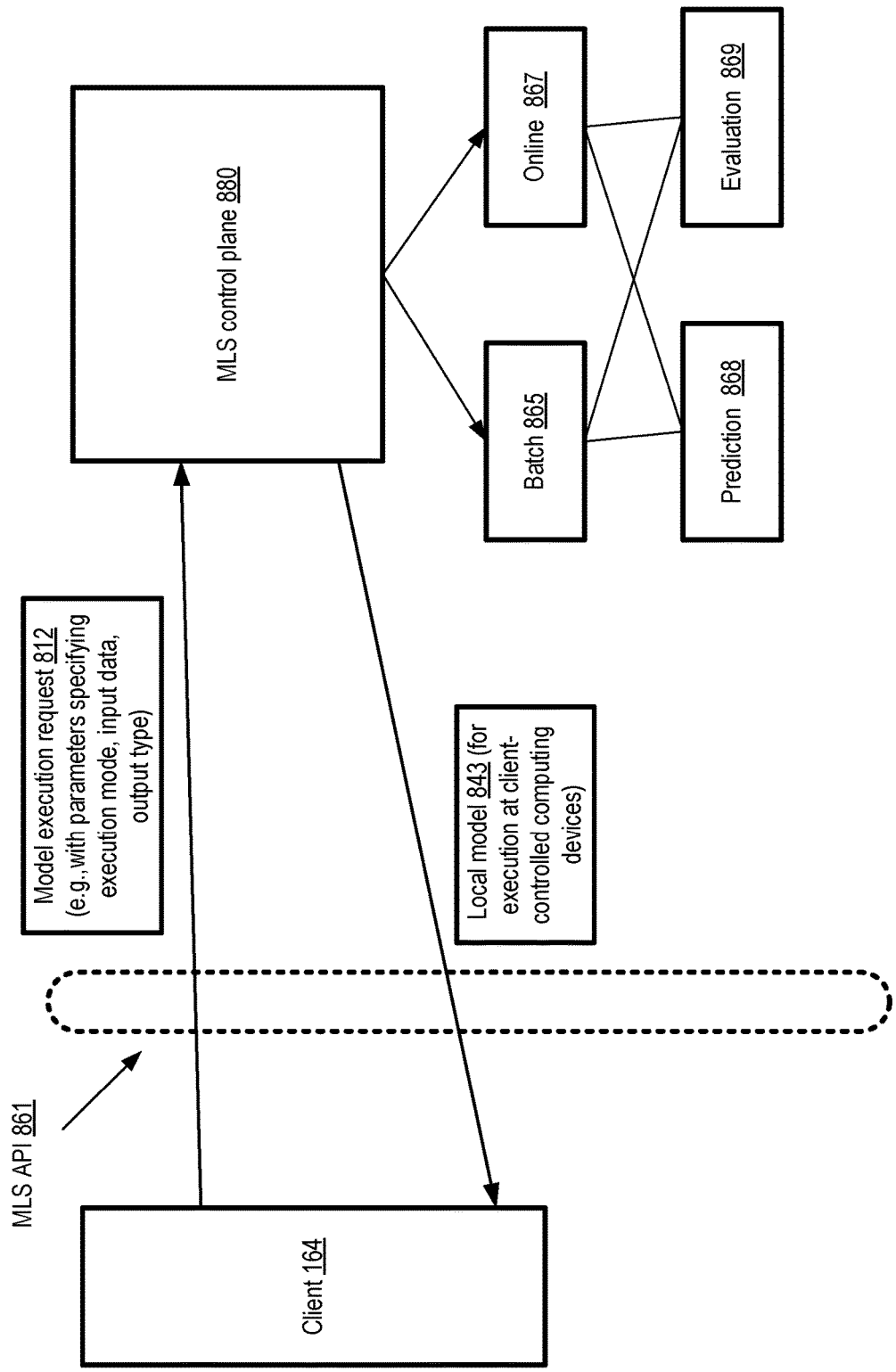
FIG. 8 illustrates several model usage modes that may be supported at a machine learning service, according to at least some embodiments.

FIG. 8 illustrates several model usage modes that may be supported at a machine learning service, according to at least some embodiments. Model usage modes may be broadly classified into three categories: batch mode, online or real-time mode, and local mode. In batch mode, a given model may be run on a static set of data records. In real-time mode, a network endpoint (e.g., an IP address) may be assigned as a destination to which input data records for a specified model are to be submitted, and model predictions may be generated on groups of streaming data records as the records are received. In local mode, clients may receive executable representations of a specified model that has been trained and validated at the MLS, and the clients may run the models on computing devices of their choice (e.g., at devices located in client networks rather than in the provider network where the MLS is implemented).

In the depicted embodiment, a client 164 of the MLS may submit a model execution request 812 to the MLS control plane 180 via a programmatic interface 861. The model execution request may specify the execution mode (batch, online or local), the input data to be used for the model run (which may be produced using a specified data source or recipe in some cases), the type of output (e.g., a prediction or an evaluation) that is desired, and/or optional parameters (such as desired model quality targets, minimum input record group sizes to be used for online predictions, and so on). In response the MLS may generate a plan for model execution and select the appropriate resources to implement the plan. In at least some embodiments, a job object may be generated upon receiving the execution request 812 as described earlier, indicating any dependencies on other jobs (such as the execution of a recipe for feature processing), and the job may be placed in a queue. For batch mode 865, for example, one or more servers may be identified to run the model. For online mode 867, the model may be mounted (e.g., configured with a network address) to which data records may be streamed, and from which results including predictions 868 and/or evaluations 869 can be retrieved. In at least one embodiment, clients may optionally specify expected workload levels for a model that is to be instantiated in online mode, and the set of provider network resources to be deployed for the model may be selected in accordance with the expected workload level. For example, a client may indicate via a parameter of the model execution/creation request that up to 100 prediction requests per day are expected on data sets of 1 million records each, and the servers selected for the model may be chosen to handle the specified request rate. For local mode, the MLS may package up an executable local version 843 of the model (where the details of the type of executable that is to be provided, such as the type of byte code or the hardware architecture on which the model is to be run, may have been specified in the execution request 812) and transmit the local model to the client. In some embodiments, only a subset of the execution modes illustrated may be supported. In some implementations, not all of the combinations of execution modes and output types may be supported—for example, while predictions may be supported for online mode in one implementation, evaluations may not be supported for online mode.

Methods for Implementing MLS Operations

FIGS. 9a and 9b are flow diagrams illustrating aspects of operations that may be performed at a machine learning service that supports asynchronous scheduling of machine learning jobs, according to at least some embodiments. As shown in element 901 of FIG. 9a, the MLS may receive a request from a client via a programmatic interface (such as an API, a command-line tool, a web page, or a custom GUI)

to perform a particular operation on an entity belonging to a set of supported entity types of the MLS. The entity types may include, for example, data sources, statistics, feature processing recipes, models, aliases, predictions, and/or evaluations in the depicted embodiment. The operations requested may include, for example, create, read (or describe the attributes of), modify/update attributes, execute, search, or delete operations. Not all the operation types may apply to all the entity types in some embodiments—e.g., it may not be possible to "execute" a data source. In at least some implementations, the request may be encrypted or encapsulated by the client, and the MLS may have to extract the contents of the request using the appropriate keys and/or certificates.

The request may next be validated in accordance with various rules or policies of the MLS (element 904). For example, in accordance with a security policy, the permissions, roles or capabilities granted to the requesting client may be checked to ensure that the client is authorized to have the requested operations performed. The syntax of the request itself, and/or objects such as recipes passed as request parameters may be checked for some types of requests. In some cases, the types of one or more data variables indicated in the request may have to be checked as well.

If the request passes the validation checks, a decision may be made as to whether a job object is to be created for the request. As mentioned earlier, in some cases, the amount of work required may be small enough that the MLS may simply be able to perform the requested operation synchronously or "in-line", instead of creating and inserting a job object into a queue for asynchronous execution (at least in scenarios in which the prerequisites or dependencies of the request have already been met, and sufficient resources are available for the MLS to complete the requested work). If an analysis of the request indicates that a job is required (as detected in element 907), a job object may be generated, indicating the nature of the lower-level operations to be performed at the MLS as well as any dependencies on other jobs, and the job object may be placed in a queue (element 913). In some implementations, the requesting client may be notified that the request has been accepted for execution (e.g., by indicating to the client that a job has been queued for later execution). The client may submit another programmatic request without waiting for the queued job to be completed (or even begun) in some cases. If the job does not have any dependencies that have yet to be met, and meets other criteria for immediate or in-line execution (as also determined in element 907), the requested operation may be performed without creating a job object (element 910) and the results may optionally be provided to the requesting client. Operations corresponding to elements 901-913 may be performed for each request that is received via the MLS programmatic interface. At some point after a particular job Jk is placed in the queue, Jk may be identified (e.g., by a job scheduler component of the MLS control plane) as the next job to be implemented (element 951 of FIG. 9b). To identify the next job to be implemented, the scheduler may, for example, start from the head of the queue (the earliest-inserted job that has not yet been executed) and search for jobs whose dependencies (if any are specified) have been met.

In addition to the kinds of validation indicated in element 904 of FIG. 9a, the MLS may perform validations at various other stages in some embodiments, e.g., with the general goals of (a) informing clients as soon as possible when a particular request is found to be invalid, and (b) avoiding wastage of MLS resources on requests that are unlikely to succeed. As shown in element 952 of FIG. 9b, one or more types of validation checks may be performed on the job Jk identified in element 951. For example, in one embodiment each client may have a quota or limit on the resources that can be applied to their jobs (such as a maximum number of servers that can be used concurrently for all of a given customer's jobs, or for any given job of the customer). In some implementations respective quotas may be set for each of several different resource types—e.g., CPUs/cores, memory, disk, network bandwidth and the like. In such scenarios, the job scheduler may be responsible for verifying that the quota or quotas of the client on whose behalf the job Jk is to be run have not been exhausted. If a quota has been exhausted, the job's execution may be deferred until at least some of the client's resources are released (e.g., as a result of a completion of other jobs performed on the same client's behalf). Such constraint limits may be helpful in limiting the ability of any given client to monopolize shared MLS resources, and also in minimizing the negative consequences of inadvertent errors or malicious code. In addition to quota checks, other types of run-time validations may be required for at least some jobs—e.g., data type checking may have to be performed on the input data set for jobs that involve feature processing, or the MLS may have to verify that the input data set size is within acceptable bounds. Thus, client requests may be validated synchronously (at the time the request is received, as indicated in element 904 of FIG. 9a) as well as asynchronously (as indicated in element 952 of FIG. 9b) in at least some embodiments. A workload distribution strategy and processing plan may be identified for Jk—e.g., the number of processing passes or phases to be used, the degree of parallelism to be used, an iterative convergence criterion to be used for completing Jk (element 954). A number of additional factors may be taken into account when generating the processing plan in some embodiments, such as client budget constraints (if any), the data durability needs of the client, the performance goals of the client, security needs (such as the need to run third-party code or client-provided code in isolation instead of in multi-tenant mode).

In accordance with the selected distribution strategy and processing plan, a set of resources may be identified for Jk (element 957). The resources (which may include compute servers or clusters, storage devices, and the like) may be selected from the MLS-managed shared pools, for example, and/or from customer-assigned or customer-owned pools. JK's operations may then be performed on the identified resources (element 960), and the client on whose behalf Jk was created may optionally be notified when the operations complete (or in the event of a failure that prevents completion of the operations).

Idempotent Programmatic Interfaces

Some of the types of operations requested by MLS clients may be resource-intensive. For example, ingesting a terabyte-scale data set (e.g., in response to a client request to create a data store) or generating statistics on such a data set may take hours or days, depending on the set of resources deployed and the extent of parallelism used. Given the asynchronous manner in which client requests are handled in at least some embodiments, clients may sometimes end up submitting the same request multiple times. In some cases, such multiple submissions may occur because the client is unaware whether the previous submission was accepted or not (e.g., because the client failed to notice an indication that the previous submission was accepted, or because such an indication was lost). In other cases, a duplicate request may be received because the client has assumed that since the expected results of completing the requested task have not been provided for a long time, the previous request must have failed. If, in response to such a duplicate submission, the MLS actually schedules another potentially large job, resources may be deployed unnecessarily and the client may in some cases be billed twice for a request that was only intended to be serviced once. Accordingly, in order to avoid such problematic scenarios, in at least one embodiment one or more of the programmatic interfaces supported by the MLS may be designed to be idempotent, such that the re-submission of a duplicate request by the same client does not have negative consequences.

Figure 10A:
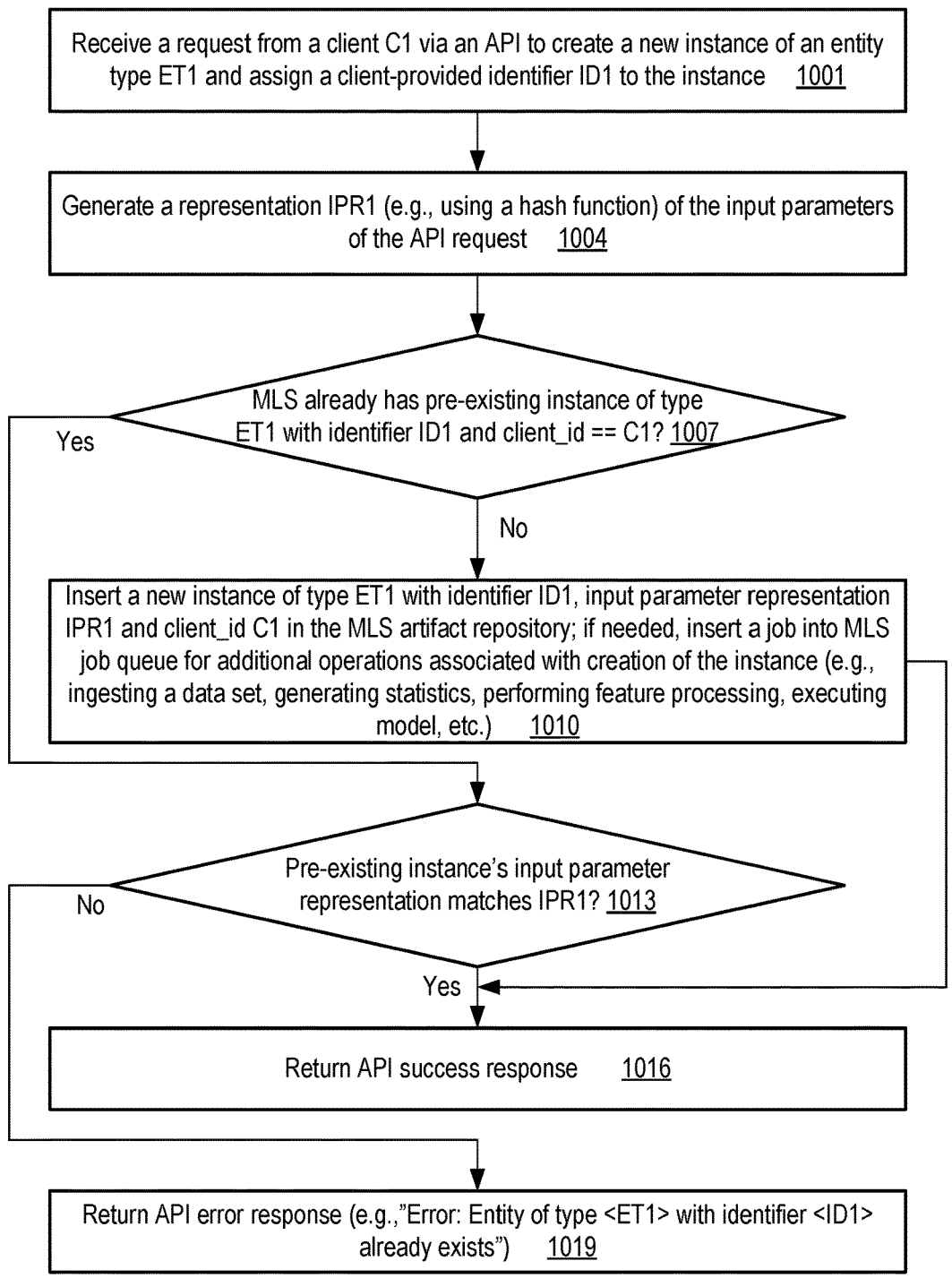
FIG. 10a is a flow diagram illustrating aspects of operations that may be performed at a machine learning service at which a set of idempotent programmatic interfaces are supported, according to at least some embodiments.

FIG. 10a is a flow diagram illustrating aspects of operations that may be performed at a machine learning service at which a set of idempotent programmatic interfaces are supported, according to at least some embodiments. In FIG. 10a, a creation interface (e.g., an API similar to "createDataSource" or "createModel") is used as an example of an idempotent programmatic interface. Although idempotency may be especially useful for programmatic interfaces that involve creation of artifacts such as data sources and models, idempotent interfaces may also be supported for other types of operations (e.g., deletes or executes) in various embodiments. As shown in element 1001, a request to create a new instance of an entity type ET1 may be received from a client C1 at the MLS via a programmatic interface such as a particular API. The request may indicate an identifier ID1, selected by the client, which is to be used for the new instance. In some implementations, the client may be required to specify the instance identifier, and the identifier may be used as described below to detect duplicate requests. (Allowing the client to select the identifier may have the additional advantage that a client may be able to assign a more meaningful name to entity instances than a name assigned by the MLS.) The MLS may generate a representation IPR1 of the input parameters included in the client's invocation of the programmatic interface (element 1004). For example, the set of input parameters may be supplied as input to a selected hash function, and the output of the hash function may be saved as IPR1.

In the embodiment depicted in FIG. 10a, for at least some of the artifacts generated, the MLS repository may store the corresponding instance identifier, input parameter representation, and client identifier (i.e., the identifier of the client that requested the creation of the artifact). The MLS may check, e.g., via a lookup in the artifact repository, whether an instance of entity type ET1, with instance identifier ID and client identifier C1 already exists in the repository. If no such instance is found (as detected in element 1007), a new instance of type ET1 with the identifier ID1, input parameter representation IPR1 and client identifier C1 may be inserted into the repository (element 1007). In addition, depending on the type of the instance, a job object may be added to a job queue to perform additional operations corresponding to the client request, such as reading/ingesting a data set, generating a set of statistics, performing feature processing, executing a model, etc. A success response to the client's request (element 1016) may be generated in the depicted embodiment. (It is noted that the success response may be implicit in some implementations—e.g., the absence of an error message may serve as an implicit indicator of success.)

If, in operations corresponding to element 1007, a pre-existing instance with the same instance identifier ID1 and client identifier C1 is found in the repository, the MLS may check whether the input parameter representation of the pre-existing instance also matches IPR1 (element 1013). If the input parameter representations also match, the MLS may assume that the client's request is a (harmless) duplicate, and no new work needs to be performed. Accordingly, the MLS may also indicate success to the client (either explicitly or implicitly) if such a duplicate request is found (element 1016). Thus, if the client had inadvertently resubmitted the same request, the creation of a new job object and the associated resource usage may be avoided. In some implementations, if the client request is found to be an exact duplicate of an earlier request using the methodology described, an indication may be provided to the client that the request, while not being designated as an error, was in fact identified as a duplicate. If the input parameter representation of the pre-existing instance does not match that of the client's request, an error message may be returned to the client (element 1019), e.g., indicating that there is a pre-existing instance of the same entity type ET1 with the same identifier. In some implementations, instead of requiring the client to submit an identifier, a different approach to duplicate detection may be used, such as the use of a persistent log of client requests, or the use of a signature representing the (request, client) combination.

Best Practices

Figure 10B:
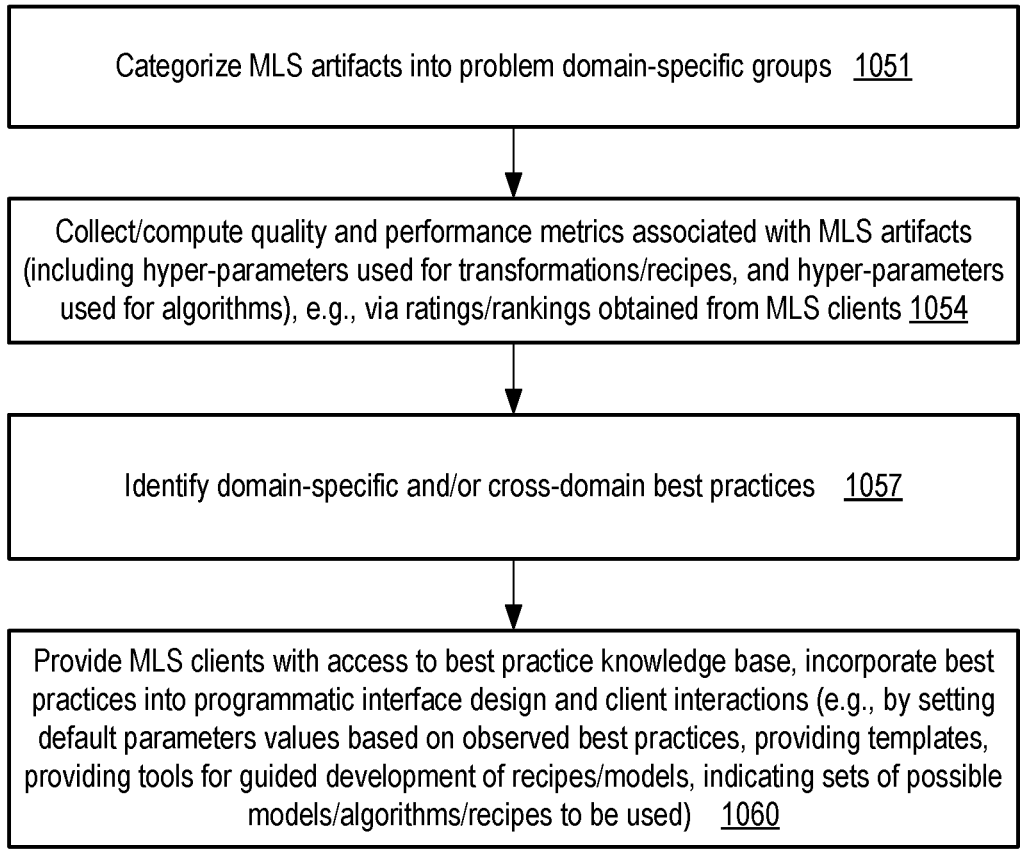
FIG. 10b is a flow diagram illustrating aspects of operations that may be performed at a machine learning service to collect and disseminate information about best practices related to different problem domains, according to at least some embodiments.

One of the advantages of building a machine learning service that may be used by large numbers of customers for a variety of use cases is that it may become possible over time to identify best practices, e.g., with respect to which techniques work best for data cleansing, sampling or sub-set extraction, feature processing, predicting, and so on. FIG. 10b is a flow diagram illustrating aspects of operations that may be performed at a machine learning service to collect and disseminate information about best practices related to different problem domains, according to at least some embodiments. As shown in element 1051, at least some of the artifacts (such as recipes and models) generated at the MLS as a result of client requests may be classified into groups based on problem domains—e.g., some artifacts may be used for financial analysis, others for computer vision applications, others for bioinformatics, and so on. Such classification may be performed based on various factors in different embodiments—e.g. based on the types of algorithms used, the names of input and output variables, customer-provided information, the identities of the customers, and so on.

In some embodiments, the MLS control plane may comprise a set of monitoring agents that collect performance and other metrics from the resources used for the various phases of machine learning operations (element 1054). For example, the amount of processing time it takes to build N trees of a random forest using a server with a CPU rating of C1 and a memory size of M1 may be collected as a metric, or the amount of time it takes to compute a set of statistics as a function of the number of data attributes examined from a data source at a database service may be collected as a metric. The MLS may also collect ratings/rankings or other types of feedback from MLS clients regarding the effectiveness or quality of various approaches or models for the different problem domains. In some embodiments, quantitative measures of model predictive effectiveness such as the area under receiver operating characteristic (ROC) curves for various classifiers may also be collected. In one embodiment, some of the information regarding quality may be deduced or observed implicitly by the MLS instead of being obtained via explicit client feedback, e.g., by keeping track of the set of parameters that are changed during training iterations before a model is finally used for a test data set. In some embodiments, clients may be able to decide whether their interactions with the MLS can be used for best practice knowledge base enhancement or not—e.g., some clients may not wish their customized techniques to become widely used by others, and may therefore opt out of sharing metrics associated with such techniques with the MLS or with other users.

Based on the collected metrics and/or feedback, respective sets of best practices for various phases of machine learning workflows may be identified (element 1057). Some of the best practices may be specific to particular problem domains, while others may be more generally applicable, and may therefore be used across problem domains. Representations or summaries of the best practices identified may be stored in a knowledge base of the MLS. Access (e.g., via a browser or a search tool) to the knowledge base may be provided to MLS users (element 1060). The MLS may also incorporate the best practices into the programmatic interfaces exposed to users—e.g., by introducing new APIs that are more likely to lead users to utilize best practices, by selecting default parameters based on best practices, by changing the order in which parameter choices in a drop-down menu are presented so that the choices associated with best practices become more likely to be selected, and so on. In some embodiments the MLS may provide a variety of tools and/or templates that can help clients to achieve their machine learning goals. For example, a web-based rich text editor or installable integrated development environment (IDE) may be provided by the MLS, which provides templates and development guidance such as automated syntax error correction for recipes, models and the like. In at least one embodiment, the MLS may provide users with candidate models or examples that have proved useful in the past (e.g., for other clients solving similar problems). The MLS may also maintain a history of the operations performed by a client (or by a set of users associated with the same customer account) across multiple interaction sessions in some implementations, enabling a client to easily experiment with or employ artifacts that the same client generated earlier.

Feature Processing Recipes

Figure 11:
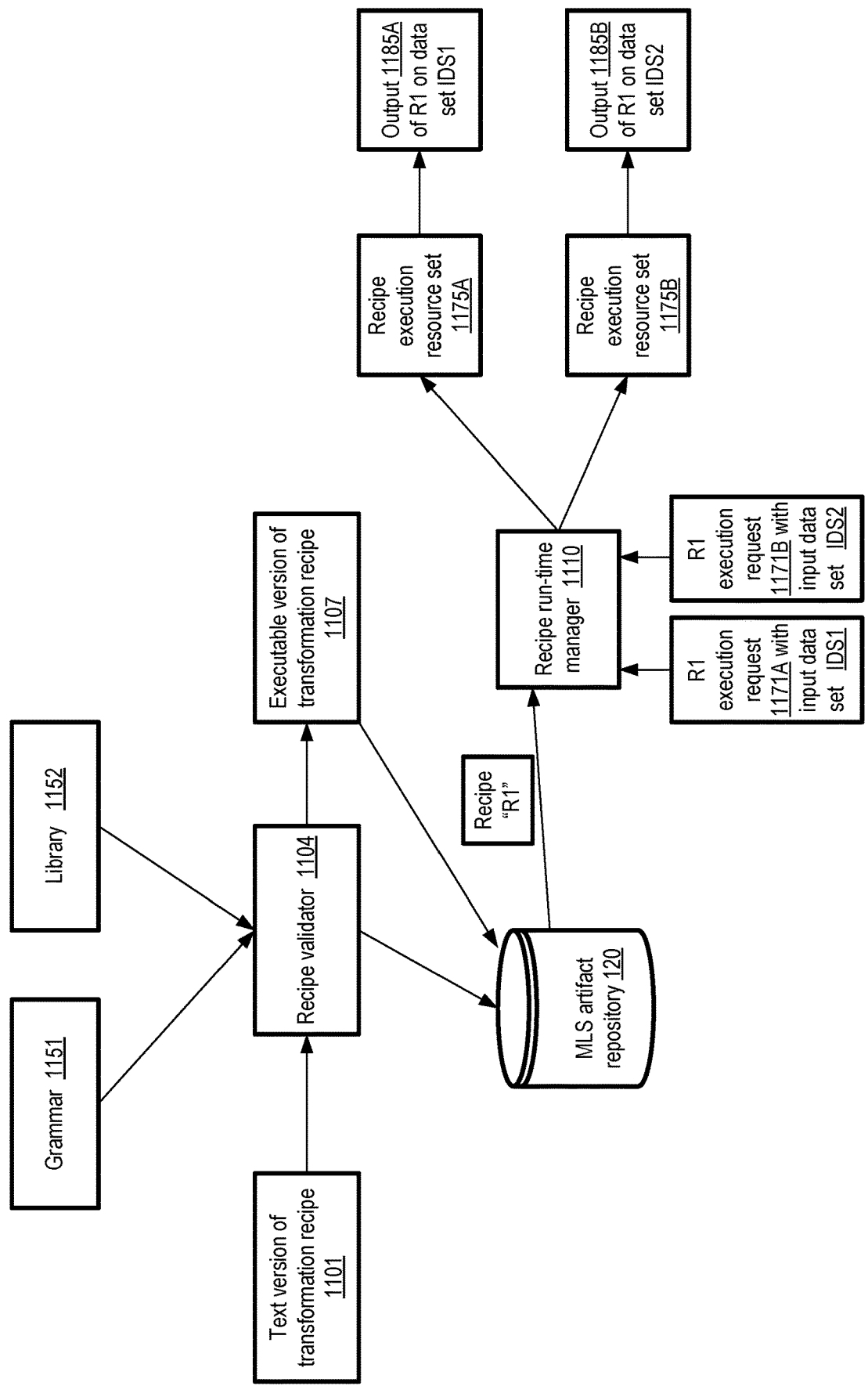
FIG. 11 illustrates examples interactions associated with the use of recipes for data transformations at a machine learning service, according to at least some embodiments.

FIG. 11 illustrates examples interactions associated with the use of recipes for data transformations at a machine learning service, according to at least some embodiments. In the depicted embodiment, a recipe language defined by the MLS enables users to easily and concisely specify transformations to be performed on specified sets of data records to prepare the records for use for model training and prediction. The recipe language may enable users to create customized groups of variables to which one or more transformations are to be applied, define intermediate variables and dependencies upon other artifacts, and so on, as described below in further detail. In one example usage flow, raw data records may first be extracted from a data source (e.g., by input record handlers such as those shown in FIG. 1 with the help of an MLS I/O library), processed in accordance with one or more recipes, and then used as input for training or prediction. In another usage flow, the recipe may itself incorporate the training and/or prediction steps (e.g., a destination model or models may be specified within the recipe). Recipes may be applied either to data records that have already split into training and test subsets, or to the entire data set prior to splitting into training and test subsets. A given recipe may be re-used on several different data sets, potentially for a variety of different machine learning problem domains, in at least some embodiments. The recipe management components of the MLS may enable the generation of easy-to-understand compound models (in which the output of one model may be used as the input for another, or in which iterative predictions can be performed) as well as the sharing and re-use of best practices for data transformations. In at least one embodiment, a pipeline of successive transformations to be performed starting with a given input data set may be indicated within a single recipe. In one embodiment, the MLS may perform parameter optimization for one or more recipes—e.g., the MLS may automatically vary such transformation properties as the sizes of quantile bins or the number of root words to be included in an n-gram in an attempt to identify a more useful set of input variables to be used for a particular machine learning algorithm.

Figure 12:
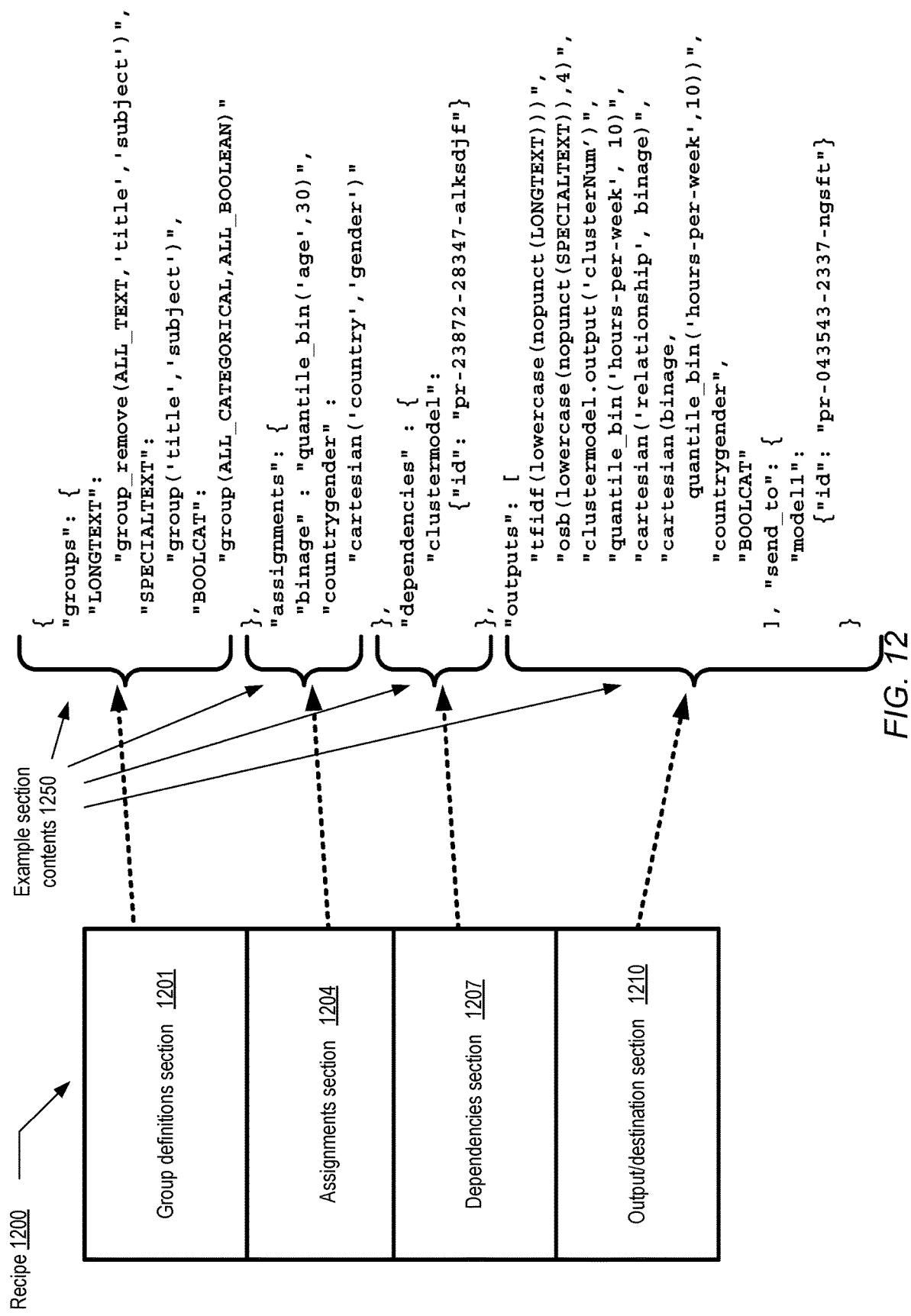
FIG. 12 illustrates example sections of a recipe, according to at least some embodiments.

In some embodiments, a text version 1101 of a transformation recipe may be passed as a parameter in a "createRecipe" MLS API call by a client. As shown, a recipe validator 1104 may check the text version 1101 of the recipe for lexical correctness, e.g., to ensure that it complies with a grammar 1151 defined by the MLS in the depicted embodiment, and that the recipe comprises one or more sections arranged in a predefined order (an example of the expected structure of a recipe is illustrated in FIG. 12 and described below). In at least some embodiments, the version of the recipe received by the MLS need not necessarily be a text version; instead, for example, a pre-processed or partially-combined version (which may in some cases be in a binary format rather than in plain text) may be provided by the client. In one embodiment, the MLS may provide a tool that can be used to prepare recipes—e.g., in the form of a web-based recipe editing tool or a downloadable integrated development environment (IDE). Such a recipe preparation tool may, for example, provide syntax and/or parameter selection guidance, correct syntax errors automatically, and/or perform at least some level of pre-processing on the recipe text on the client side before the recipe (either in text form or binary form) is sent to the MLS service. The recipe may use a number of different transformation functions or methods defined in one or more libraries 1152, such as functions to form Cartesian products of variables, n-grams (for text data), quantile bins (for numeric data variables), and the like. The libraries used for recipe validation may include third-party or client-provided functions or libraries in at least some embodiments, representing custom feature processing extensions that have been incorporated into the MLS to enhance the service's core or natively-supported feature processing capabilities. The recipe validator 1104 may also be responsible for verifying that the functions invoked in the text version 1101 are (a) among the supported functions of the library 1152 and (b) used with the appropriate signatures (e.g., that the input parameters of the functions match the types and sequences of the parameters specified in the library). In some embodiments, MLS customers may register additional functions as part of the library, e.g., so that custom "user-defined functions" (UDFs) can also be included in the recipes. Customers that wish to utilize UDFs may be required to provide an indication of a module that can be used to implement the UDFs (e.g., in the form of source code, executable code, or a reference to a third-party entity from which the source or executable versions of the module can be obtained by the MLS) in some embodiments. A number of different programming languages and/or execution environments may be supported for UDFs in some implementations, e.g., including Java™, Python, and the like. The text version of the recipe may be converted into an executable version 1107 in the depicted embodiment. The recipe validator 1104 may be considered analogous to a compiler for the recipe language, with the text version of the recipe analogous to source code and the executable version analogous to the compiled binary or byte code derived from the source code. The executable version may also be referred to as a feature processing plan in some embodiments. In the depicted embodiment, both the text version 1101 and the executable version 1107 of a recipe may be stored within the MLS artifact repository 120.

A run-time recipe manager 1110 of the MLS may be responsible for the scheduling of recipe executions in some embodiments, e.g., in response to the equivalent of an "executeRecipe" API specifying an input data set. In the depicted embodiment, two execution requests 1171A and 1171B for the same recipe R1 are shown, with respective input data sets IDS1 and IDS2. The input data sets may comprise data records whose variables may include instances of any of a variety of data types, such as, for example text, a numeric data type (e.g., real or integer), Boolean, a binary data type, a categorical data type, an image processing data type, an audio processing data type, a bioinformatics data type, a structured data type such as a particular data type compliant with the Unstructured Information Management Architecture (UIMA), and so on. In each case, the run-time recipe manager 1110 may retrieve (or generate) the executable version of R1, perform a set of run-time validations (e.g., to ensure that the requester is permitted to execute the recipe, that the input data appears to be in the correct or expected format, and so on), and eventually schedule the execution of the transformation operations of R1 at respective resource sets 1175A and 1175B. In at least some cases, the specific libraries or functions to be used for the transformation may be selected based on the data types of the input records—e.g., instances of a particular structured data type may have to be handled using functions or methods of a corresponding library defined for that data type. Respective outputs 1185A and 1185B may be produced by the application of the recipe R1 on IDS1 and IDS2 in the depicted embodiment. Depending on the details of the recipe R1, the outputs 1185A may represent either data that is to be used as input for a model, or a result of a model (such as a prediction or evaluation). In at least some embodiments, a recipe may be applied asynchronously with respect to the execution request—e.g., as described earlier, a job object may be inserted into a job queue in response to the execution request, and the execution may be scheduled later. The execution of a recipe may be dependent on other jobs in some cases—e.g., upon the completion of jobs associated with input record handling (decryption, decompression, splitting of the data set into training and test sets, etc.). In some embodiments, the validation and/or compilation of a text recipe may also or instead be managed using asynchronously-scheduled jobs.

In some embodiments, a client request that specifies a recipe in text format and also includes a request to execute the recipe on a specified data set may be received—that is, the static analysis steps and the execution steps shown in FIG. 11 may not necessarily require separate client requests. In at least some embodiments, a client may simply indicate an existing recipe to be executed on a data set, selected for example from a recipe collection exposed programmatically by the MLS, and may not even have to generate a text version of a recipe. In one embodiment, the recipe management components of the MLS may examine the set of input data variables, and/or the outputs of the transformations indicated in a recipe, automatically identify groups of variables or outputs that may have a higher predictive capability than others, and provide an indication of such groups to the client.

FIG. 12 illustrates example sections of a recipe, according to at least some embodiments. In the depicted embodiment, the text of a recipe 1200 may comprise four separate sections—a group definitions section 1201, an assignments section 1204, a dependencies section 1207, and an output/destination section 1210. In some implementations, only the output/destination section may be mandatory; in other implementations, other combinations of the sections may also or instead be mandatory. In at least one embodiment, if more than one of the four section types shown in FIG. 12 is included in a recipe, the sections may have to be arranged in a specified order. In at least one embodiment, a destination model (i.e., a machine learning model to which the output of the recipe transformations is to be provided) may be indicated in a separate section than the output section.

In the group definitions section 1201, as implied by the name, clients may define groups of input data variables, e.g., to make it easier to indicate further on in the recipe that the same transformation operation is to be applied to all the member variables of a group. In at least some embodiments, the recipe language may define a set of baseline groups, such as ALL_INPUT (comprising all the variables in the input data set), ALL_TEXT (all the text variables in the data set), ALL_NUMERIC (all integer and real valued variables in the data set), ALL_CATEGORICAL (all the categorical variables in the data set) and ALL_BOOLEAN (all the Boolean variables in the data set, e.g., variables that can only have the values "true" or "false" (which may be represented as "1" and "0" respectively in some implementations)). In some embodiments, the recipe language may allow users to change or "cast" the types of some variables when defining groups—e.g., variables that appear to comprise arbitrary text but are only expected to have only a discrete set of values, such as the names of the months of the year, the days of the week, or the states of a country, may be converted to categorical variables instead of being treated as generic text variables. Within the group definitions section, the methods/functions "group" and "group_remove" (or other similar functions representing set operations) may be used to combine or exclude variables when defining new groups. A given group definition may refer to another group definition in at least some embodiments. In the example section contents 1250 shown in FIG. 12, three groups are defined: LONGTEXT, SPECIAL_TEXT and BOOLCAT. LONGTEXT comprises all the text variables in the input data, except for variables called "title" and "subject". SPECIAL_TEXT includes the text variables "subject" and "title". BOOLCAT includes all the Boolean and categorical variables in the input data. It is noted that at least in some embodiments, the example group definitions shown may be applied to any data set, even if the data set does not contain a "subject" variable, a "title" variable, any Boolean variables, any categorical variables, or even any text variables. If there are no text variables in an input data set, for example, both LONGTEXT and SPECIAL_TEXT would be empty groups with no members with respect to that particular input data set in such an embodiment.

Intermediate variables that may be referenced in other sections of the recipe 1200 may be defined in the assignments section 1204. In the example assignments section, a variable called "binage" is defined in terms of a "quantile_bin" function (which is assumed to be included among the pre-defined library functions of the recipe language in the depicted embodiment) applied to an "age" variable in the input data, with a bin count of "30". A variable called "countrygender" is defined as a Cartesian product of two other variables "country" and "gender" of the input data set, with the "cartesian" function assumed to be part of the pre-defined library. In the dependencies section 1207, a user may indicate other artifacts (such as the model referenced as "clustermodel" in the illustrated example, with the MLS artifact identifier "pr-23872-28347-alksdjf") upon which the recipe depends. For example, in some cases, the output of a model that is referenced in the dependencies section of the recipe may be ingested as the input of the recipe, or a portion of the output of the referenced model may be included in the output of the recipe. The dependencies section may, for example, be used by the MLS job scheduler when scheduling recipe-based jobs in the depicted embodiment. Dependencies on any of a variety of artifacts may be indicated in a given recipe in different embodiments, including other recipes, aliases, statistics sets, and so on.

In the example output section 1210, a number of transformations are applied to input data variables, groups of variables, intermediate variables defined in earlier sections of the recipe, or the output of an artifact identified in the dependencies section. The transformed data is provided as input to a different model identified as "model1". A term-frequency-inverse document frequency (tfidf) statistic is obtained for the variables included in the LONGTEXT group, after punctuation is removed (via the "nopunct" function) and the text of the variables is converted to lowercase (by the "lowercase" function). The tfidf measure may be intended to reflect the relative importance of words within a document in a collection or corpus; the tfidf value for a given word typically is proportional to the number of occurrences of the word in a document, offset by the frequency of the word in the collection as a whole. The tfidf, nopunct and lowercase functions are all assumed to be defined in the recipe language's library. Similarly, other transformations indicated in the output section use the osb (orthogonal sparse bigrams) library function, the quantile_bin library function for binning or grouping numeric values, and the Cartesian product function. Some of the outputs indicated in section 1210 may not necessarily involve transformations per se: e.g., the BOOLCAT group's variables in the input data set may simply be included in the output, and the "clusterNum" output variable of "clustermodel" may be included without any change in the output of the recipe as well.

In at least some embodiments, the entries listed in the output section may be used to implicitly discard those input data variables that are not listed. Thus, for example, if the input data set includes a "taxable-income" numeric variable, it may simply be discarded in the illustrated example since it is not directly or indirectly referred to in the output section. The recipe syntax and section-by-section organization shown in FIG. 12 may differ from those of other embodiments. A wide variety of functions and transformation types (at least some of which may differ from the specific examples shown in FIG. 12) may be supported in different embodiments. For example, date/time related functions "dayofweek", "hourofday" "month", etc. may be supported in the recipe language in some embodiments. Mathematical functions such as "sqrt" (square root), "log" (logarithm) and the like may be supported in at least one embodiment. Functions to normalize numeric values (e.g., map values from a range {-N1 to +N2} into a range {0 to 1}), or to fill in missing values (e.g., "replace_missing_with_mean(ALL_NUMERIC)") may be supported in some embodiments. Multiple references within a single expression to one or more previously-defined group variables, intermediate variables, or dependencies may be allowed in one embodiment: e.g., the recipe fragment "replace_missing(ALL_NU-MERIC, mean(ALL_NUMERIC))" may be considered valid. Mathematical expressions involving combinations of variables such as "'income'+10*'capital gains'" may also be permitted within recipes in at least some embodiments. Comments may be indicated by delimiters such as "//" in some recipes.

Recipe Validation

FIG. 13 illustrates an example grammar that may be used to define acceptable recipe syntax, according to at least some embodiments. The grammar shown may be formatted in accordance with the requirements of a parser generator such as a version of ANTLR (ANother Tool for Language Recognition). As shown, the grammar 1320 defines rules for the syntax of expressions used within a recipe. Given a grammar similar to that shown in FIG. 13, a tools such as ANTLR may generate a parser than can build an abstract syntax tree from a text version of a recipe, and the abstract syntax tree may then be converted into a processing plan by the MLS control plane. An example tree generated using the grammar 1320 is shown in FIG. 14.

In the example grammar "MLS-Recipe" shown in FIG. 13, an expression "expr" can be one of a "BAREID", a "QUOTEDID", a "NUMBER" or a "functioncall", with each of the latter four entities defined further down in the grammar. A BAREID starts with an upper case or lower case letter and can include numerals. A QUOTEDID can comprise any text within single quotes. NUMBERs comprise real numeric values with or without exponents, as well as integers. A functioncall must include a function name (a BAREID) followed by zero or more parameters within round brackets. Whitespace and comments are ignored when generating an abstract syntax tree in accordance with the grammar 1320, as indicated by the lines ending in "→skip".

Figure 14:
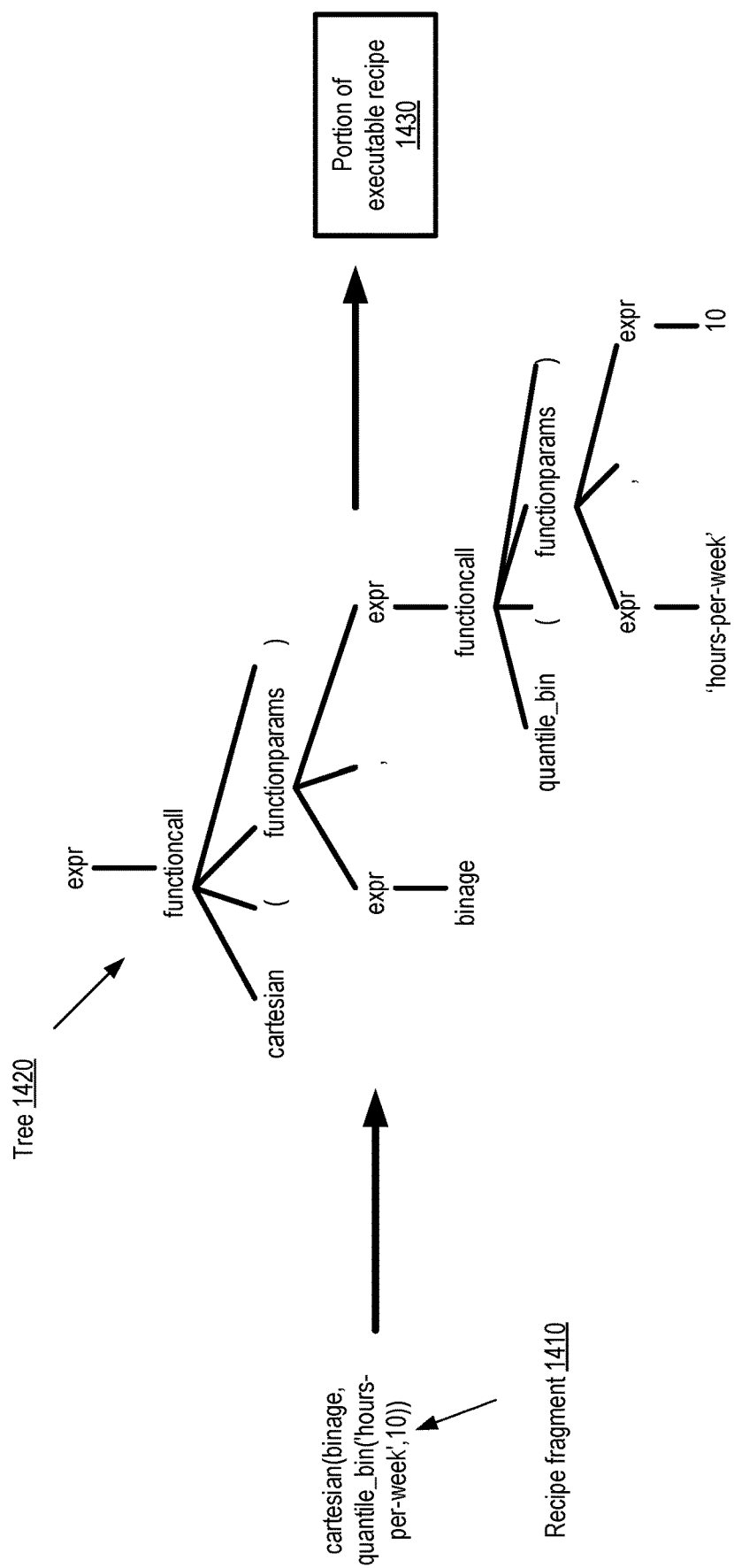
FIG. 14 illustrates an example of an abstract syntax tree that may be generated for a portion of a recipe, according to at least some embodiments.

FIG. 14 illustrates an example of an abstract syntax tree that may be generated for a portion of a recipe, according to at least some embodiments. The example recipe fragment 1410 comprising the text "cartesian(binage, quantile_bin ('hours-per-week', 10))" may be translated into abstract syntax tree 1420 in accordance with grammar 1320 (or some other similar grammar) in the depicted embodiment. As shown, "cartesian" and "quantile_bin" are recognized as function calls, each with two parameters. During the syntax analysis of the illustrated recipe fragment, recipe validator 1104 may ensure that the number and order of the parameters passed to "cartesian" and "quantile_bin" match the definitions of those functions, and that the variables "binage" and "hours_per_week" are defined within the recipe. If any of these conditions are not met, an error message indicating the line number within the recipe at which the "cartesian" fragment is located may be provided to the client that submitted the recipe. Assuming that no validation errors are found in the recipe as a whole, an executable version of the recipe may be generated, of which a portion 1430 may represent the fragment 1410.

Domain-Specific Recipe Collections

Figure 15:
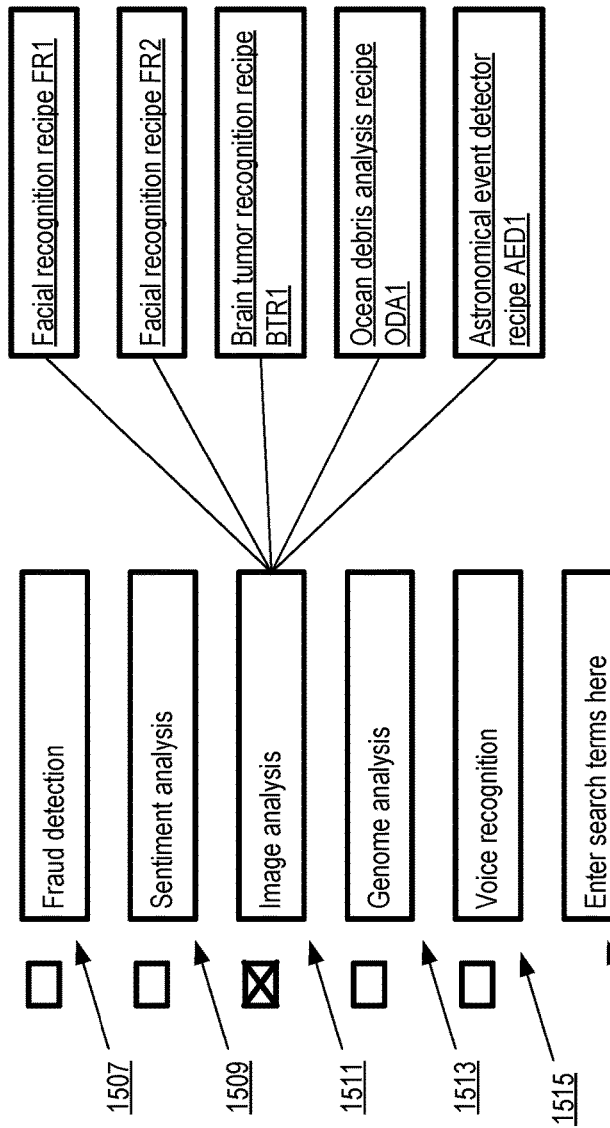
FIG. 15 illustrates an example of a programmatic interface that may be used to search for domain-specific recipes available from a machine learning service, according to at least some embodiments.

In at least some embodiments, some users of the MLS may not be experts at feature processing, at least during a period when they start using the MLS. Accordingly, the MLS may provide users with access to a collection of recipes that have previously been found to be useful in various problem domains. FIG. 15 illustrates an example of a programmatic interface that may be used to search for domain-specific recipes available from a machine learning service, according to at least some embodiments. As shown, a web page 1501 may be implemented for a recipe search, which includes a message area 1504 providing high-level guidance to MLS users, and a number of problem domains for which recipes are available. In the depicted example, a MLS customer can use a check-box to select from among the problem domains fraud detection 1507, sentiment analysis 1509, image analysis 1511, genome analysis 1513, or voice recognition 1515. A user may also search for recipes associated with other problem domains using search term text block 1517 in the depicted web page.

For the selected problem domain (image analysis), links to five example recipes are shown on web page 1501: recipes FR1 and FR2 for facial recognition, BTR1 for brain tumor recognition, ODA1 for ocean debris recognition, and AED1 for astronomical event detection. Additional details regarding a given recipe may be obtained by the user by clicking on the recipe's name: for example, in some embodiments, a description of what the recipe does may be provided, ratings/rankings of the recipe submitted by other users may be provided, comments submitted by other users on the recipes, and so on. If a user finds a recipe that they wish to use (either unchanged or after modifying the recipe), they may be able to download the text version of the recipe, e.g., for inclusion in a subsequent MLS API invocation. As indicated in the message area 1504, users may also be able to submit their own recipes for inclusion in the collection exposed by the MLS in the depicted embodiment. In at least some implementations, the MLS may perform some set of validation steps on a submitted recipe (e.g., by checking that the recipe produces meaningful output for various input data sets) before allowing other users access.

Automated Parameter Tuning for Recipe Transformations

Figure 16:
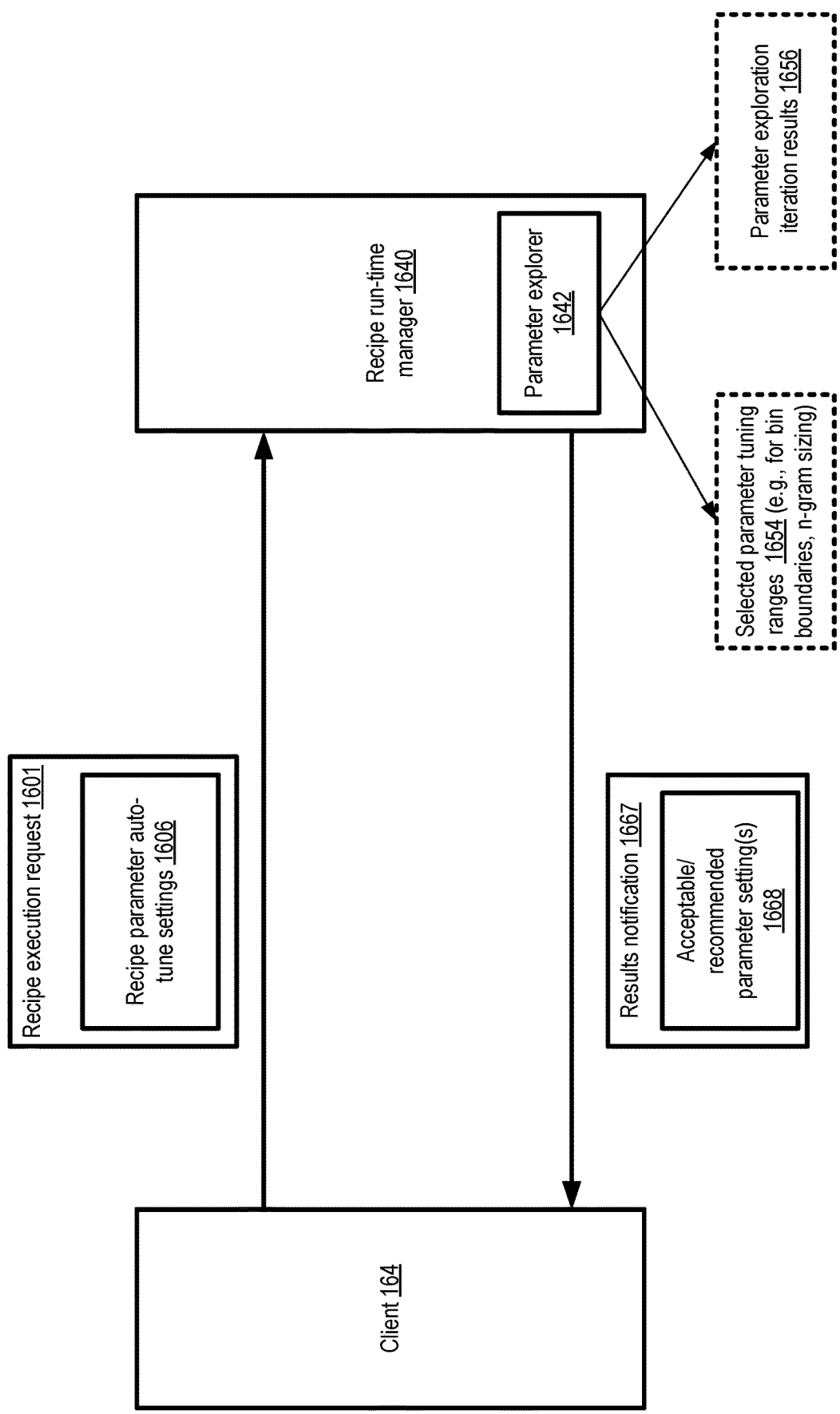
FIG. 16 illustrates an example of a machine learning service that automatically explores a range of parameter settings for recipe transformations on behalf of a client, and selects acceptable or recommended parameter settings based on results of such explorations, according to at least some embodiments.

For many types of feature processing transformation operations, such as creating quantile bins for numeric data attributes, generating ngrams, or removing sparse or infrequent words from documents being analyzed, parameters may typically have to be selected, such as the sizes/boundaries of the bins, the lengths of the ngrams, the removal criteria for sparse words, and so on. The values of such parameters (which may also be referred to as hyper-parameters in some environments) may have a significant impact on the predictions that are made using the recipe outputs. Instead of requiring MLS users to manually submit requests for each parameter setting or each combination of parameter settings, in some embodiments the MLS may support automated parameter exploration. FIG. 16 illustrates an example of a machine learning service that automatically explores a range of parameter settings for recipe transformations on behalf of a client, and selects acceptable or recommended parameter settings based on results of such explorations, according to at least some embodiments.

In the depicted embodiment, an MLS client 164 may submit a recipe execution request 1601 that includes parameter auto-tune settings 1606. For example, the client 164 may indicate that the bin sizes/boundaries for quantile binning of one or more variables in the input data should be chosen by the service, or that the number of words in an n-gram should be chosen by the service. Parameter exploration and/or auto-tuning may be requested for various clustering-related parameters in some embodiments, such as the number of clusters into which a given data set should be classified, the cluster boundary thresholds (e.g., how far apart two geographical locations can be to be considered part of a set of "nearby" locations), and so on. Various types of image processing parameter settings may be candidates for automated tuning in some embodiments, such as the extent to which a given image should be cropped, rotated, or scaled during feature processing. Automated parameter exploration may also be used for selection dimensionality values for a vector representation of a text document (e.g., in accordance with the Latent Dirichlet Allocation (LDA) technique) or other natural language processing techniques. In some cases, the client may also indicate the criteria to be used to terminate exploration of the parameter value space, e.g., to arrive at acceptable parameter values. In at least some embodiments, the client may be given the option of letting the MLS decide the acceptance criteria to be used— such an option may be particularly useful for non-expert users. In one implementation, the client may indicate limits on resources or execution time for parameter exploration. In at least one implementation, the default setting for an auto-tune setting for at least some output transformations may be "true", e.g., a client may have to explicitly indicate that auto-tuning is not to be performed in order to prevent the MLS from exploring the parameter space for the transformations.

In response to a determination that auto-tuning is to be performed for a given transformation operation, the MLS (e.g., a parameter explorer 1642 of the recipe run-time manager 1640) may select a parameter tuning range 1654 for the transformation (e.g., whether the quantile bin counts of 10, 20, 30 and 40 should be explored for a particular numeric variable). The parameter ranges may be selected based on a variety of factors in different embodiments, including best practices known to the MLS for similar transformations, resource constraints, the size of the input data set, and so on. In scenarios in which respective parameters for combinations of several transformation operations are to be tuned (e.g., if quantile binning is being auto-tuned for more than one variable), the parameter explorer 1642 may select a respective set of values for each parameter so as to keep the number of combinations that are to be tried below a threshold. Having determined the range of parameter values, the parameter explorer may execute iterations of transformations for each parameter value or combination, storing the iteration results 1656 in at least some implementations in temporary storage. Based on the result sets generated for the different parameter values and the optimization criteria being used, at least one parameter value may be identified as acceptable for each parameter. In the depicted embodiment, a results notification 1667 may be provided to the client, indicating the accepted or recommended parameter value or values 1668 for the different parameters being auto-tuned. For some parameters, it may not always be straightforward to identify a particular parameter value as being the single best value, e.g., because several different values may lead to similar results. In some embodiments, instead of identifying a single optimal value for such a parameter, the MLS may instead identify a set of candidate values {V1, V2, V3, . . . , Vn} for a given parameter P, such that all the values of the set provide results of similar quality. The set of candidate values may be provided to the client, enabling the client to choose the specific parameter value to be used, and the client may notify the MLS regarding the selected parameter value. In one embodiment, the client may only be provided with an indication of the results of the recipe transformations obtained using the accepted/optimized parameter values, without necessarily being informed about the parameter value settings used.

Methods of Supporting Feature Processing Via Re-Usable Recipes

Figure 17:
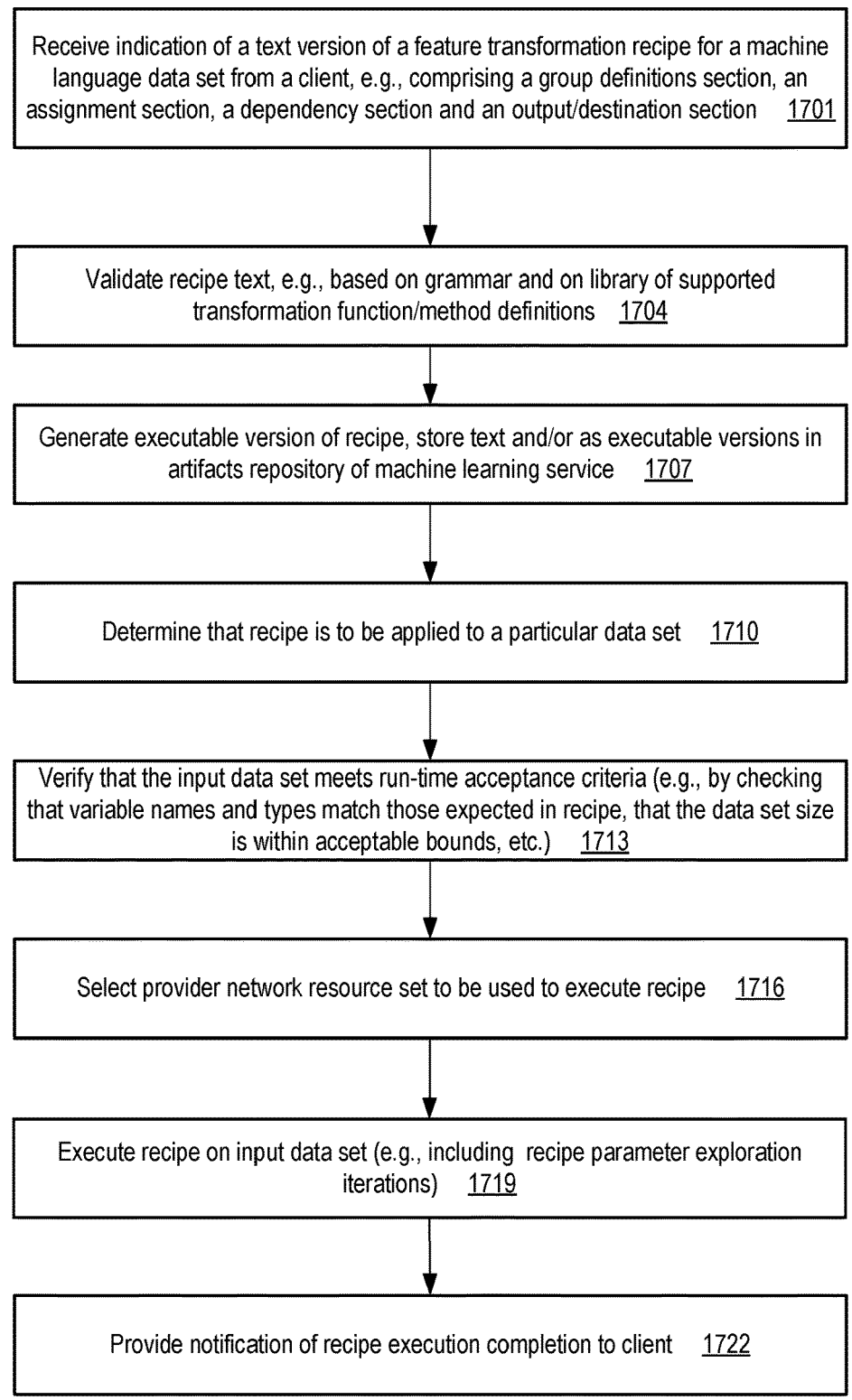
FIG. 17 is a flow diagram illustrating aspects of operations that may be performed at a machine learning service that supports re-usable recipes for data set transformations, according to at least some embodiments.

FIG. 17 is a flow diagram illustrating aspects of operations that may be performed at a machine learning service that supports re-usable recipes for data set transformations, according to at least some embodiments. As shown in element 1701, an indication of a text version of a recipe for transformation operations to be performed on input data sets may be received at a network-accessible MLS implemented at a provider network. In one embodiment, the recipe text may include one or more of four sections in accordance with a recipe language defined by the MLS: a group definitions section, an assignment section, a dependency section, and an output/destination section (which may also be referred to simply as the output section). In some embodiments, one or more sections (such as the output section) may be mandatory. In general, the output/destination section may indicate various feature processing transformation operations that are to be performed on entities defined in other sections of the recipe, or directly on input variables of a data set. The group definitions section may be used to define custom groups of input variables (or input data variables combined with other groups, or groups derived from other groups). Such group definitions may make it easier to specify in the output section that a common transformation is to be applied to several variables. A number of built-in or predefined groups may be supported by the recipe language in some embodiments, such as ALL_NUMERIC or ALL_CATEGORICAL, along with functions such as "group_remove" and "group" to allow recipe creators to easily indicate variable exclusions and combinations to be used when defining new groups. The assignment section may be used to define one or more intermediate variables that can be used elsewhere in the recipe. The dependency section may indicate that the recipe depends on another machine learning artifact (such as a model, or another recipe) or on multiple other artifacts stored in an MLS's repository. In some embodiments, the output section may indicate not just the specific transformations to be applied to specified input variables, defined groups, intermediate variables or output of the artifacts indicated in the dependency section, but also the destination models to which the transformation results are to be provided as input.

The machine learning service may natively support libraries comprising a variety of different transformation operations that can be used in the recipe's output section, such as the types of functions illustrated in FIG. 12. In some embodiments, several different libraries, each corresponding to a given problem domain or to a respective class of machine learning algorithm, may be supported by the MLS. In addition, in one embodiment MLS customers may be able to register their own custom functions (called "user-defined functions" or UDFs), third-party functions, or libraries comprising multiple UDFs or third-party functions with the MLS to extend the core feature processing capabilities of the MLS. UDFs may be provided to the MLS by clients in a variety of different formats (e.g., including one or more text formats and/or one or more binary formats) in some embodiments. A number of different programming or scripting languages may be supported for UDFs in such embodiments. An API for registering externally-produced transformation functions or libraries with the MLS may be supported in some embodiments, e.g., enabling a client to indicate whether the newly-registered functions are to be made accessible to other clients or restricted for use by the submitting client. In one implementation, a recipe may comprise an import section in which one or more libraries (e.g., libraries other than a core or standard library of the MLS) whose functions are used in the recipe may be listed. In some implementations, the MLS may impose resource usage restrictions on at least some UDFs—e.g., to prevent runaway consumption of CPU time, memory, disk space and the like, a maximum limit may be set on the time that a given UDF can run. In this way, the negative consequences of executing potentially error-prone UDFs (e.g., a UDF whose logic comprises an infinite loop under certain conditions) may be limited. In at least some embodiments, the recipe text (or a file or URL from which the recipe text can be read) may be passed as a parameter in an API (such as a "createRecipe" API) invoked by an MLS client.

The recipe text may be validated at the MLS, e.g., in accordance with a set of syntax rules of a grammar and a set of libraries that define supported transformation methods or functions (element 1704). If syntax errors or unresolvable tokens are identified during the text validation checks, in at least some embodiments error messages that indicate the portion of the text that needs to be corrected (e.g., by indicating the line number and/or the error-inducing tokens) may be provided to the recipe submitter. If no errors are found, or after the errors found are corrected and the recipe is re-submitted, an executable version of the recipe text may be generated (element 1707). One or both versions of the recipe (the text version and the executable version) may be stored in an artifact repository of the MLS in the depicted embodiment, e.g., with a unique recipe identifier generated by the MLS being provided to the recipe submitter.

The MLS may determine, e.g., in response to a different API invocation or because the initial submission of the recipe included an execution request, that the recipe is to be applied to a particular data set (element 1710). The data set may be checked to ensure that it meets run-time acceptance criteria, e.g., that the input variable names and data types match those indicated in the recipe, and that the data set is of an acceptable size (element 1713). A set of provider network resources (e.g., one or more compute servers, configured with appropriate amounts of storage and/or network capacity as determined by the MLS) may be identified for the recipe execution (element 1716). The transformations indicated in the recipe may then be applied to the input data set (element 1719). In some embodiments, as described above with respect to FIG. 16, the MLS may perform parameter explorations in an effort to identify acceptable parameter values for one or more of the transformations. After the recipe transformations are completed (and/or the results of the transformations are provided to the appropriate destinations, such as a model specified in the recipe itself), a notification that the recipe's execution is complete may be provided to the client that requested the execution (element 1722) in the depicted embodiment.

I/O-Efficient Input Data Filtering Sequences

As mentioned earlier, some machine learning input data sets can be much larger (e.g., on the order of terabytes) than the amount of memory that may be available at any given server of a machine learning service. In order to train and evaluate a model, a number of filtering or input record rearrangement operations may sometimes have to be performed in a sequence on an input data set. For example, for cross-validating a classification model, the same input data set may have to be split into training and test data sets multiple times, and such split operations may be considered one example of input filtering. Other input filtering operation types may include sampling (obtaining a subset of the data set), shuffling (rearranging the order of the input data objects), or partitioning for parallelism (e.g., dividing a data set into N subsets for a computation implemented using map-reduce or a similar parallel computing paradigm, or for performing multiple parallel training operations for a model). If a data set that takes up several terabytes of space were to be read from and/or written to persistent storage for each filtering operation (such as successive shuffles or splits), the time taken for just the I/O operations alone may become prohibitive, especially if a large fraction of the I/O comprised random reads of individual observation records of the input data set from rotating disk-based storage devices.

Accordingly, in some embodiments, a technique of mapping large data sets into smaller contiguous chunks that are read once into some number of servers' memories, and then performing sequences of chunk-level filtering operations in place without copying the data set to persistent storage between successive filtering operations may be implemented at a machine learning service. In at least one such embodiment, an I/O library may be implemented by the machine learning service, enabling a client to specify, via a single invocation of a data-source-agnostic API, a variety of input filtering operations to be performed on a specified data set. Such a library may be especially useful in scenarios in which the input data sets comprise varying-length observation records stored in files within file system directories rather than in structured database objects such as tables, although the chunking and in-memory filtering technique described below may in general be performed for any of a variety of data source types (including databases) as described below. The I/O library may allow clients to indicate data sources of various types (e.g., single-host file systems, distributed file systems, storage services of implemented at a provider network, non-relational databases, relational databases, and so on), and may be considered data-source-agnostic in that the same types of filtering operations may be supported regardless of the type of data source being used. In some cases, respective subsets of a given input data set may be stored in different types of data sources. In various embodiments, the I/O library may support APIs for operations at several granularity levels, including for example chunk-level granularity, observation record-level granularity, storage object level granularity (e.g., file or database table level granularity) or some combination of chunk-level, record-level or storage object-level granularities. For some data sets (e.g., data sets in which observation records located near to each other in a file or table tend to be more highly correlated than records located further apart in the data objects) record-level filtering operations may lead to better results than chunk-level operations, as discussed below in further detail.

Figure 18:
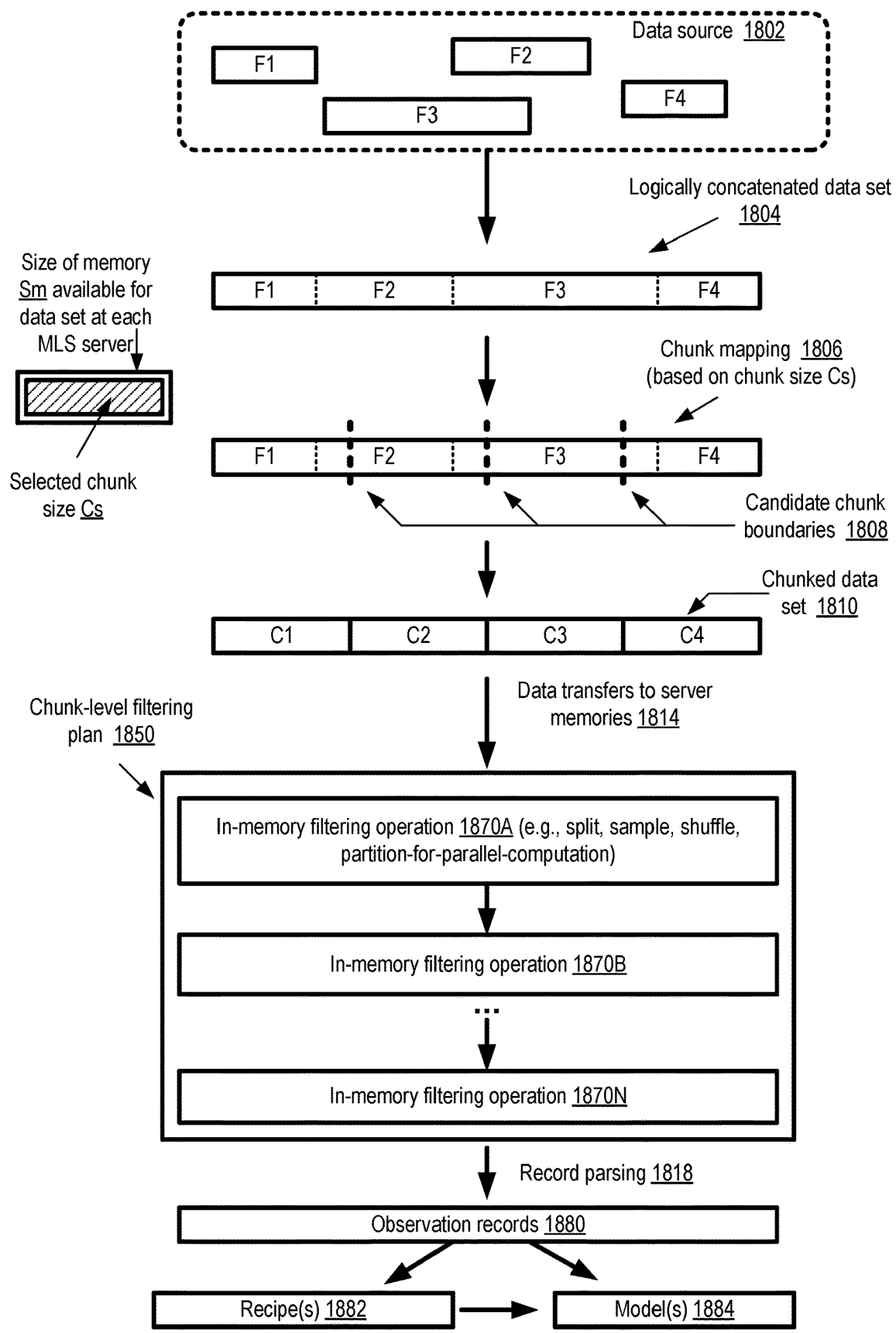
FIG. 18 illustrates an example procedure for performing efficient in-memory filtering operations on a large input data set by a machine learning service, according to at least some embodiments.

FIG. 18 illustrates an example procedure for performing efficient in-memory filtering operations on a large input data set by a machine learning service (MLS), according to at least some embodiments. As shown, a data source 1802 from which a client of the machine learning service wishes to extract observation records may comprise a plurality of data objects such as files F1, F2, F3 and F4 in the depicted embodiment. The sizes of the files may differ, and/or the number of observation records in any given file may differ from the number of observation records in other files. As used herein, the term "observation record" may be used synonymously with the term "data record" when referring to input data for machine learning operations. A data record extraction request submitted by the client may indicate the data source 1802, e.g., by referring to locations (e.g., a directory name or a set of URLs) of files F1, F2, F3 and F4. In response to the extraction request, the MLS may ascertain or estimate the size of the data set as a whole (e.g., the combined size of the files) in the depicted embodiment, and determine an order in which the files should be logically concatenated to form a unified address space. In the example shown, data set 1804 may be generated, for example, by logically concatenating the files in the order F1, F2, F3 and F4. In some embodiments, the client's data record extraction request may specify the order in which the files of a multi-file data set are to be combined (at least initially), and/or the sizes of the files. In other embodiments, the MLS may determine the concatenation order (e.g., based on any combination of various factors such as lexical ordering of the file names, the sizes of the files, and so on). It is noted that although files are used as an example of the data objects in which observation records are stored in FIG. 18 and some subsequent figures, similar techniques for input filtering may be used regardless of the type of the data objects used (e.g., volumes providing a block-level interface, database records, etc.) in various embodiments.

The concatenated address space of data set 1804 may then be sub-divided into a plurality of contiguous chunks, as indicated in chunk mapping 1806. The size of a chunk (Cs) may be determined based on any of several factors in different embodiments. For example, in one embodiment, the chunk size may be set such that each chunk can fit into the memory of an MLS server (e.g., a server of pools 185 of FIG. 1) at which at least a portion of the response to the client's data record extraction request is to be generated. Consider a simple scenario in which the memory portions available for the data records at each of several MLS servers is Sm. In such a scenario, a chunk size Cs such that Cs is less than or equal to Sm may be selected, as shown in FIG. 18. In other embodiments, the client request may indicate a chunk sizing preference, or the MLS may define a default chunk size to be used even if different servers have different amounts of memory available for the data records. In some embodiments, the chunk size to be used for responding to one record extraction request may differ from that used for another record extraction request; in other embodiments, the same chunk size may be used for a plurality of requests, or for all requests. The sub-division of the concatenated data set 1804 into contiguous chunks (rather than, for example, randomly selected sub-portions) may increase the fraction of the data set that can be read in via more efficient sequential reads than the fraction that has to be read via random reads, as illustrated below with respect to FIG. 19. In some embodiments, different chunks of a given chunk mapping may have different sizes—e.g., chunk sizes need not necessarily be identical for all the chunks of a given data set. It is noted that the initial sub-division of the data set into chunks represents a logical operation that may be performed prior to physical I/O operations on the data set.

In the depicted embodiment, an initial set of candidate chunk boundaries 1808 may be determined, e.g., based on the chunk sizes being used. As shown, candidate chunk boundaries need not be aligned with file boundaries in at least some embodiments. The candidate chunk boundaries may have to be modified somewhat to align chunk boundaries with observation record boundaries in at least some embodiments when the chunks are eventually read, as described below in greater detail with reference to FIG. 22. A chunk-level filtering plan 1850 may be generated for the chunked data set 1810 in some embodiments, e.g., based on contents of a filtering descriptor (which may also be referred to as a retrieval descriptor) included in the client's request. The chunk-level filtering plan may indicate, for example, the sequence in which a plurality of in-memory filtering operations 1870 (e.g., 1870A, 1870B and 1870N) such as shuffles, splits, samples, or partitioning for parallel computations such as map reduce are to be performed on the chunks of the input data. In some embodiments the machine learning model may support parallelized training of models, in which for example respective (and potentially partially overlapping) subsets of an input data set may be used to train a given model in parallel. The duration of one training operation may overlap at least partly with the duration of another in such a scenario, and the input data set may be partitioned for the parallel training sessions using a chunk-level filtering operation. A chunk-level shuffle, for example, may involve rearranging the relative order of the chunks, without necessarily rearranging the relative order of observation records within a given chunk. Examples of various types of chunk-level filtering operations are described below.

In at least some embodiments, the client may not necessarily be aware that at least some of the filtering operations will be performed on chunks of the data set rather than at the granularity of individual data records. In the depicted embodiment, data transfers 1814 of the contents of the chunks (e.g., the observation records respectively included within C1, C2, C3 and C4) may be performed to load the data set into the memories of one or more MLS servers in accordance with the first filtering operation of the sequence. To implement the first in-memory filtering operation of the sequence, for example, a set of reads directed to one or more persistent storage devices at which least some of the chunks are stored may be executed. De-compression and/or decryption may also be required in some embodiments, e.g., prior to one or more operations of the sequence of filtering operations 1870. For example, if the data is stored in compressed form at the persistent storage devices, it may be de-compressed in accordance with de-compression instructions/metadata provided by the client or determined by the MLS. Similarly, if the source data is encrypted, the MLS may decrypt the data (e.g., using keys or credentials provided or indicated by the client).

After the set of reads (and/or the set of associated de-compression/decryption operations) is completed, at least a subset of the chunks C1-C4 may be present in MLS server memories. (If the first filtering operation of the sequence involves generating a sample, for example, not all the chunks may even have to be read in.) The remaining filtering operations of plan 1850 may be performed in place in the MLS server memories, e.g., without copying the contents of any of the chunks to persistent storage in the depicted embodiment, and/or without re-reading the content of any of the chunks from the source data location. For example, the in-memory results of the first filtering operation may serve as the input data set for the second filtering operation, the in-memory results of the second filtering operation may serve as the input data set for the third filtering operation, and so on. In the depicted embodiment, the final output of the sequence of filtering operations may be used as input for record parsing 1818 (i.e., determining the content of various variables of the observation records). The observation records 1880 generated as a result of parsing may then be provided as input to one or more destinations, e.g., to model(s) 1884 and/or feature processing recipe(s) 1882. Thus, in the depicted embodiment, only a single pass of physical read operations may be required to implement numerous different filtering operations, which may result in a substantial input processing speedup compared to scenarios in which the data set is copied to persistent storage (or re-read) for each successive filtering operation. Of course, although multiple chunk-level and/or observation-record-level operations may be performed in memory without accessing persistent storage, the results of any such operation may be stored to persistent storage if necessary, e.g., so that the results may be re-used later for another job. Thus, although avoiding frequent and potentially time-consuming I/O operations to disk-based or other persistent storage devices is made easier by the technique described above, I/O to persistent storage may still be performed at any stage as and when necessary based on an application's requirements.

By performing filtering operations such as shuffling or sampling at the chunk level as described above, random physical read operations directed to individual data records may be avoided. Consider a scenario in which the input data set is to be shuffled (e.g., to cross-validate a classification model), the shuffling is performed at the chunk level with a chunk size of one megabyte, the data records of the data set have an average size of one kilobyte, and neither de-compression nor decryption is required. If the original data set was 1000 megabytes in size, in any given iteration of random shuffling, the order in which 1000 chunks are logically arranged may be changed. However, the order of the data records within any given chunk would not change in a chunk-level shuffle operation. As a result, all the data records that lie within a particular chunk (e.g., Chunk654 out of the 1000 chunks) would be provided as a group to train a model using the results of the shuffling. If the records within Chunk654 are not randomly distributed with respect to an input variable V1 of interest, the chunk-level shuffle may not end up being as good with respect to randomizing the values of V1 for training purposes as, for example, a record-level shuffle would have been. Thus, at least in some scenarios there may be some loss of statistical quality or predictive accuracy as a result of performing filtering at the chunk level rather than the data record level. However, in most cases the loss of quality/accuracy may be kept within reasonable bounds by choosing chunk sizes appropriately. Also, in at least some embodiments, clients may opt for record-level operations such as sort-based record-level shuffling discussed below in further detail, or for hybrid algorithms that involve both chunk-level and record-level filtering.

FIG. 19 illustrates tradeoffs associated with varying the chunk size used for filtering operation sequences on machine learning data sets, according to at least some embodiments. Read operations corresponding to two example chunk mappings are shown for a given data set DS1 in FIG. 19. To simplify the presentation, data set DS1 is assumed to be stored on a single disk, such that a disk read head has to be positioned at a specified offset in order to start a read operation (either a random read or a set of sequential reads) on DS1. In chunk mapping 1904A, a chunk size of S1 is used, and DS1 is consequently subdivided into four contiguous chunks starting at offsets O1, O2, O3 and O4 within the data set address space. (It is noted that the number of chunks in the example mappings shown in FIG. 19 and in subsequent figures has been kept trivially small to illustrate the concepts being described; in practice, a data set may comprise hundreds or thousands of chunks.) In order to read the four chunks, a total of (at least) four read head positioning operations (RHPs) would have to be performed. After positioning a disk read head at offset O1, for example, the first chunk comprising the contents of DS1 with offsets between P1 and O2 may be read in sequentially. This sequential read (SR1) or set of sequential reads may typically be fast relative to random reads, because the disk read head may not have to be repositioned during the sequential reads, and disk read head positioning (also known as "seeking") may often take several milliseconds, which may be of the same order of magnitude as the time taken to sequentially read several megabytes of data. Thus, with the chunk size of S1, reading the entire data set DS1 as mapped to four chunks may involve a read operations mix 1910A that includes four slow RHPs (RHP1-RHP4) and four fast sequential reads (SR1-SR4).

Instead of using a chunk size of S, if a chunk size of 2S (twice the size used for mapping 1904A) were used, as in mapping 1904B, only two RHPs would be required (one to offset O1 and one to offset O3) as indicated in read operations mix 1910B, and the data set could be read in via two sequential read sequences SR1 and SR2. Thus, the number of slow operations required to read DS1 would be reduced in inverse proportion to the chunk size used. On the X-axis of tradeoff graph 1990, chunk size increases from left to right, and on the Y-axis, the change in various metrics that results from the chunk size change is illustrated. In general, increasing the chunk size would tend to decrease the total read time (TRT) for transferring large data sets into memory. Even if the reads of different chunks could be performed in parallel, increasing the fraction of the data that is read sequentially would in general tend to decrease total read time. Increasing the chunk size may in general require more memory at the MLS servers to hold the chunk contents, as indicated by the per-server memory requirement (MR) curve shown in graph 1990. Finally, as discussed above, for at least some types of machine learning problems, increased chunk sizes may lead to a slightly worse quality of statistics (QS) or slightly worse predictive accuracy of machine learning models. This may occur because the records within a given chunk may not be filtered with respect to records in the entire data set (or with respect to each other) in the same way that the chunks are filtered with respect to each other. In scenarios in which the MLS is able to select a chunk size, therefore, the tradeoffs illustrated in graph 1990 between total read time, memory requirements and statistical quality may have to be considered. In practice, depending on the size of the chunks relative to the entire data set, the loss of statistical quality resulting from using larger chunks may be fairly small.

In at least some embodiments, there need not be a 1:1 relationship between chunks and MLS servers—e.g., a given MLS server may be configurable to store multiple chunks of a data set. In some embodiments, partial chunks or subsets of chunks may also be stored at an MLS server—e.g., the number of chunks stored in a given server's memory need not be an integer. In various embodiments, in addition to chunk-level filtering operations, intra-chunk and/or cross-chunk filtering operations (e.g., at the observation record level) may be performed as described below in further detail, which may help to further reduce the loss of statistical quality. It is noted that the curves shown in graph 1990 are intended to illustrate broad qualitative relationships, not exact mathematical relationships. The rate at which the different metrics change with respect to chunk size may differ from that shown in the graph, and the actual relationships may not necessarily be representable by smooth curves or lines as shown.

Figure 20A:
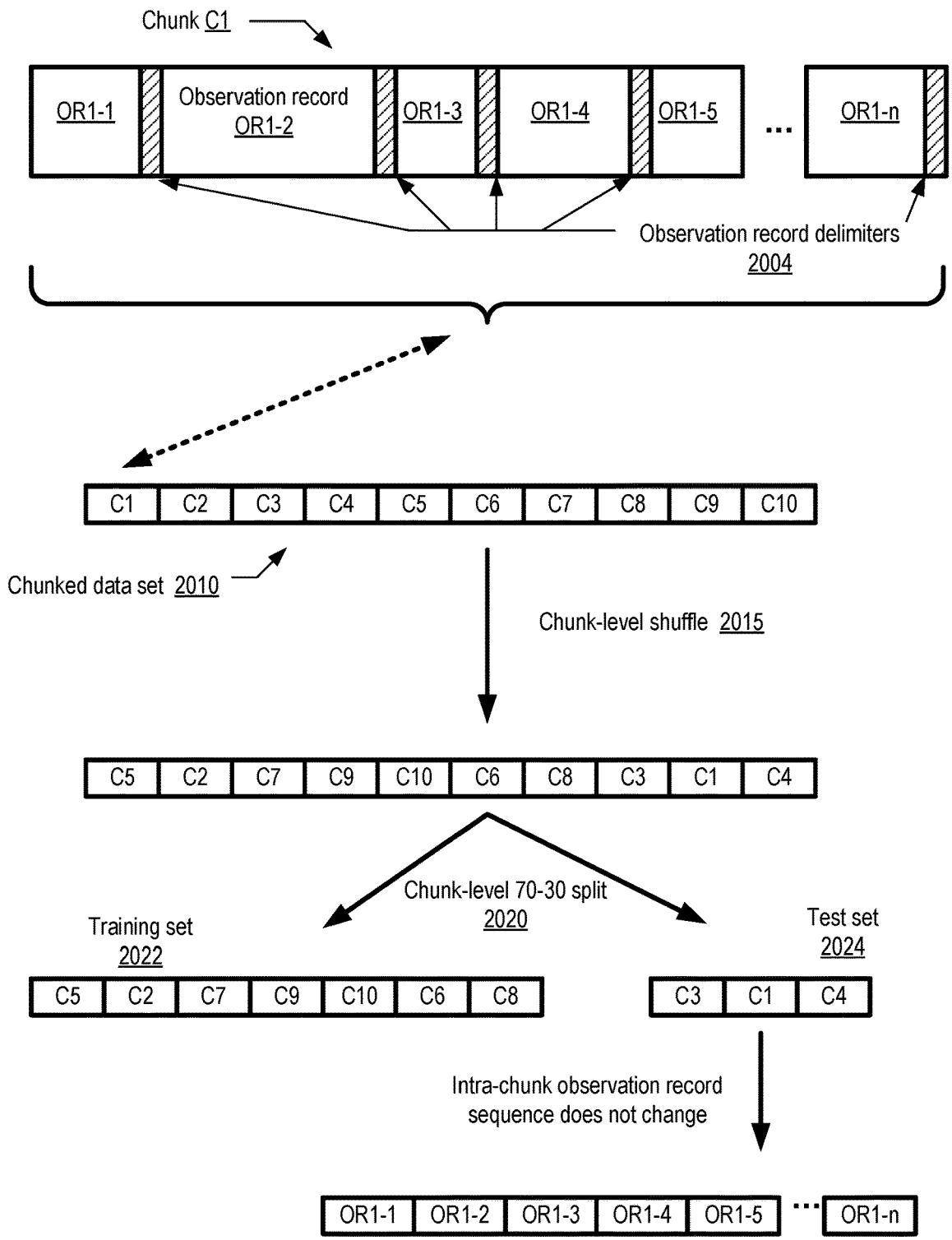
FIG. 20a illustrates an example sequence of chunk-level filtering operations, including a shuffle followed by a split, according to at least some embodiments.

FIG. 20a illustrates an example sequence of chunk-level filtering operations, including a shuffle followed by a split, according to at least some embodiments. As shown, a chunked data set 2010 comprises ten chunks C1-C10. A detailed view of chunk C1 at the top of FIG. 20a shows its constituent observation records OR1-1 through OR1-$n$, with successive observation records being separated by delimiters 2004. As shown, the observation records of a data set or a chunk need not be of the same size. In a chunk-level shuffle operation 2015, which may be one of the in-memory chunk-level filtering operations of a plan 1850, the chunks are re-ordered. After the shuffle, the chunk order may be C5-C2-C7-C9-C10-C6-C8-C3-C1-C4. In a subsequent chunk-level split operation 2020, 70% of the chunks (e.g., C5-C2-C7-C9-C10-C6-C8) may be placed in training set 2022, while 30% of the chunks (C3-C1-C4) may be placed in a test set 2024 in the depicted example. As the shuffle was performed at the chunk level, the internal ordering of the observation records within a given chunk remains unchanged in the depicted example. Thus, the observation records of chunk C1 are in the same relative order (OR1-1, OR1-2, . . . , OR1-$n$) after the shuffle and split as they were before the shuffle and split filtering operations were performed. It is noted that for at least some types of filtering operations, in addition to avoiding copies to persistent storage, the chunk contents may not even have to be moved from one memory location to another in the depicted embodiment. For example, instead of physically re-ordering the chunks from C1-C2-C3-C4-C5-C6-C7-C8-C9-C10 to C5-C2-C7-C9-C10-C6-C8-C3-C1-C4 during the shuffle, pointers to the chunks may be modified, such that the pointer that indicates the first chunk points to C5 instead of C1 after the shuffle, and so on.

Figure 20B:
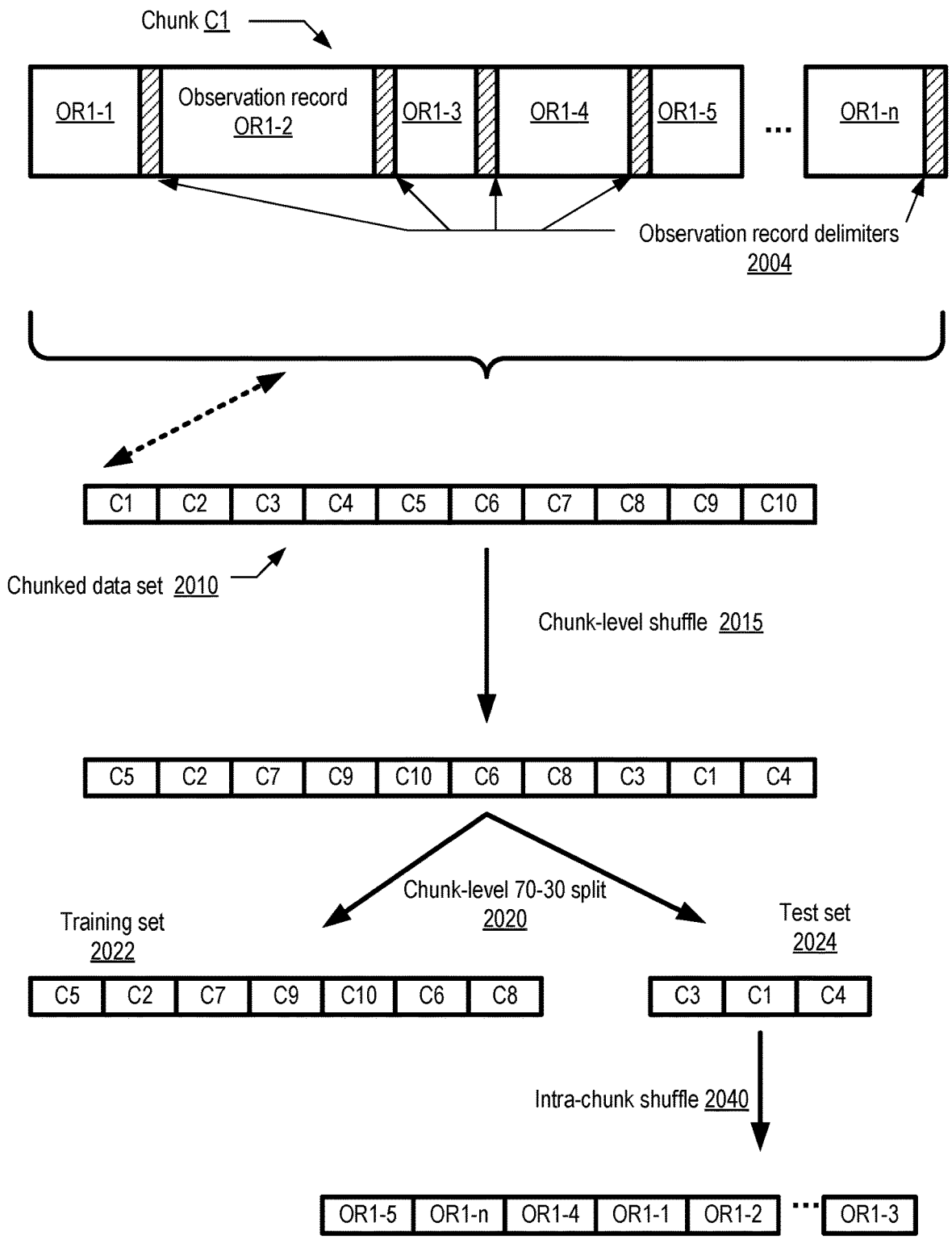
FIG. 20b illustrates an example sequence of in-memory filtering operations that includes chunk-level filtering as well as intra-chunk filtering, according to at least some embodiments.

In some embodiments, as mentioned earlier, filtering at the observation record level may also be supported by the MLS. For example, a client's record extraction request may comprise descriptors for both chunk-level filtering and record-level filtering. FIG. 20b illustrates an example sequence of in-memory filtering operations that includes chunk-level filtering as well as intra-chunk filtering, according to at least some embodiments. In the depicted example, the same set of chunk-level filtering operations are performed as those illustrated in FIG. 20a—i.e., a chunk-level shuffle 2015 is performed on data set 2004, followed by a 70-30 split 2020 into training set 2022 and test set 2024. However, after the chunk-level split, an intra-chunk shuffle 2040 is also performed, resulting in the re-arrangement of the observation records within some or all of the chunks. As a result of the intra-chunk shuffle, the observation records of chunk C1 may be provided as input in the order OR1-5, OR1-$n$, OR1-4, OR1-1, OR1-2, . . . , to a model or feature processing recipe (or to a subsequent filtering operation), for example, which differs from the original order of the observation records prior to the chunk-level shuffle. Observation records of the other chunks (e.g., C2-C10), which are not shown in FIG. 20a or FIG. 20b, may also be shuffled in a similar manner in accordance with the client's filtering descriptor. In various embodiments, a sort-based record-level shuffle algorithm (described in further detail below) may be used within individual chunks. In at least one embodiment, cross-chunk record-level filtering operations may also be supported. For example, consider a scenario in which at least two chunks Cj and Ck are read into the memory of a given MLS server S1. In a cross-chunk shuffle, at least some of the observation records of Cj may be shuffled or re-ordered with some of the observation records of Ck in S1's memory. Other types of record-level filtering operations (e.g., sampling, splitting, or partitioning) may also be performed across chunks that are co-located in a given server's memory in such embodiments. In one implementation, multiple servers may cooperate with one another to perform cross-chunk operations. For some applications, only a single chunk-level filtering operation may be performed before the result set of the chunk-level operation is fed to a recipe for feature processing or to a model for training—that is, a sequence of multiple chunk-level operations may not be required. Other types of operations (such as aggregation/collection of observation records or applying aggregation functions to values of selected variables of observation records) may also be performed subsequent to one or more chunk-level operations in at least some embodiments.

Figure 21:
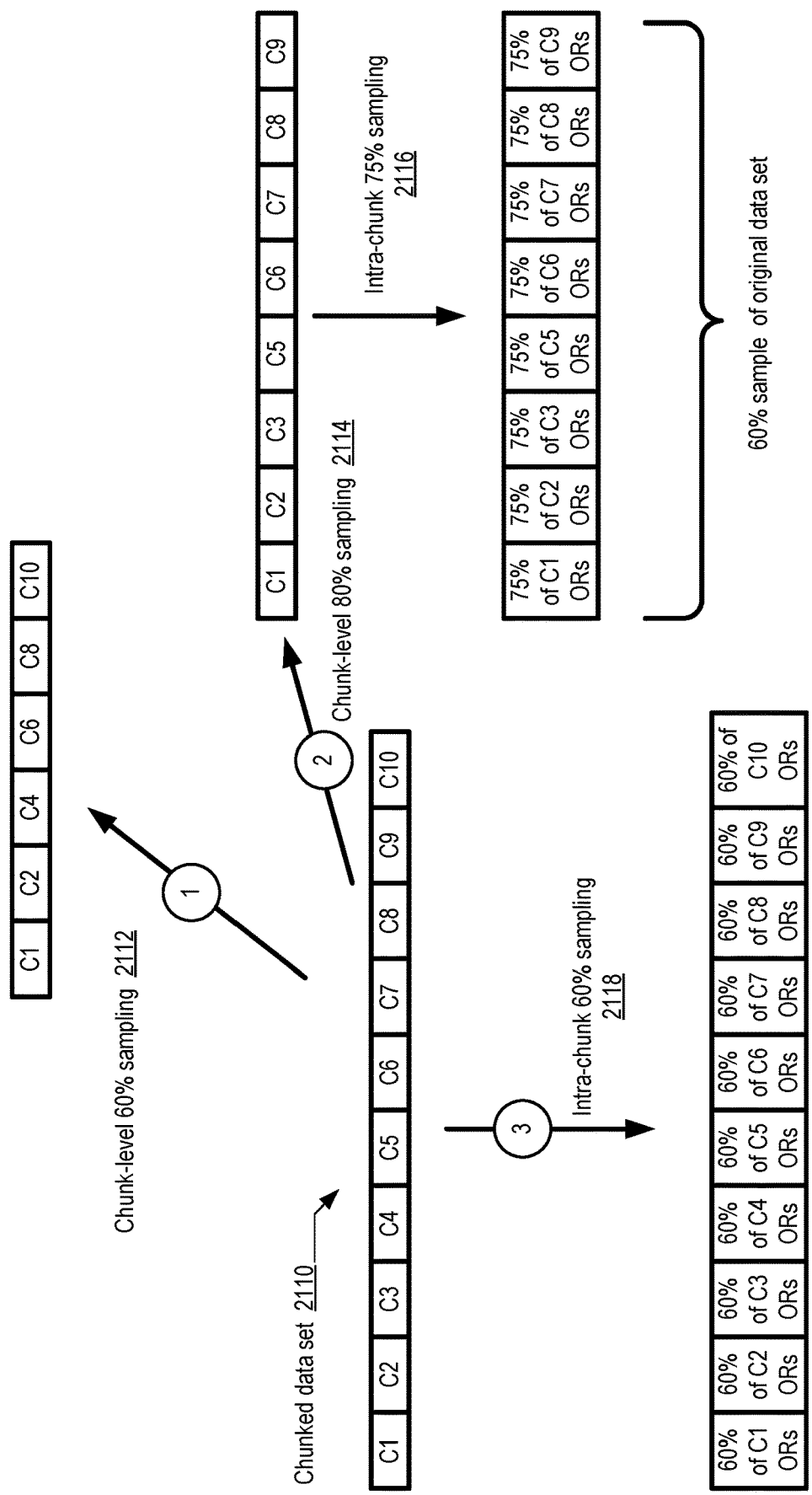
FIG. 21 illustrates examples of alternative approaches to in-memory sampling of a data set, according to at least some embodiments.

The ability to perform filtering operations at either the chunk level or the observation record level may enable several different alternatives to achieving the same input filtering goal. FIG. 21 illustrates examples of alternative approaches to in-memory sampling of a data set, according to at least some embodiments. A 60% sample of a chunked data set 2110 comprising ten chunks C1-C10 is to be obtained—that is, approximately 60% of the observation records of the data set are to be retained, while approximately 40% of the observation records are to be excluded from the output of the sampling operation.

In a first approach, indicated by the arrow labeled "1", straightforward chunk-level sampling 2112 of the chunks may be implemented, e.g., resulting in the selection of chunks C1, C2, C4, C6, C8 and C10 as the desired sample. In a second approach, a combination of chunk-level and intra-chunk sampling may be used. For example, as indicated by the arrow labeled "2", in a first step, 80% of the chunks may be selected (resulting in the retention of chunks C1, C2, C3, C5, C6, C7, C8 and C9) using chunk-level sampling 2114. Next, in an intra-chunk sampling step 2116, 75% of the observation records of each of the retained chunks may be selected, resulting in a final output of approximately 60% of the observation records (since 75% of 80% is 60%). In a third alternative approach indicated by the arrow labeled "3", 60% of each chunk's observation records may be sampled in a single intra-chunk sampling step 2118. Similar alternatives and combinations for achieving a given input filtering goal may also be supported for other types of filtering operations in at least some embodiments.

Figure 22:
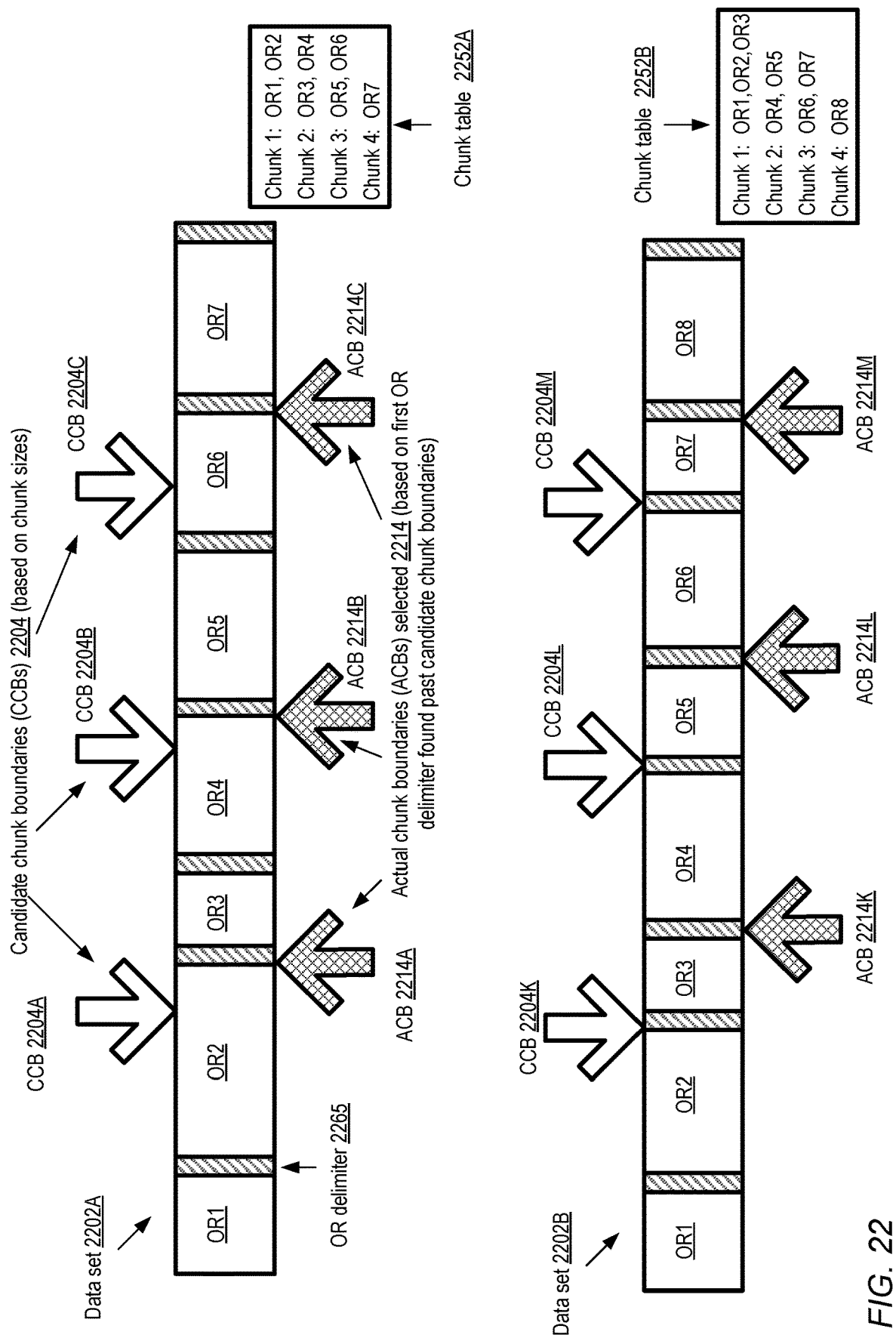
FIG. 22 illustrates examples of determining chunk boundaries based on the location of observation record boundaries, according to at least some embodiments.

In at least some embodiments, candidate chunk boundaries may have to be adjusted in order to ensure that individual observation records are not split, and to ensure consistency in the manner that observation records are assigned to chunks. FIG. 22 illustrates examples of determining chunk boundaries based on the location of observation record boundaries, according to at least some embodiments. Data set 2202A comprises observation records OR1-OR7 (which may vary in size) separated by record delimiters such as delimiter 2265. For example, in one implementation in which the data source includes alphanumeric or text files, newline characters ("\n") or other special characters may be used as record delimiters. Based on a selected chunk size, the candidate chunk boundaries happen to fall within the bodies of the observation records in data set 2202A. Candidate chunk boundary (CCB) 2204A falls within observation record OR2 in the depicted example, CCB 2204B falls within OR4, and CCB 2204C falls within OR6. In the depicted embodiment, the following approach may be used to identify the actual chunk boundaries (ACBs). Starting at the offset immediately after the CCB for a given chunk's ending boundary, and examining the data set in increasing offset order (e.g., in a sequential scan or read), the first observation record delimiter found is selected as the ending ACB for the chunk. Thus, in the example of data set 2202A, the position of the delimiter between OR2 and OR3 is identified as the actual chunk boundary 2214A corresponding to CCB 2204A. Similarly, ACB 2214B corresponds to the delimiter between OR4 and OR5, and ACB 2214C corresponds to the delimiter between OR6 and OR7. As a result of the selection of the actual chunk boundaries, as shown in chunk table 2252A, chunk C1 comprises OR1 and OR2, chunk C2 comprises OR3 and OR4, and chunk C3 comprises OR5 and OR6, while chunk C4 comprises OR7. Using the technique described, each observation record is mapped to one and only one chunk.

The same rules regarding the determination of chunk boundaries may be applied even if a CCB happens to coincide with an OR delimiter in some embodiments. For example, in data set 2202B, CCB 2204K happens to be aligned with the delimiter separating OR2 and OR3, CCB 2204L coincides with the delimiter separating OR4 and OR5, while CCB 2204M coincides with the delimiter separating OR6 and OR7. Using the rule mentioned above, in each case the search for the next delimiter starts at the offset immediately following the CCB, and the next delimiter found is selected as the ACB. Accordingly, ACB 2214K is positioned at the delimiter between OR3 and OR4, ACB 2214L is positioned at the delimiter between OR5 and OR6, and ACB 2214M is positioned at the delimiter between OR7 and OR8. As indicated in chunk table 2252B, chunk C1 of data set 2202B eventually includes OR1, OR2 and OR3, chunk C2 includes OR4 and OR5, chunk C3 includes OR6 and OR7, and chunk C4 includes OR8.

Figure 23:
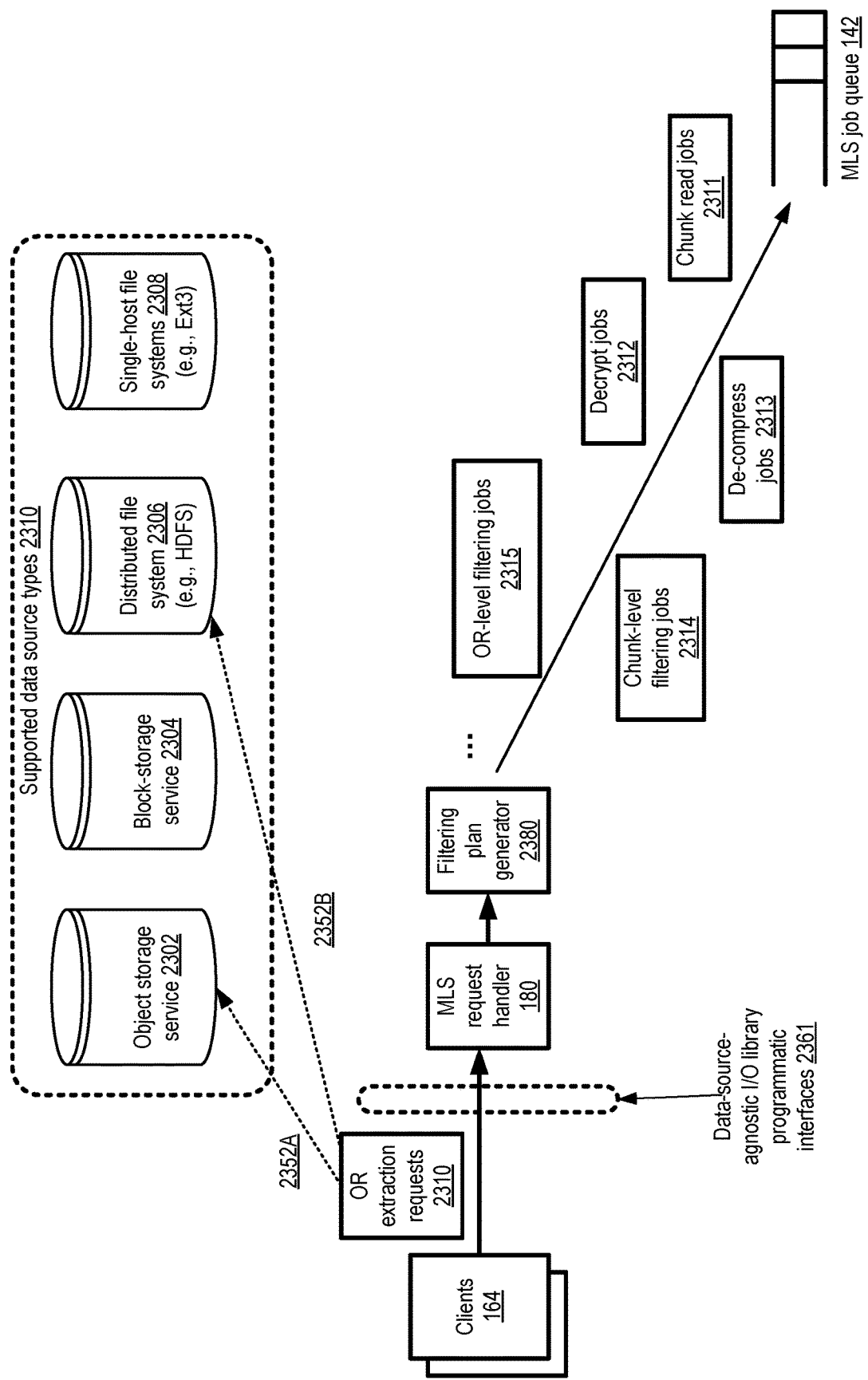
FIG. 23 illustrates examples of jobs that may be scheduled at a machine learning service in response to a request for extraction of data records from any of a variety of data source types, according to at least some embodiments.

FIG. 23 illustrates examples of jobs that may be scheduled at a machine learning service in response to a request for extraction of data records from any of a variety of data source types, according to at least some embodiments. As shown, a set of programming interfaces 2361 enabling clients 164 to submit observation record extraction/retrieval requests 2310 in a data-source-agnostic manner may be implemented by the machine learning service. Several different types 2310 of data sources may be supported by the MLS, such as an object storage service 2302 that may present a web-services interface to data objects, a block storage service 2304 that implements volumes presenting a block-device interface, any of a variety of distributed file systems 2306 (such as the Hadoop Distributed File System or HDFS), as well as single-host file systems 2308 (such as variants of Ext3 that may be supported by Linux-based operating systems). In at least some embodiments, databases (e.g., relational databases or non-relational databases) may also be supported data sources. Data objects (e.g., files) that are implemented using any of the supported types of data sources may be referred to in the retrieval requests, as indicated by the arrows labeled 2352A and 2352B. In some implementations, a single client request may refer to input data objects such as files that are located in several different types of data sources, and/or in several different instances of one or more data source types. For example, different subsets of a given input data set may comprise files located at two different single-host file systems 2308, while respective subsets of another input data set may be located at an object storage service and the block-storage service.

An MLS request handler 180 may receive a record extraction request 2310 indicating a sequence of filtering operations that are to be performed on a specified data set located at one or more data sources, such as some combination of shuffling, splitting, sampling, partitioning (e.g., for parallel computations such as map-reduce computations, or for model training operations/sessions that overlap with each other in time and may overlap with each other in the training sets used), and the like. A filtering plan generator 2380 may generate a chunk mapping of the specified data set, and a plurality of jobs to accomplish the requested sequence of filtering operations (either at the chunk level, the record level, or both levels) in the depicted embodiment, and insert the jobs in one or more MLS job queues 142. For example, one or more chunk read jobs 2311 may be generated to read in the data from the data source. If needed, separate jobs may be created to de-compress the chunks (such as jobs 2312) and/or decrypt the data (jobs 2313). In the depicted embodiment, jobs 2314 may be generated for chunk-level filtering operations, while jobs 2315 may be generated for observation record-level filtering operations. Filtering operations at the observation record level may comprise intra-chunk operations (e.g., shuffles of records within a given chunk) and/or cross-chunk operations (e.g., shuffles of records of two or more different chunks that may be co-located in the memory of a given MLS server) in the depicted embodiment. In at least some embodiments, respective jobs may be created for each type of operation for each chunk—thus, for example, if the chunk mapping results in 100 chunks, 100 jobs may be created for reading in one chunk respectively, 100 jobs may be created for the first chunk-level filtering operation, and so on. In other embodiments, a given job may be created for an operation involving multiple chunks, e.g., a separate job may not be required for each chunk. In some embodiments, as described below in further detail, the splitting of a data set into a training set and a test set may be implemented as separate jobs—one for the training set and one for the test set. As discussed earlier, a given job may indicate dependencies on other jobs, and such dependencies may be used to ensure that the filtering tasks requested by the client are performed in the correct order.

Figure 24:
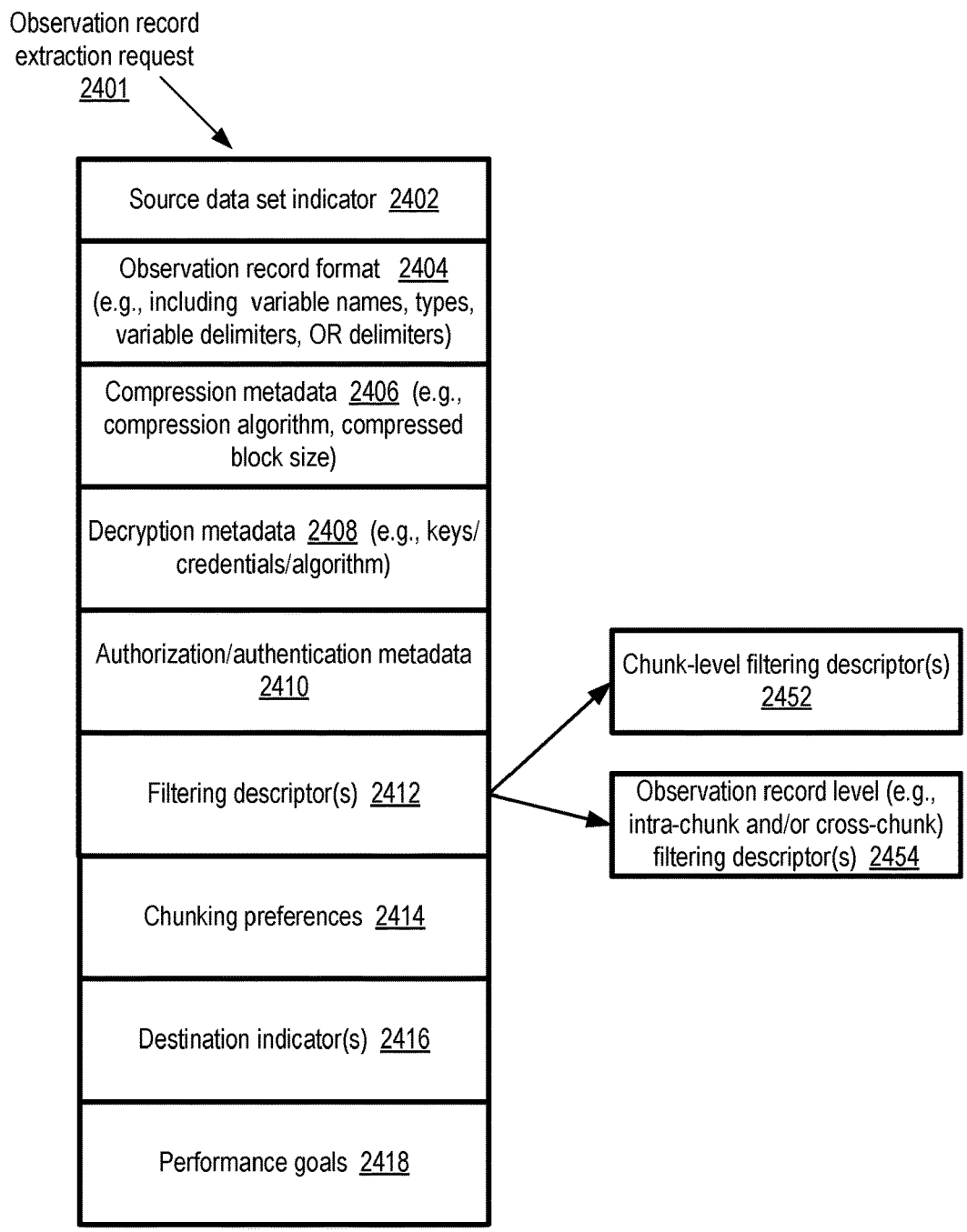
FIG. 24 illustrates example constituent elements of a record retrieval request that may be submitted by a client using a programmatic interface of an I/O (input-output) library implemented by a machine learning service, according to at least some embodiments.

FIG. 24 illustrates example constituent elements of a record extraction request that may be submitted by a client using a programmatic interface of an I/O (input-output) library implemented by a machine learning service, according to at least some embodiments. As shown, observation record (OR) extraction request 2401 may include a source data set indicator 2402 specifying the location(s) or address (es) from which the input data set is to be retrieved. For a data set stored in an object storage service presenting a web-service interface, for example, one or more URLs (uniform resource locators) or URIs (uniform resource identifiers) may be specified; for files, some combination of one or more file server host names, one or more directory names, and/or one or more file names may be provided as the indicator 2402. In one implementation, if a data set includes multiple objects such as more than one file, a client may include instructions for logical concatenation of the objects of the data set to form a unified address space (e.g., the logical equivalent of "combine files of directory d1 in alphabetical order by file name, then files of directory d2 in alphabetical order"). In some embodiments, an expected format 2404 or schema for the observation records may be included in the OR extraction request, e.g., indicating the names of the variables or fields of the ORs, the inter-variable delimiters (e.g., commas, colons, semicolons, tabs, or other characters) and the OR delimiters, the data types of the variables, and so on. In at least one implementation, the MLS may assign default data types (e.g., "string" or "character") to variables for which data types are not indicated by the client.

In one embodiment, the OR extraction request 2401 may include compression metadata 2406, indicating for example the compression algorithm used for the data set, the sizes of the units or blocks in which the compressed data is stored (which may differ from the sizes of the chunks on which chunk-level in-memory filtering operations are to be performed), and other information that may be necessary to correctly de-compress the data set. Decryption metadata 2408 such as keys, credentials, and/or an indication of the encryption algorithm used on the data set may be included in a request 2401 in some embodiments. Authorization/authentication metadata 2410 to be used to be able to obtain read access to the data set may be provided by the client in request 2401 in some implementations and for certain types of data sources. Such metadata may include, for example, an account name or user name and a corresponding set of credentials, or an identifier and password for a security container (similar to the security containers 390 shown in FIG. 3).

OR extraction request 2401 may include one or more filtering descriptors 2412 in the depicted embodiment, indicating for example the types of filtering operations (shuffle, split, sample, etc.) that are to be performed at the chunk level and/or at the OR level, and the order in which the filtering operations are to be implemented. In some implementations, one or more descriptors 2452 may be included for chunk-level filtering operations, and one or more descriptors 2454 may be included for record-level (e.g., intra-chunk and/or cross-chunk) filtering operations. Each such descriptor may indicate parameters for the corresponding filtering operation—e.g., the split ratio for split operations, the sampling ratio for sampling operations, the number of partitions into which the data set is to be subdivided for parallel computations or parallel training sessions, the actions to be taken if a record's schema is found invalid, and so on.

In at least one embodiment, the OR extraction request 2401 may include chunking preferences 2414 indicating, for example, a particular acceptable chunk size or a range of acceptable chunk sizes. The destination(s) to which the output of the filtering operation sequence is to be directed (e.g., a feature processing recipe or a model) may be indicated in field 2416. In some embodiments, a client may indicate performance goals 2418 for the filtering operations, such as a "complete-by" time, which may be used by the MLS to select the types of servers to be used, or to generate a filtering sequence plan that is intended to achieve the desired goals. It is noted that in at least some embodiments, not all of the constituent elements shown in FIG. 25 may be included within a record extraction request—for example, the compression and/or decryption related fields may only be included for data sets that are stored in a compressed and/or encrypted form.

Figure 25:
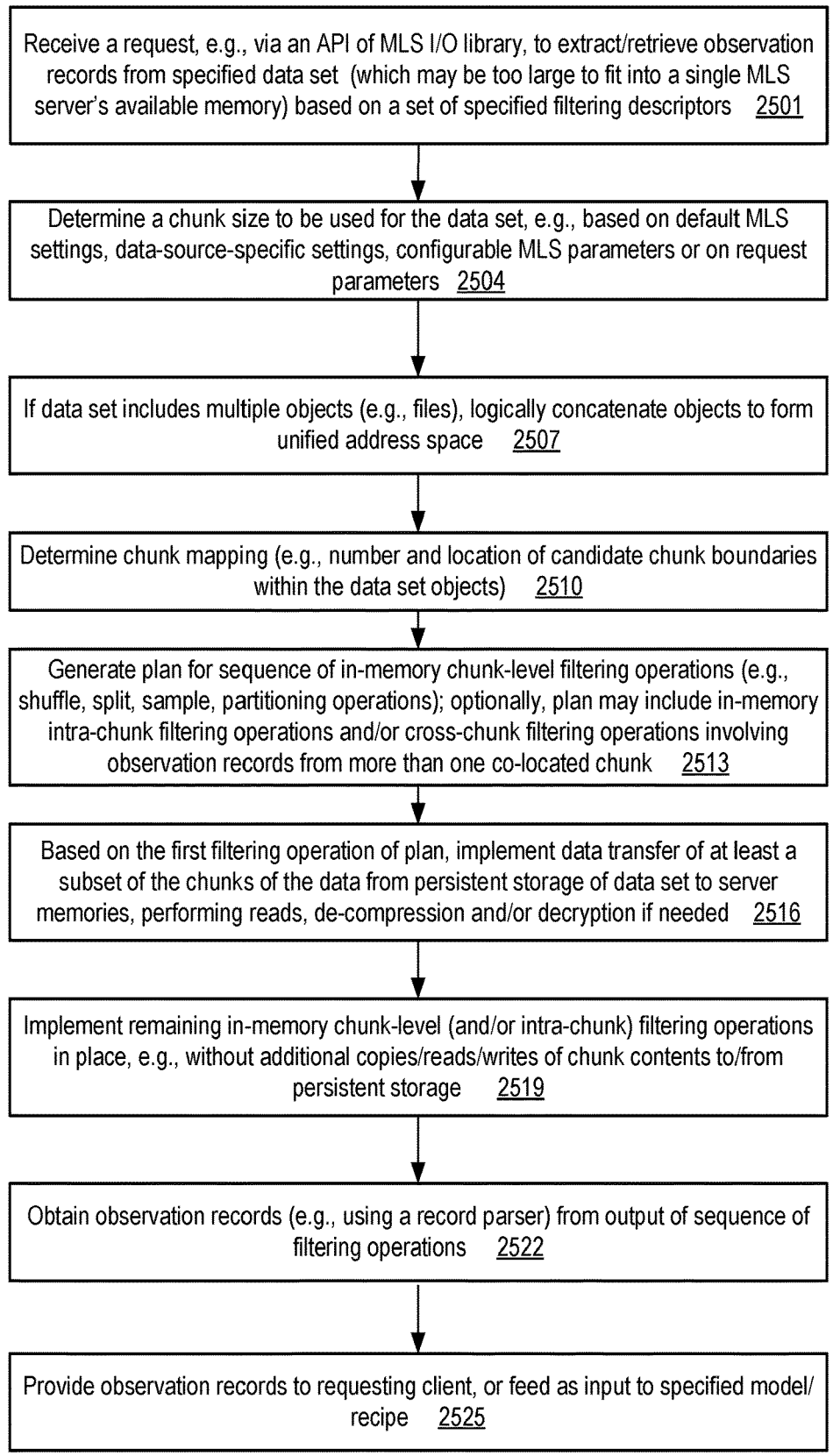
FIG. 25 is a flow diagram illustrating aspects of operations that may be performed at a machine learning service that implements an I/O library for in-memory filtering operation sequences on large input data sets, according to at least some embodiments.

FIG. 25 is a flow diagram illustrating aspects of operations that may be performed at a machine learning service that implements an I/O library for in-memory filtering operation sequences on large input data sets, according to at least some embodiments. An I/O library that enables clients to submit observation record extraction requests similar to those illustrated in FIG. 24 may be implemented. The I/O library may be agnostic with respect to the type of data store at which the input data set is stored—e.g., a common set of programmatic interfaces may be provided for record extraction requests stored at any combination of several different data store types. Such an OR extraction request may be received (element 2501), indicating a source data set that may be too large to fit into the available memory of an MLS server. The OR extraction request may include one or more descriptors indicating a sequence of filtering operations that are to be performed on the input data set.

A chunk size to be used for transferring contiguous subsets of the input data set into the memories of one or more MLS servers may be determined (element 2504), e.g., based on any of various factors such as the memory capacity constraints of the MLS servers, a preference indicated by the requesting client via parameters of the request, a default setting of the MLS, the estimated or actual size of the input data set, and so on. In some implementations several different chunk sizes may be selected—e.g., some MLS servers may have a higher memory capacity than others, so the chunks for the servers with more memory may be larger. If the input data set includes multiple objects (such as files), the objects may be logically concatenated to form a single unified address space (element 2507) in some embodiments.

The sequence in which the objects are concatenated may be determined, for example, based on instructions or guidance provided in the request, based on alphanumeric ordering of the object names, in order of file size, in random order, or in some other order selected by the MLS.

A chunk mapping may be generated for the data set (element 2510), indicating a set of candidate chunk boundaries based on the selected chunk size(s) and the unified address space. The positions or offsets of the candidate chunk boundaries within the data object or object of the input data set may be computed as part of the mapping generation process. A plan for a sequence of chunk-level filtering operations corresponding to the filtering descriptor(s) in the OR extraction request may be created (element 2513). The plan may include record-level filtering operations (e.g., intra-chunk or cross-chunk operations), in addition to or instead of chunk-level filtering operations, in some embodiments. Cross-chunk operations may, for example, be performed on observation records of several chunks that are co-located in the memory of a given MLS server in some embodiments. In other embodiments, cross-chunk operations may also or instead be performed on chunks that have been read into the memories of different MLS servers. The types of filtering operations supported may include sampling, splitting, shuffling, and/or partitioning. Based at least in part on the first filtering operation of the plan, a data transfer of at least a subset of the chunks of the data set from persistent storage to MLS server memories may be performed (element 2516). Depending on the manner in which the data is stored at the source locations indicated in the OR extraction request, the data transfer process may include decryption and/or decompression in addition to read operations in some embodiments. In some embodiments, the client may request the MLS to encrypt and/or compress the data prior to transferring the chunks from the source locations to the MLS servers, and then to perform the reverse operation (decryption and/or decompression) once the encrypted/compressed data reaches the MLS servers.

After the first filtering operation of the sequence is performed in memory at the MLS servers, the remaining filtering operations (if any) may be performed in place in the depicted embodiment, e.g., without copying the chunks to persistent storage or re-reading the chunks for their original source locations (element 2519). In one embodiment, respective jobs may be generated and placed in an MLS job queue for one or more of the filtering operations. In at least some embodiments, a record parser may be used to obtain the observation records from the output of the sequence of filtering operations performed (element 2522). The ORs may be provided programmatically to the requesting client (e.g., as an array or collection returned in response to the API call representing the OR extraction request), and/or to a specified destination such as a model or a feature processing recipe (element 2525).

Sort-Based Record-Level Shuffling

As mentioned earlier, chunk-level filtering operations of the kind described above may not always be the best choice, especially if the observation records located near one another in a given chunk happen to be correlated with one another. In such scenarios, a chunk size which is large enough to provide some of the I/O-related performance advantages discussed above may result in, for example, data subsets which are not truly representative of the overall variations among the observation records, or in longer training times for models which would ideally be trained using data sets arranged in such a way that the contents of successive records are independent of one another. In at least some embodiments, an algorithm for consistent sort-based record-level shuffling of data sets (e.g., without requiring chunk level operations of the kind described earlier) may be implemented. Such a technique may be especially useful for certain types of machine learning techniques in which successive iterations ideally represent incremental steps towards convergence, and excessive correlations between the records analyzed in successive iterations may result in sub-optimal performance.

Figure 26:
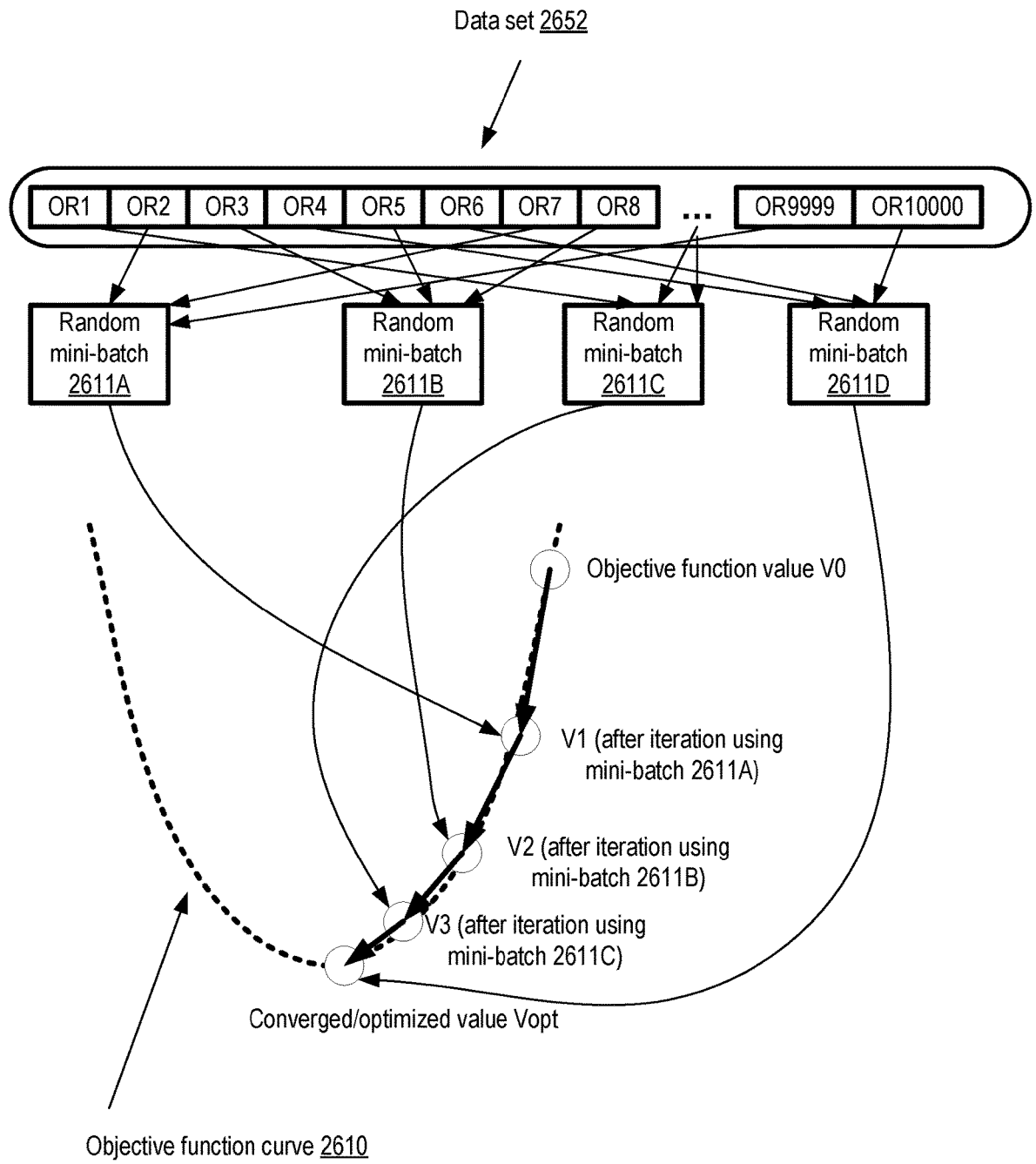
FIG. 26 illustrates an example of a stochastic gradient descent algorithm which may be used to train a machine learning model, according to at least some embodiments.

FIG. 26 illustrates an example of a stochastic gradient descent algorithm which may be used to train a machine learning model, according to at least some embodiments. Generally speaking, a gradient descent algorithm attempts to identify a minimum of an objective function (also known as a cost function) by iteratively taking steps (e.g., adjusting model coefficients) proportional to the negative of the current gradient of the objective function. In some implementations, successive iterations of a gradient descent technique may be performed on all the observation records of a given data set. However, for large data sets (which may often not fit in the memory of any given MLS execution platform), computing the cost and gradient for the entire data set may be too slow for at least some MLS clients, or may require more I/O resources than the clients wish to consume. Instead of using the entire data set for each iteration, a small subset (or even a single data record) may be used to make model adjustments in a variant of the basic gradient descent technique known as stochastic gradient descent.

In FIG. 26, curve 2610 represents the objective function to be optimized (minimized) using stochastic gradient descent on a data set 2652 which includes 10000 observation records OR1-OR10000. The value of the objective function is V0 at the start of the first iterative descent step depicted in FIG. 26. A random mini-batch 2611A of observation records is selected from data set 2652 for the first gradient descent iteration, which results in the objective function value V1 being attained. A second random mini-batch 2611B is then selected for the next iteration, and the model coefficients are adjusted based on examining the second mini-batch, resulting in the objective function value V1. Similarly, additional steps towards convergence are taken based on successive randomly-selected mini-batches 2611C and 2611D, ultimately leading to the converged/optimized objective function value Vopt. Each mini-batch 2611 may typically comprise a small fraction of the total population of observation records of data set 2652, such as a few tens or a few hundreds of observation records in some implementations. Using several records instead of a single record for each iteration of parameter/coefficient updates may have several advantages, such as reducing the variance of the parameter updates and the ability to use optimized matrix operations; however, in some implementations a single record may nevertheless be used for each iteration. Stochastic gradient decent techniques may not work very well if the data used for successive iterations is highly correlated. For example, in one extreme case, if the observation records happen to be arranged in order of increasing or decreasing values of a particular attribute (such as the target or output attribute for a predictive model), the algorithm may not converge at all, or may take a very long time to converge. If, instead, the observation records are examined in a random order, the algorithm may typically converge fairly rapidly. Various other algorithms derived from (or independent of) basic stochastic gradient descent (e.g., various neural network algorithms including multilayer perceptron (MLP) algorithms) may also perform better on data that has been shuffled in such a way that the attribute values of records examined in close temporal proximity are independent of one another.

Figure 27:
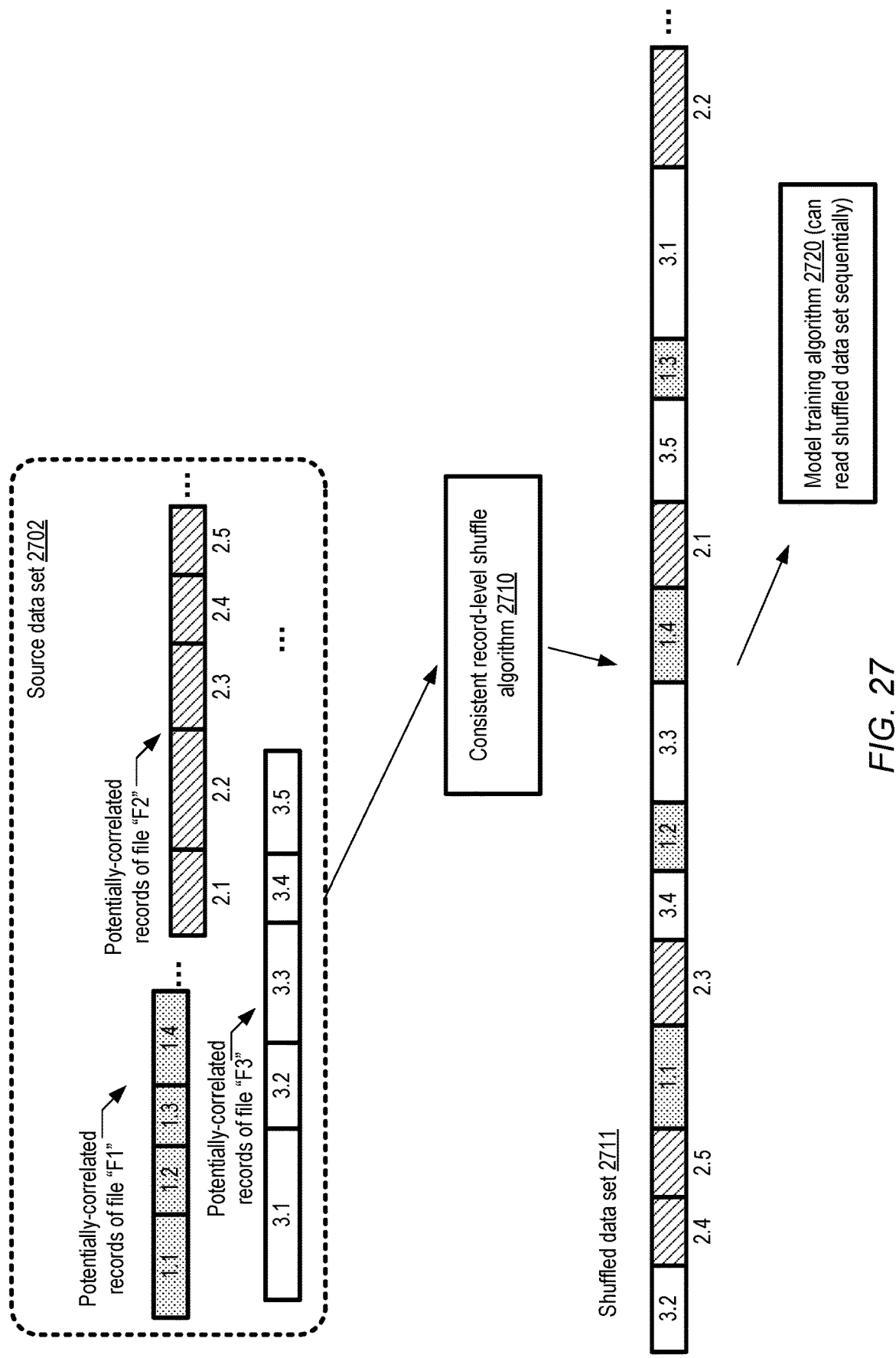
FIG. 27 illustrates an example of a potentially correlated file-based data set to which a sort-based record-level shuffle algorithm may be applied, according to at least some embodiments.

Unfortunately, depending on the manner in which the input data is collected and stored, some raw training data sets for machine learning models may in fact exhibit location-based correlations. FIG. 27 illustrates an example of a potentially correlated file-based data set to which a sort-based record-level shuffle algorithm may be applied, according to at least some embodiments. The input or source data set 2702 comprises files F1, F2 and F3. Each file may include a plurality of variable-sized or fixed-size observation records, such as records 1.1-1.4 of F1, records 2.1-2.5 of F2, and records 3.1-3.5 of F3. The contents of a given file may have been collected, for example, over a respective time period from a particular data source (e.g., during a particular day from a particular geographical location in the case of a geographically-distributed set of raw data sources). As a result, the observation records within a given file may potentially be correlated with one another. Analyzing the contents of each file in sequential order may not be the most appropriate way to train a model (such as a model employing stochastic gradient descent) whose training efficiency may be improved by examining observation records in random order. On the other hand, leaving the records in their original sequence and performing a random file read operation for each record may lead to unacceptably high I/O costs.

A consistent sort-based record-level shuffle algorithm 2710 may be used to rearrange the observation records of data set 2702 to produce shuffled data set 2711 in the depicted embodiment. A model training algorithm 2720 may then be able to examine the records of shuffled data set 2711 sequentially, avoiding the I/O performance overhead associated with random I/O and also benefiting from the reduction of correlation among the records examined in close temporal proximity. In shuffled data set 2711, for example, the records of the three files F1 F2 and F3 are intermingled, and even the records of a given file are rearranged relative to their original sequences. Thus, for example, the records of F3 now appear in the order 3.2, 3.4, 3.3, 3.5 and 3.1, instead of the original order 3.1-3.5, and accesses to each pair of records of F3 happen to be separated by accesses to records from other files. The algorithm 2710 may be termed "consistent" in that, if and when it is re-applied to the same data set 2702, the identical result may be produced in the depicted embodiment.

In the depicted embodiment, the record-level shuffle algorithm 2710 may comprise generating a unique string token corresponding to each observation record, using token contributor components derived from the positions of the observation records within their files as discussed below in further detail. For example, in one implementation the files which make up the data set may be assigned unique ordinal values (e.g., based on the order in which the file names would appear in response to a file listing command), the logical or physical offsets of the observation records within their parent files may be determined, and a unique seed value may be selected for the shuffle. The seed, the parent file's ordinal value, and the offset for a particular record may concatenated in a selected order to produce a string token for that record. The string tokens for the various records may then be transformed into pseudo-random numerical tokens or representative values using selected hash functions. The pseudo-random values may then be sorted, e.g., using any appropriate single-threaded or parallel sort algorithm. The observation records may be rearranged according to the position of the corresponding pseudo-random values in the sort results, and the rearranged records may be transmitted to or stored at a desired shuffle result destination. In at least some embodiments, the representative values generated for the individual observation records need not necessarily be numeric—in general, any data type (including, for example, alphanumeric strings) whose instances can be ordered relative to one another using some kind of comparator may be used for the representative values. In one embodiment, instead of providing the rearranged records, metadata indicating the locations of the sorted observation records may be stored or provided to a destination, e.g., so that the records may be read sequentially later in the shuffled order. In some embodiments, the raw observation records (and/or the rearranged records of the shuffle results) may not necessarily be stored in files—e.g., database tables and/or other types of storage objects may be used. In embodiments in which the input data is not necessarily stored in files, unique keys (e.g., record identifiers or other primary key values) and table identifiers may be used instead of record offsets and file ordinal values when generating the tokens.

In one embodiment, a component of the machine learning service (e.g., a control-plane component) may determine that a particular data set is to be shuffled without receiving an explicit shuffle request from a client. Such a determination may be made, for example, in response to receiving a model training request, for which the corresponding training algorithm is known to benefit from randomly shuffling the input. For example, if stochastic gradient descent or a multi-layer perceptron algorithm is selected for a model, the machine learning service may decide to shuffle the input data before the training commences; a request to train such a model may thus be considered an implicit shuffle request. In other embodiments, clients may explicitly request that a specified data set be shuffled, e.g., by submitting shuffle specifications as described in greater detail below.

In various embodiments, the machine learning service may support both chunk-level and record-level consistent shuffle operations. In one such embodiment, when a determination is made that a given data set is to be shuffled, a preliminary analysis may be performed on a subset of the data set to select a particular shuffling algorithm to be employed, or summary statistics regarding the data set may be obtained to select the shuffling algorithm. In some implementations, the particular algorithm to be used for the shuffle may be selected from a set which comprises a sort-based record-level shuffle algorithm, a chunk-level shuffle algorithm (similar to that described earlier with respect to the chunk-based operations of the I/O library), or a hybrid chunk-and-record level algorithm. Details of a hybrid approach which may be used in some embodiments are provided below. Any combination of numerous factors may be taken into account to select the algorithm, including for example an estimate of the size (or the exact size) of the data set, an estimate of an average size of the observation records, the number of execution platforms available for shuffling the data set, the memory capacity of an execution platform available for shuffling the data set, an estimate of an extent of location-based correlation of observation record attribute values of the data set, a targeted time period within which the second data set is to be shuffled, or a resource usage limit to be imposed with respect to the shuffle operation. Some or all of such factors may also be employed to select the particular sort algorithm to be used in various embodiments. In at least some embodiments, the pseudo random values generated corresponding to the observation records may be re-used for several purposes—e.g., as described below, a random record-level split operation may be implemented using the pseudo-random values. For some applications, it may be the case that the same input data set is shuffled several times (e.g., using distinct seeds for each shuffle to ensure that the final result of each shuffle is unique, but re-using the other token-contributor components such as the file ordinal values and the offsets/keys of the individual records).

Multiple machine learning service execution platforms may be used at various stages of the shuffle algorithm—e.g., in the case of the record-level shuffle, the tokens or pseudo-random values corresponding to the individual records may be obtained in parallel, the sort operation on the pseudo-random values may be performed in parallel, and/or the records may be re-arranged in parallel, and so on, with the respective number of execution platforms used for each parallel stage being determined based on platform availability, targeted performance, client budgets, etc. In at least one embodiment, the pseudo-random values may be stored with the corresponding observation records during the shuffle operation (e.g., in the main memory of the execution platform(s) being used).

Figure 28:
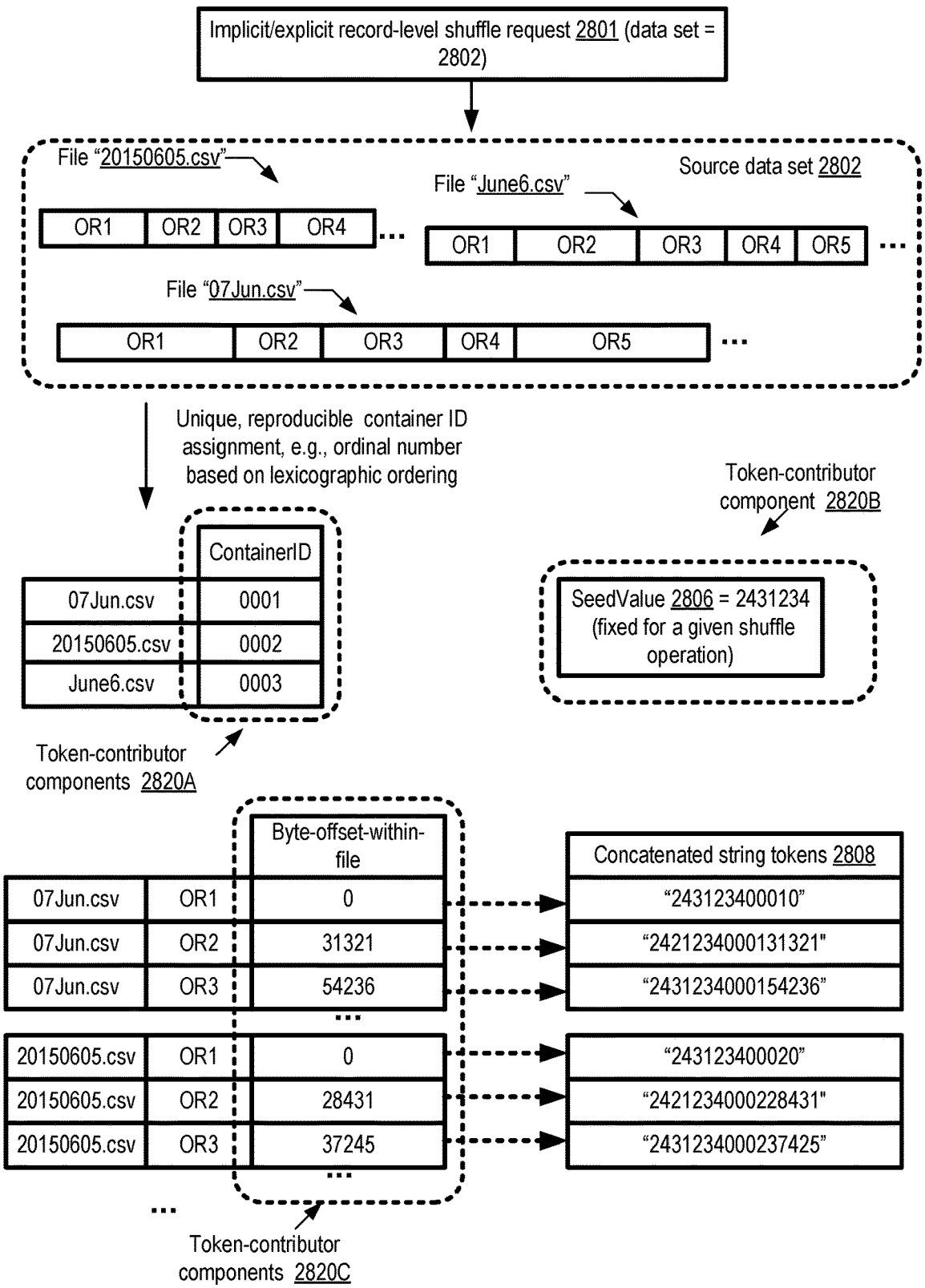
FIG. 28 and FIG. 29 collectively illustrate an example use of a sort-based record-level shuffle algorithm on a data set, according to at least some embodiments.
Figure 29:
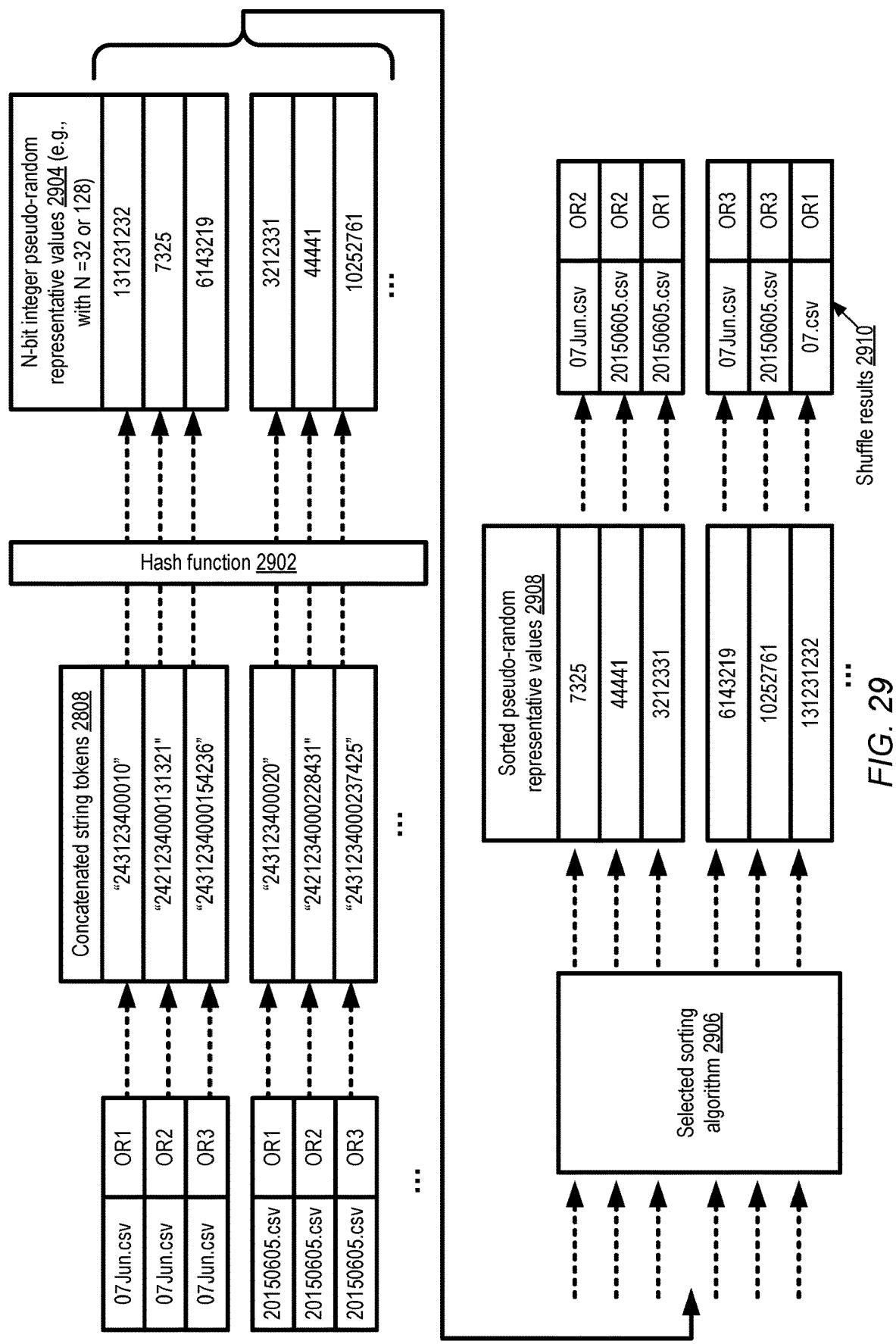

FIG. 28 and FIG. 29 collectively illustrate an example use of a sort-based record-level shuffle algorithm on a data set, according to at least some embodiments. In summary, in the operations illustrated in FIG. 28, a unique string token corresponding to each observation record of the data set is created, and in the operations shown in FIG. 29, pseudo-random values generated from the string tokens are sorted to determine the shuffled order of the observation record. In FIG. 28, an implicit or explicit shuffle request 2801 is received at a machine learning service, indicating a source data set 2802. A request to utilize a training algorithm or an optimization technique that would benefit from randomizing the input data (such as stochastic gradient descent) may be considered one example of an implicit shuffle request. A request to generate any of a number of different types of online machine learning models (e.g., models which consume respective subsets of the input data in respective training iterations) may trigger the use of record-level shuffle algorithms in some embodiments. For example, record-level shuffles may be performed for logistic regression models, linear regression models and/or multi-nominal logistic regression models (at least some of which may be backed by stochastic gradient descent) in one embodiment. In one scenario, a training algorithm for which record-level shuffling may be appropriate may be selected for a given data set by the machine learning service—e.g., the client may not necessarily select the modeling technique, and the service may determine both (a) the modeling algorithm to be employed on behalf of the client and (b) that sort-based record-level shuffling is to be used. An explicit shuffle request may be submitted by a client without necessarily being tied to a particular algorithm—e.g., the client may simply wish to rearrange a data set for later use for one or more models. In various embodiments, a client may indicate various other preferences in a shuffle request (e.g., a desired target time period within which the data is to be shuffled or a desired resource budget limit) which may be used by the machine learning service to determine various parameters of the shuffle algorithm.

In the embodiment depicted in FIG. 28, the source data set 2802 comprises observation records stored in several different storage objects including files named "20150605.csv", "June6.csv" and "07Jun.csv". (The file names may indicate the dates on which respective sets of observation records were collected, for example, at different sources with different date formatting conventions being used for the file names.) Each file may include observation records of various lengths; that is, not all the observation records OR1, OR2, . . . , within a given file may comprise the same number of bytes, and the length of a given observation record in one file many not necessarily match the length of any of the records stored in any of the other files. The number of attributes or variable values in a given observation records may differ from the number of attributes included in at least some other observation records in the depicted embodiment. In different embodiments, the files of data set 2802 may be stored within a single-host file system (such as the ExtFS file system), a distributed file systems (such as HDFS), or in a provider network's object storage service which exposes a web-services interface such that each file is assigned a respective URL (uniform record locator). In other embodiments as discussed below, at least some of the observation records of a source data set may be stored in objects other than files (e.g., one or more tables of a relational or non-relational database management service implemented at a provider network may be used).

A respective container identifier may be assigned to each file in the example scenario depicted in FIG. 28, e.g., based on the lexicographical ordering of the file names (e.g., fully-qualified file names including a file system identifier and a directory path, or URLs associated with the files). In a lexicographic ordering of the three files shown, file 07Jun.csv appears first and is therefore assigned the container identifier "0001" corresponding to the ordinal number 1, file 20150605.csv appears second and is therefore assigned the container identifier "0002", while file June6.csv appears third and is therefore assigned the container identifier "0003". In various embodiments, any technique that results in a consistent assignment of container identifiers to the storage objects such as files of the data set (that is, a scheme that results in the same container identifiers being assigned to the same storage objects each time container identifiers are generated) may be used. Techniques which do not employ lexicographic ordinal numbers may be used in some embodiments, e.g., container identifiers based on the creation times of the files may be employed in one embodiment.

In the algorithm whose use is depicted in FIG. 28, three types of token-contributor components 2820 (including the container identifiers 2820A) may be combined to generate unique concatenated string tokens 2808 for respective observation records of data set 2802. A seed value 2806 ("2431234" in the depicted example) represents a second type of token-contributor component 2820B, and the respective byte offsets of the observation records within their files represent the third type of token-contributor 2820C. The order in which the token-contributor components are concatenated and/or the data types or formats used for the components or the concatenation result may differ from one implementation to another. In the depicted example, the concatenated string token 2808 for a given observation record is formed by appending a string version of the container identifier to the seed, and then appending a string version of the byte offset to the result of the first concatenation. Thus, for example, the concatenated string token "2431234000154236" is generated for observation record OR3 of 07Jun.csv by concatenating the seed "2431234" with the container identifier "0001" and the byte offset "54236". Similarly, for OR2 of 20150605.csv, the seed is concatenated with the container identifier "0002" and the byte offset "28431" to produce the token "243123400028431".

The concatenated string tokens 2808 generated for the different observation records are also shown in FIG. 29. After the token for a given observation record is generated, a selected hash function 2902 may be applied to the token, generating an N-bit integer 2904 (where the number of bits N may depend on the particular hash function employed) in the depicted embodiment. Any of a variety of hash functions, or a sequence of multiple hash functions, may be used in different embodiments to produce a pseudo-random representative value 2904 corresponding to the observation record, such as MurmurHash2 or MurmurHash3 functions, Fowler-Noll-Vo (FNV) hash functions, Jenkins hash functions, or CityHash functions. In some embodiments only non-cryptographic hash functions may be used, while in other embodiments at least some cryptographic-strength hash functions (e.g., MD5 or other message digest based functions, or functions based on the Secure Hash Algorithm such as SHA-1, SHA-2, or SHA-3) may be supported. In one embodiment pseudo-random functions that may not necessarily involve hashing may be used. The pseudo-random representative values 2904 may be referred to herein as numeric tokens (e.g., to distinguish them from the string tokens 2808). The pseudo-random representative values generated corresponding to the observation records may then be sorted using a selected sorting algorithm 2906. The results 2910 of the shuffle operation may comprise the observation records rearranged in the order of the sorted pseudo-random representative values 2908 in the depicted embodiment. In one embodiment, the representative values generated from the observation records and used as input for the sorting algorithm 2906 may not necessarily be numeric; other data types whose instances can be ranked or ordered relative to one another (e.g., strings, compound objects comprising multiple sub-fields, etc.) may be used. In some embodiments, the observation records may not necessarily be rearranged immediately; instead, for example, the sorted pseudo-random values and the corresponding record locations (e.g., files and offsets within the files) may be stored as the results of the shuffle. In various embodiments, the record-level shuffle algorithm illustrated in FIG. 28 and FIG. 29 may be described as being consistent or repeatable in that, if the same data set is shuffled more than once using the same seed, identical shuffle subsets would be produced.

Figure 30:
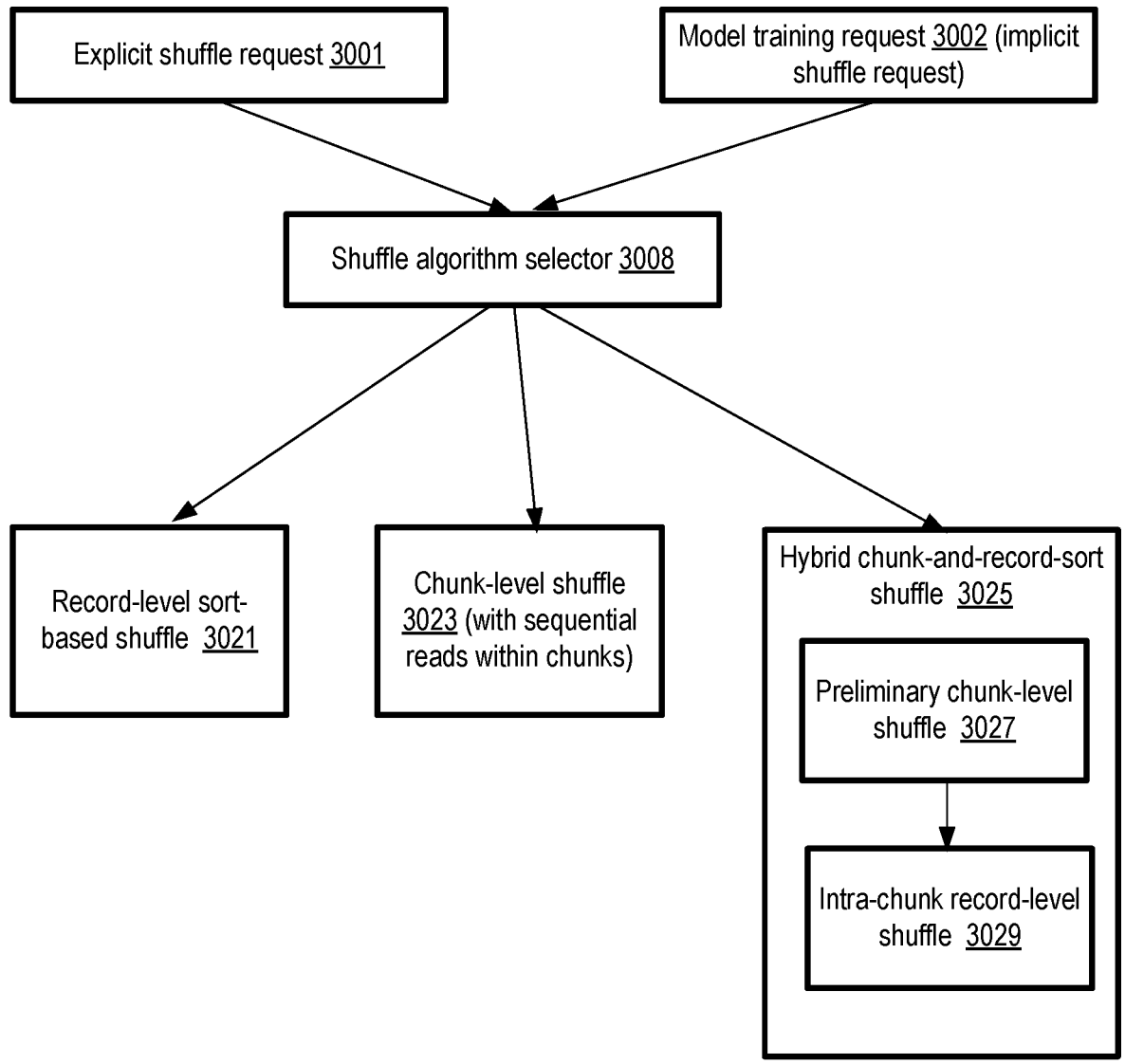
FIG. 30 illustrates examples of alternative shuffle algorithms which may be employed on machine learning data sets, according to at least some embodiments.

As mentioned above, in at least some embodiments a machine learning service may implement numerous shuffle algorithms. FIG. 30 illustrates examples of alternative shuffle algorithms which may be employed on machine learning data sets, according to at least some embodiments. As shown, either an explicit shuffle request 3001 or a model training request 3002 (which may be considered an implicit shuffle request) may trigger the selection of a particular shuffle algorithm from the suite of supported shuffle algorithms in the depicted embodiment. Examples of the factors which may be taken into account when selecting the algorithm are provided in FIG. 31. In the depicted embodiment, a shuffle algorithm selector may choose to employ a sort-based record-level shuffle algorithm 3021, a chunk-level shuffle algorithm 3023 which involves reading the records within any given chunk sequentially, or a hybrid algorithm 3025 which incorporates aspects of both the basic chunk-level shuffle algorithm and the sort-based record-level shuffle algorithm.

The chunk-level shuffle algorithm 3023 represents one example of the kinds of chunk-level filtering operations discussed earlier in the context of FIG. 18-FIG. 25. In a first stage 3027 of the hybrid algorithm 3025, the data set may be subdivided into chunks of a selected size, e.g., such that a given chunk can fit into the memory available at a particular execution platform of the machine learning service, and the chunks may be shuffled randomly with respect to one another (e.g., without using sorting). The contents of a particular chunk (or portions of different chunks which collectively make up the amount of data that can be fit into a single chunk) may be read into the memory of a given execution platform, together with metadata such as the names of the files or tables to which the records belong and the offsets or keys of the records. In a second stage 3029 of the hybrid algorithm, operations similar to those illustrated above with respect to FIG. 28 and FIG. 29 may be performed on the records of a particular chunk—e.g., unique representative values may be generated for the records of each chunk, the values may be sorted, and the records of the chunk may be reorganized or rearranged based on the results of the sort. In some embodiments, the record-level shuffle algorithm of the second stage may not necessarily involve sorting the representative values. For example, the Fisher-Yates or Knuth shuffle algorithm may be employed in some implementations.

Figure 31:
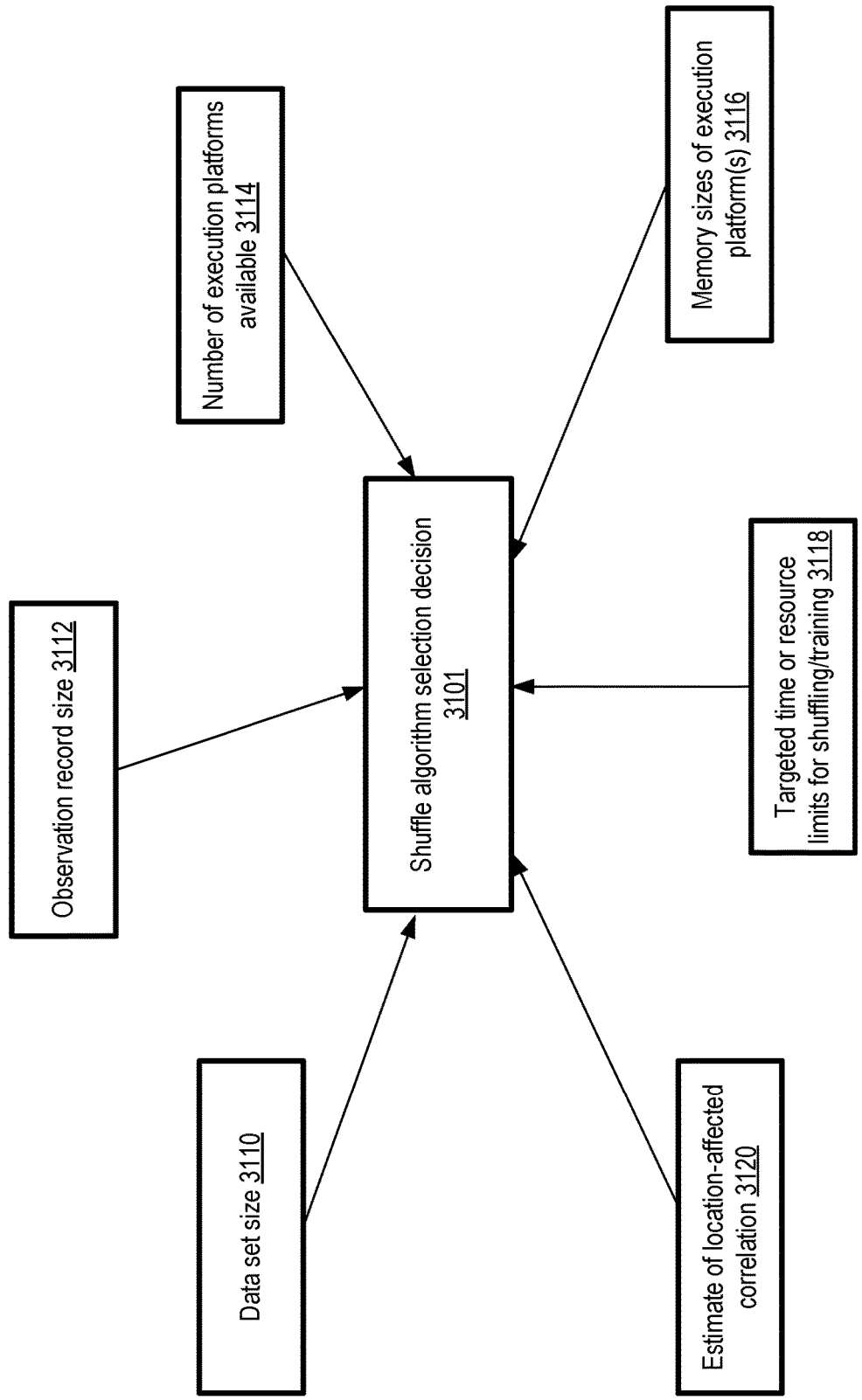
FIG. 31 illustrates examples of factors which may be taken into consideration to select a shuffle algorithm, according to at least some embodiments.

FIG. 31 illustrates examples of factors which may be taken into consideration to select a shuffle algorithm, according to at least some embodiments. As shown, the factors influencing the shuffle algorithm selection decision 3101 may include, among others, the data set size 3110, the sizes of the observation records 3112, the number of execution platforms available 3114 (e.g., the number of servers in the appropriate server pools 185 of the machine learning service, shown in FIG. 1, which can be deployed for shuffling the data set), the memory sizes 3116 of the execution platforms, performance-related requirements such as the targeted time limits or resource usage limits 3118 of the shuffling operation or the model training effort, and/or an estimate of the extent 3120 to which the data within individual storage objects of the input data set is correlated. With respect to several of the factors shown in FIG. 31, a preliminary analysis of the data set may be performed in some embodiments, e.g., to obtain an estimate of the average record size or the total data set size, or to ascertain whether spatial locality of the records within the original data set corresponds to correlated attribute values. In at least one embodiment, entries within the machine learning service's knowledge base may be examined to determine the appropriate shuffling algorithm and/or to select the particular sort algorithm to be employed (if the selected shuffle algorithm involves sort operations). Consider an example scenario in which each the pre-shuffle data set comprises several gigabytes of data, and each execution platform's memory can store up to eight megabytes of data. In such a scenario, a chunk-level shuffle algorithm (e.g., with a chunk size no greater than eight megabytes) may be chosen, e.g., under the implicit assumption that the total number of chunks is large enough to compensate for any local correlations within eight megabyte (or smaller) chunks. For a smaller data set, sort-based record-level shuffling or a hybrid algorithm may be chosen.

As a result of the use of the seed value during the generation of the pseudo-random values in the sort-based record-level shuffle algorithm, entirely different shuffle results may be produced from the same data set simply by changing the seed value in various embodiments, with the additional property that the shuffle order would remain consistent for a given seed value. For some machine learning algorithms, reshuffling the same data may be appropriate for respective training epochs—e.g., a given training set may be used to perform one round of training, reshuffled, and then used to perform additional round of training, with the process being repeated until the model being trained reaches a desired quality.

Figure 32:
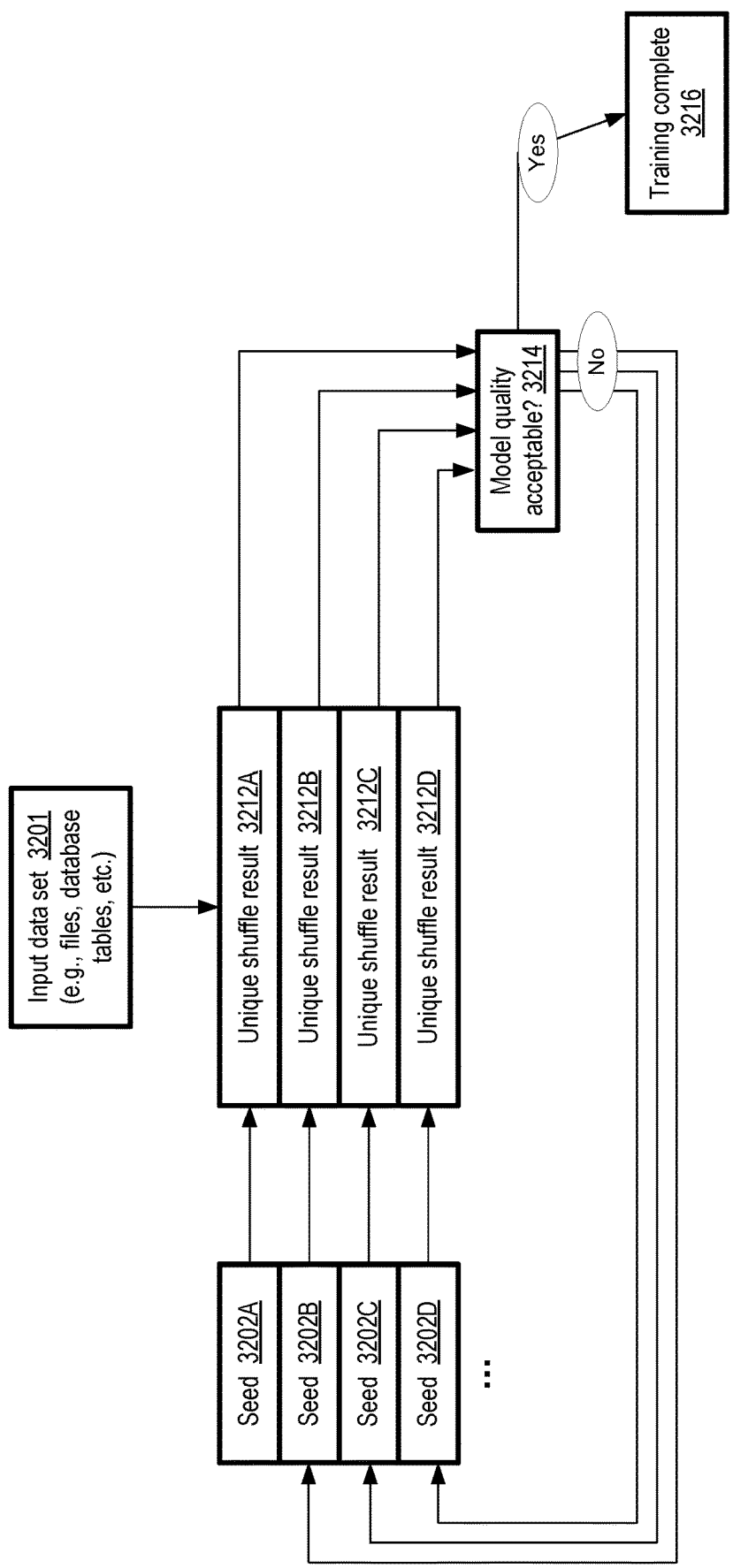
FIG. 32 illustrates an example of the use of distinct random seeds to reshuffle a given data set using record sorting, according to at least some embodiments.

FIG. 32 illustrates an example of the use of distinct random seeds to reshuffle a given data set using record sorting, according to at least some embodiments. In the depicted embodiment, an input data set 3201 (which may comprise records stored in files, databases etc.) is shuffled initially using a particular seed value 3202A as a token contributor, producing a first unique shuffle result 3212A. A model is trained using the first unique shuffle result 3212A, and the quality of the model is evaluated (e.g., using a test data set which differs from the input data set 3202A). Any of a variety of model quality metrics may be used in various embodiments, based on the nature of the model being trained, such as the accuracy of the predictions, the rate at which a loss function is changing, etc. If the model quality is acceptable (as detected in operations corresponding to element 3214), the training may be considered completed (element 3216). Otherwise, a second seed value 3202B may be used to reshuffle the data, producing a second unique shuffle result 3212B, and the second shuffle result may be used to perform an additional round of training. The procedure of reshuffling with different seeds may be repeated, (e.g., using seeds 3202C, 3202D etc., resulting in unique shuffle results 3212C, 3212D, etc.) until either the model quality reaches an acceptable level or the available training resources are exhausted. In some implementations, the original input data set may be reshuffled with each new seed value 3202, while in other embodiments the output produced by the most recent shuffle may be reshuffled using the new seed (e.g., shuffle output 3212B may be produced by applying the sort-based algorithm to shuffle output 3212A). The approach shown in FIG. 32 may be especially useful in scenarios in which the input data set is relatively small, so that one training pass through the input data set may not be sufficient to achieve the desired level of model quality. The seed values 3202 that are used for training a given model may be saved in some embodiments, e.g., in an artifact repository of the machine learning service, in case they are needed later for deterministically reproducing the identical shuffle results (e.g., for debugging or other purposes).

Figure 33:
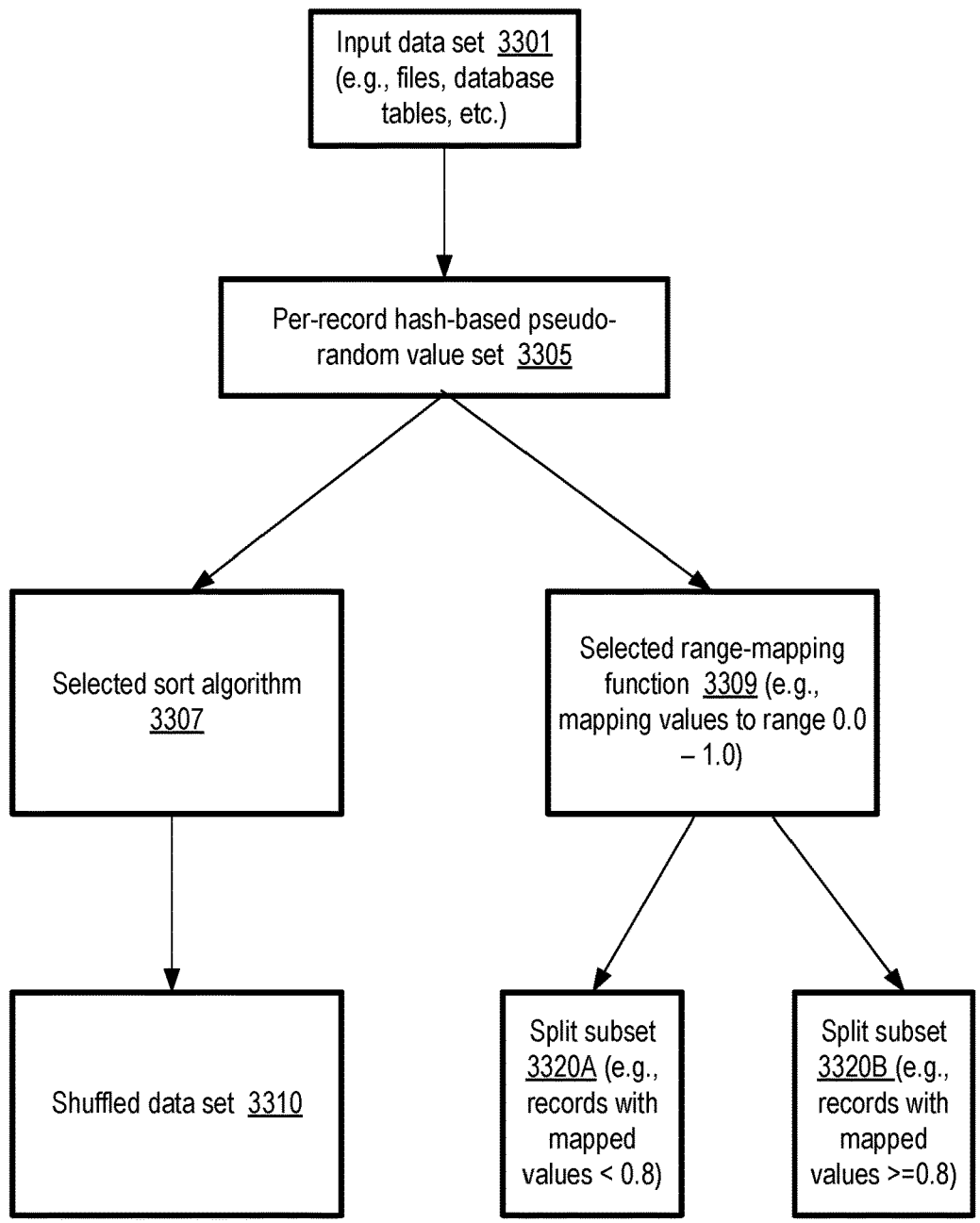
FIG. 33 illustrates an example of a reuse of pseudo-random values generated for observation records for shuffling and splitting a data set, according to at least some embodiments.

The set of pseudo-random values generated during the sort-based record-level shuffle algorithm in various embodiments may be usable for more than one type of data filtering operation. FIG. 33 illustrates an example of a reuse of pseudo-random values generated for observation records for shuffling and splitting a data set, according to at least some embodiments. As shown, hash-based pseudo-random values set 3305 may be generated corresponding to the observation records of input data set 3301, e.g., by concatenating token contributor elements such as ordinal numbers of the files of the data set, the offsets of the records within the files and a seed value as discussed above. In some embodiments the pseudo-random value set 3305 may be saved, e.g., as an artifact associated with the data set. The pseudo-random values may be sorted using a selected sort algorithm 3307 to produce a shuffled data set 3310. In addition to or instead of shuffling the data set using the sorted pseudo-random values, a selected range-mapping function 3309 may be applied to the pseudo-random values to obtain values in a selected range (e.g., real numbers between 0 and 1, or integers between 0 and 100). These mapped values may then be used to identify split subsets of the input data—e.g., in an 80-20 split, those records which are mapped to values less than 0.8 in the range 0 to 1 may be designated as members of an 80% subset 3320A, and the remaining records with values greater than or equal to 0.8 may be designated as members of a 20% subset 3320B. Alternatively, in one embodiment, the sorted pseudo-random values produced by algorithm 3307 may themselves be used to split the data set—e.g., if the pseudo-random values are sorted from low to high, the lowest 80% may be designated as members of an 80% split subset and the remainder may be designated as members of a 20% split subset. For example, the 80% subset may be used to train a model while the 20% subset may be used to test/evaluate the model. In some embodiments, at least some of the token contributor components may be obtained or generated in advance of receiving a shuffle request, a split request or a model training request—e.g., after an indication of a data set is provided to the machine learning service, the data set may be parsed, the offsets may be computed and a set of pseudo-random values may be generated using selected hash functions. The pseudo-random values may later be used or re-used for various splits, shuffles, and the like as needed. In some embodiments the value set 3305 may comprise non-numeric values—e.g., any data type whose instances can be ordered relative to one another may be used.

Figure 34:
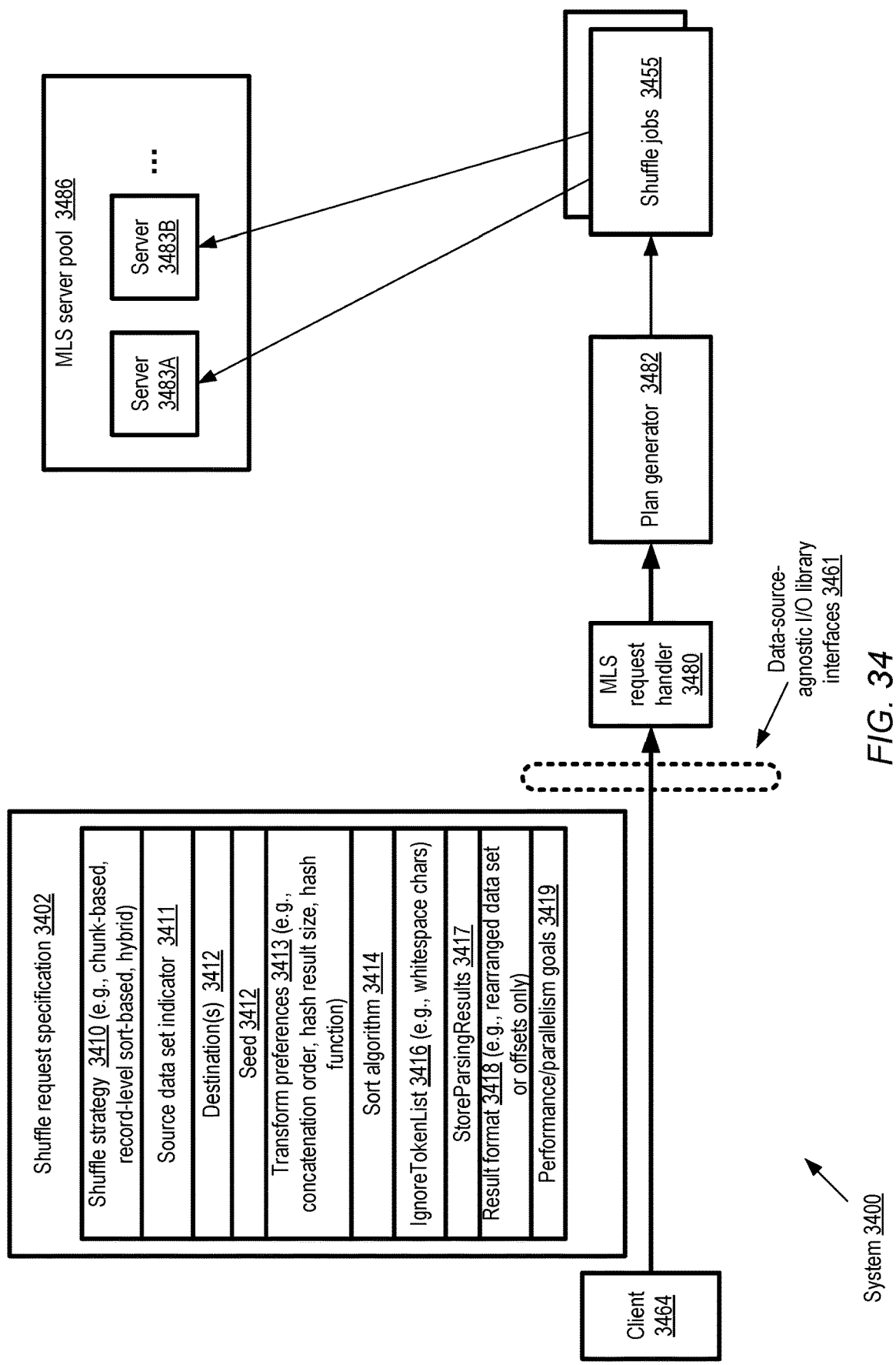
FIG. 34 illustrates example components of a shuffle request which may be submitted to a machine learning service and the corresponding actions taken at the service, according to at least some embodiments.

As mentioned earlier, in some embodiments clients may submit shuffle requests to a machine learning service, while in other embodiments the machine learning service may deduce that a data set is to be shuffled based on the kind of machine learning task for which the data set is to be used—for example, a request to train a model of a particular type, or a request to run a particular optimization algorithm, may trigger the execution of the sort-based shuffle algorithm. FIG. 34 illustrates example components of a shuffle request which may be submitted to a machine learning service and the corresponding actions taken at the service, according to at least some embodiments. In system 3400 of FIG. 34, a client 3464 of the machine learning service (MLS) may submit a shuffle request specification 3402 via a data-source-agnostic programmatic interface 3461 of an MLS I/O library. In some implementations, the shuffle request may be part of a cross-validation request, or part of a request to perform a specified number of training-and-evaluation iterations. In at least one embodiment, the shuffle request may represent a variant of the type of observation record extraction request 2401 shown in FIG. 24.

The shuffle request specification 3402 may indicate the particular shuffle strategy 3410 to be applied to a data set corresponding to a source data set indicator 3411. In the depicted embodiment, one of a set of at least three shuffle strategies may be selected by the client 3464: a chunk-based strategy of the kind discussed earlier in the context of FIG. 18-FIG. 25, a sort-based record-level strategy involving the use of unique concatenated tokens and hash functions introduced in the discussion of FIG. 27 onwards, or a hybrid chunk-and-record-based strategy. In some embodiments, a different combination of shuffle strategies may be supported than that shown in FIG. 34: e.g., chunk-level strategies may not be supported. In at least one embodiment, a knowledge base of the machine learning service may include entries which indicate the extent to which the different shuffle strategies have been successful with respect to various data set characteristics (e.g., how accurate prediction models trained using data sets obtained with the respective strategies have been for various types/sizes of data sets, etc.) in the past. The knowledge base entries may be used to recommend alternate shuffle strategies to clients in some embodiments. For example, in response to receiving a shuffle request for strategy S1 for a particular data set DS1, the machine learning service may transmit a recommendation (generated using the knowledge base) to the client indicating that a different strategy S2 is likely to work better for data sets similar to DS1. In some embodiments as discussed above, a preliminary analysis of at least a portion of the data set, or an examination of summary statistics regarding the data set, may be performed to select the shuffle strategy. Destinations field 3412 may indicate where the results of the shuffle procedure are to be stored or transmitted: for example, a destination file name or a destination machine learning data source name (i.e., e.g., a data source which may then be used as an input source to train or test models).

One or more client-specified seed values 3413 that may be used for generating the concatenated tokens discussed above may be included in the shuffle request specification 3402 in some embodiments, although such seed values may not have to be provided by the client in at least one embodiment. If sort-based record-level shuffling is selected as the shuffle strategy, a set of transform preferences 3414 may be included in the request specification 3402 in some embodiments. The transform preferences may include, for example, desired properties of hash functions to be used in the shuffle algorithm such as whether 32-bit, 64-bit or 128-bit integers should be produced by the hash function, the name of the hashing algorithm, the order in which token-contributor components should be combined/concatenated to form a token, and so on. In one embodiment, a client may indicate a preferred sort algorithm 3415 (e.g., single-threaded or parallelized versions of heap sort, quick sort, merge sort etc.), or a descriptor of desired properties of the sort algorithm. In some embodiments in which the data set is stored in files, a list of tokens (such as white space tokens or specified non-alphanumeric tokens) which are to be ignored when computing offsets of the observation records may be indicated via an IgnoreTokenList element 3416 of the shuffle request. By indicating tokens which are to be ignored for offset calculations, the repeatability of the algorithm may be improved—e.g., an inadvertent or deliberate introduction of a white space into a file would not be able to affect the offsets of the observation records used for the shuffle calculations.

The StoreParsingResults element 3417 may be used in the depicted embodiment by the client to indicate that the offsets of the observation records for file-based data are to be saved, so that for example the parsing overhead can be reduced in subsequent analyses involving the same data set. In some embodiments and for some types of machine learning applications, instead of receiving the rearranged observation records corresponding to a shuffle, a client may want to obtain the starting offsets or addresses of the observation records in the order in which the records appear after the shuffle. The manner in which the results are to be provided may be indicated in result format element 3418 in the depicted embodiment—e.g., whether observation record addresses should be provided in the shuffle results, or whether the rearranged observation records themselves should be provided. The client's performance and/or parallelism goals 3419 for the requested shuffle may be included in specification 3402 in some embodiments, including for example a desired turnaround time for completing the shuffle, a minimum or maximum limit on the number of machine learning servers to be deployed, and so on. Other parameters may be included in shuffle request specifications 3402 in some embodiments, and some of the parameters shown in FIG. 34 may not be used in other embodiments.

A request handler component 3480 of the MLS may pass on the request specification 3402 to a plan generator 3482 or some other control plane component of the machine learning service in the depicted embodiment. If the request does not include a seed value, in various embodiments the request handler and/or the plan generator may select a seed, e.g., based on the identity of the client, a timestamp associated with the data set, or on some other preferably immutable property of the data set. The plan generator 3482 may generate respective jobs 3455 for obtaining the shuffle results and assign the jobs to one or more MLS servers such as servers 3482 or 3483 selected from MLS server pool 3486.

Figure 35:
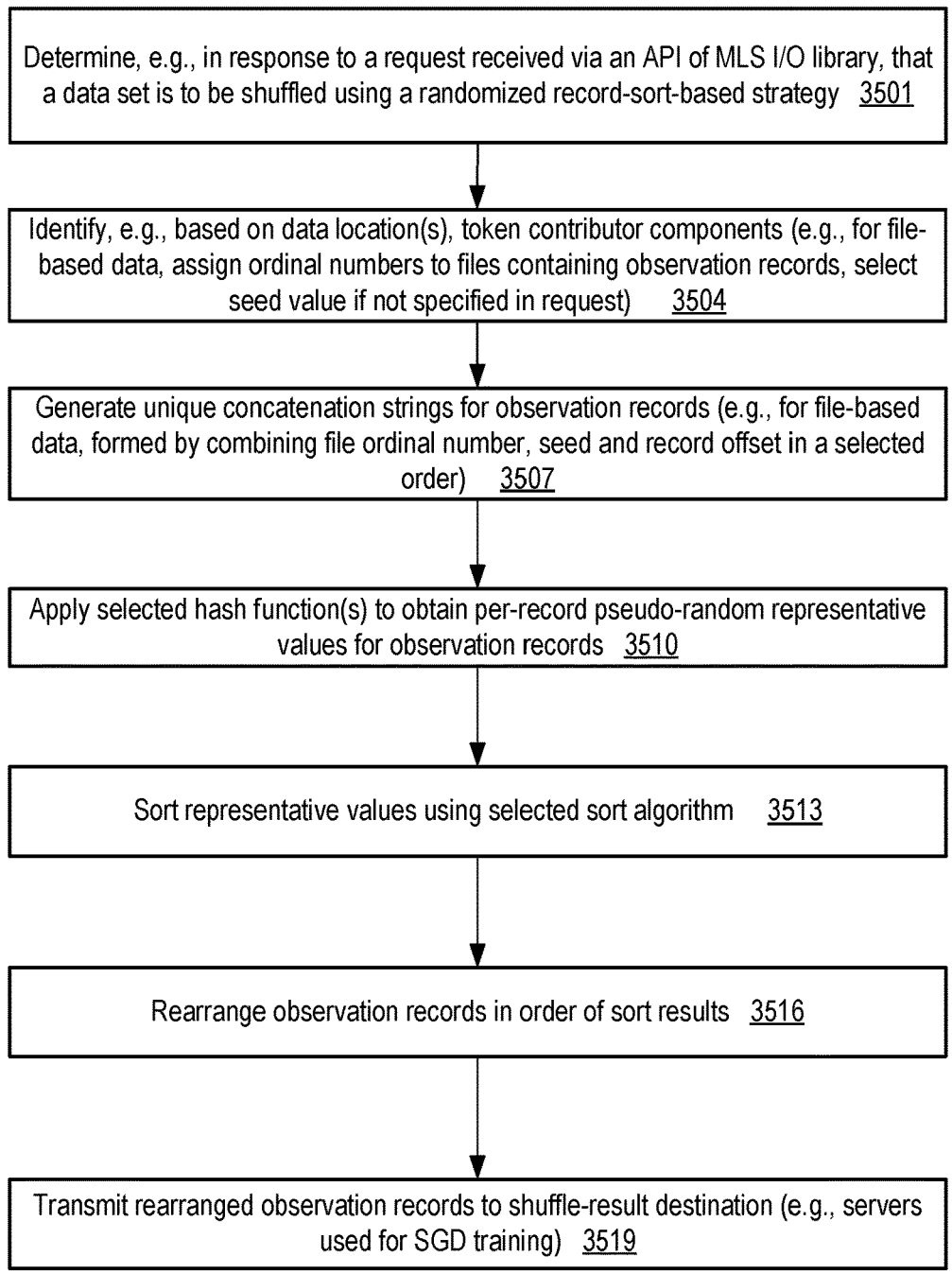
FIG. 35 is a flow diagram illustrating aspects of operations that may be performed to shuffle a data set using a sort-based record-level shuffle strategy, according to at least some embodiments.

FIG. 35 is a flow diagram illustrating aspects of operations that may be performed to shuffle a data set using a sort-based record-level shuffle strategy, according to at least some embodiments. As shown in element 3501, a determination may be made, e.g., at a control-plane component of a machine learning service or a provider network, that a particular data set is to be shuffled using the sort-based record-level shuffle strategy. In some cases, an explicit shuffle request formatted according to an I/O library of the service may be received; in other cases, the determination that a shuffle is to be performed may be caused by a request for training a particular type of model (e.g., a model involving stochastic gradient descent or multilayer perceptron algorithms) or a request for a particular type of optimization operation. In those cases in which an explicit shuffle request is received, the request may indicate, among other parameters, the data set locations (which may comprise one or more storage objects such as files or tables, or a network-accessible stream) and/or a seed value. Other properties of the shuffle operation or the data set may also be included in the request in some embodiments, using some of the request specification elements shown in FIG. 34. Based for example on the kind of storage object from which the observation records are obtained (e.g., files or database tables), and/or on contents of the request, the token contributor components for the shuffle algorithm may be identified (element 3504). For example, if the observation records are distributed among several files, ordinal numbers may be assigned to individual files based on the lexicographic order of the file names, while table names may be used for observation records stored in relational or non-relational database tables. Similarly, physical or logical offsets within the files may be used as token contributors for file-based observation records, while unique keys may be used as token contributors for table-based observation records. A seed value may be generated if one has not been provided in the shuffle request, e.g., based on the client's identity, a timestamp and/or some property of the data set or request.

A unique concatenation string may be generated for each observation record (element 3507) using the token contributor components. With respect to a file-based observation record, for example, an ordinal number or other container identifier assigned to the file in which the observation record is located, the byte-level physical offset or logical record-level offset of the observation record within the file, and the seed may be combined in a particular order to form the token. The components which contribute to the token may be combined in different orders in various embodiments. In one embodiment, the combination order may be indicated in a shuffle request. Respective pseudo-random representative values (which may be either numeric or non-numeric) may be generated from the concatenation strings (element 3510), e.g., by applying selected hash functions. The pseudo-random values for the observation records may be sorted using a selected sort algorithm (element 3513), and the observation records may be transmitted to and/or stored at a shuffle destination in an order corresponding to the results of the sort of the pseudo-random values (element 3516).

In at least some embodiments, some of the intermediate values produced and used during the shuffle algorithm—e.g., the offsets or unique keys of the records, the concatenated tokens, the seed, and/or the pseudo-random values—may be stored, e.g., in an artifact repository of the machine learning service so that they may be re-used as and when needed. For example, the offsets or the pseudo-random values may be used not just for shuffling the data, but also for splitting the data in some embodiments as discussed above. In various embodiments aspects of the sort-based shuffle algorithm may be combined with chunk-based algorithms, producing hybrid algorithms in which for example an initial pass of shuffling involves determining a chunk size and logically subdividing the data set into chunks, assigning random sequence numbers to the chunks to perform a chunk-level shuffle, and then using the sort-based record-level approach to rearrange records within individual chunks.

It is noted that in various embodiments, operations other than those illustrated in the flow diagrams of FIGS. 9a, 9b, 10a, 10b, 17, 25 and 35 may be used to implement at least some of the techniques of a machine learning service described above. Some of the operations shown may not be implemented in some embodiments, may be implemented in a different order, or in parallel rather than sequentially.

Use Cases

The techniques described above, of providing a network-accessible, scalable machine learning service that is geared towards users with a wide range of expertise levels in machine learning tools and methodologies may be beneficial for a wide variety of applications. Almost every business organization or government entity is capable of collecting data on various aspects its operations today, and the discovery of meaningful statistical and/or causal relationships between different components of the collected data and the organization's objectives may be facilitated by such a service. Users of the MLS may not have to concern themselves with the details of provisioning the specific resources needed for various tasks of machine learning workflows, such as data cleansing, input filtering, transformations of cleansed data into a format that can be fed into models, or model execution. Best practices developed over years of experience with different data cleansing approaches, transformation types, parameter settings for transformations as well as models may be incorporated into the programmatic interfaces (such as easy-to-learn and easy-to-use APIs) of the MLS, e.g., in the form of default settings that users need not even specify. Users of the MLS may submit requests for various machine learning tasks or operations, some of which may depend on the completion of other tasks, without having to manually manage the scheduling or monitor the progress of the tasks (some of which may take hours or days, depending on the nature of the task or the size of the data set involved).

A logically centralized repository of machine learning objects corresponding to numerous types of entities (such as models, data sources, or recipes) may enable multiple users or collaborators to share and re-use feature-processing recipes on a variety of data sets. Expert users or model developers may add to the core functionality of the MLS by registering third-party or custom libraries and functions. The MLS may support isolated execution of certain types of operations for which enhanced security is required. The MLS may be used for, and may incorporate techniques optimized for, a variety of problem domains covering both supervised and unsupervised learning, such as, fraud detection, financial asset price predictions, insurance analysis, weather prediction, geophysical analysis, image/video processing, audio processing, natural language processing, medicine and bioinformatics and so on.

Illustrative Computer System

Figure 36:
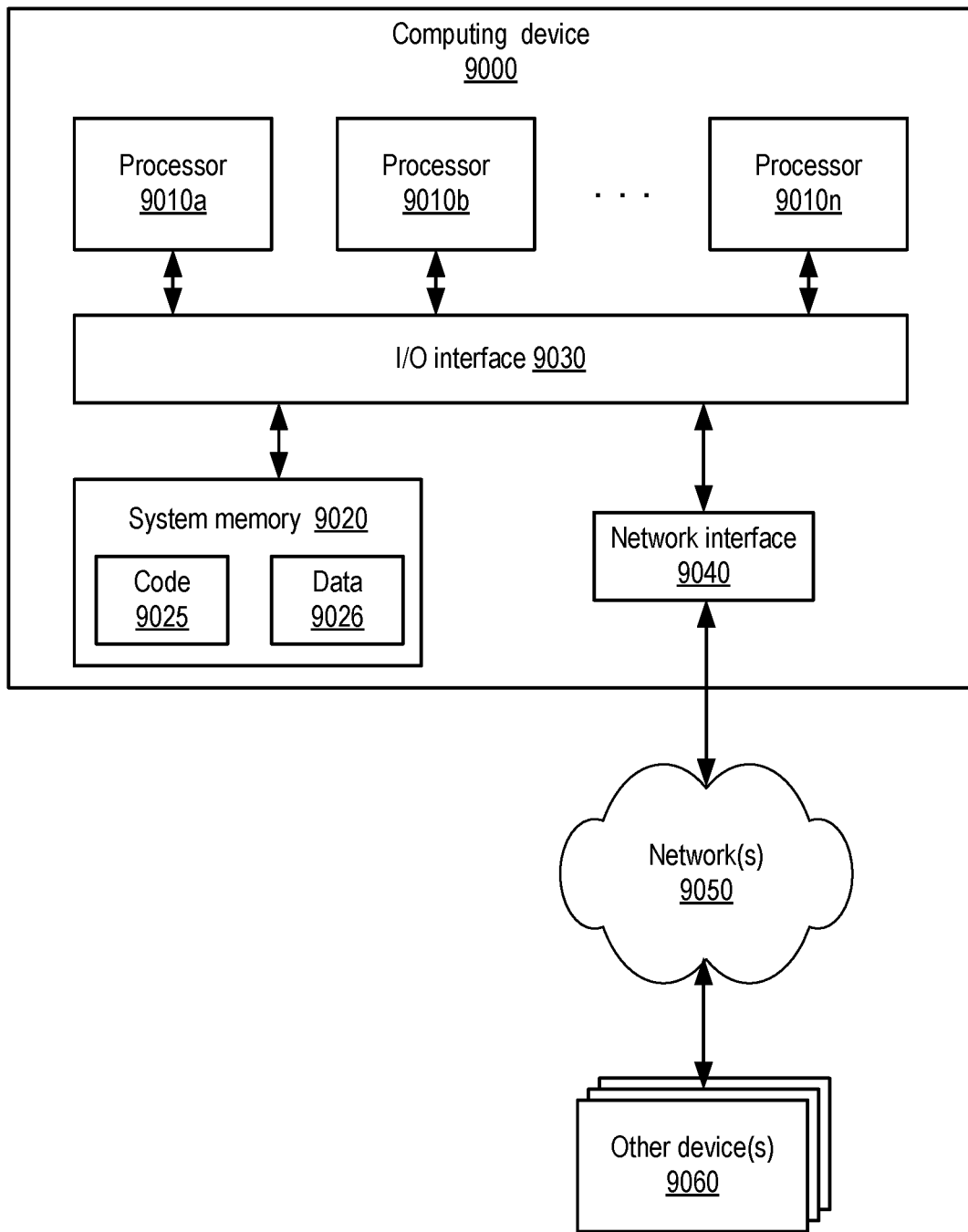
FIG. 36 is a block diagram illustrating an example computing device that may be used in at least some embodiments.

In at least some embodiments, a server that implements one or more of the components of a machine learning service (including control-plane components such as API request handlers, input record handlers, recipe validators and recipe run-time managers, plan generators, job schedulers, artifact repositories, and the like, as well as data plane components such as MLS servers or execution platforms) may include a general-purpose computer system that includes or is configured to access one or more computer-accessible media. FIG. 36 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 35, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 35 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 35 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a machine learning service of a provider network, wherein the one or more computing devices are configured to:
receive a shuffle request specification specifying a shuffle operation to be performed on a first data set comprising a plurality of observation records contained in a plurality of files, wherein the shuffle request specification specifies a shuffle algorithm for the shuffle operation selected from a plurality of shuffle algorithms supported by the machine learning service, including a chunk-level shuffle algorithm and a record-level shuffle algorithm;
determine, according to the shuffle algorithm specified in the shuffle request specification, that a record-level shuffle operation is to be performed on the first data set comprising the plurality of files collectively containing the plurality of observation records;
assign, as part of the record shuffling operation, respective ordinal numbers that are unique to individual ones of the plurality of files;
generate, corresponding to individual observation records of the plurality of observation records, respective pseudo-random values, wherein a particular pseudo-random value is generated from a unique representative value of a particular observation record that includes (a) the ordinal number assigned to a respective particular file of the plurality of files, (b) an offset of the particular observation record within the respective particular file, and (c) a seed associated with the first data set;
rearrange at least a subset of the plurality of observation records based at least in part on a result of a sort operation performed on the respective pseudo-random values; and
transmit, to a destination associated with the record-level shuffle operation, at least the rearranged subset of the plurality of observation records.

2. The system as recited in claim 1, wherein to generate the pseudo-random value, the one or more computing devices are configured to:
apply one or more hash functions to a string obtained by concatenating the ordinal number, the offset and the seed.

3. The system as recited in claim 1, wherein the one or more computing devices are configured to:
perform a preliminary analysis corresponding to at least a portion of a second data set to select a particular shuffling algorithm to be employed for the second data set, wherein the particular shuffling algorithm is selected from a set of algorithms comprising the record-level shuffle algorithm, the chunk-level shuffle algorithm, and a hybrid chunk-and-record level shuffle algorithm supported by the machine learning service.

4. The system as recited in claim 3, wherein the preliminary analysis includes one or more of: (a) an estimation of a size of the second data set, (b) an estimation of an average size of an observation record of the second data set, (c) a determination of a number of execution platforms available for shuffling the data set, (d) a determination of a memory capacity of an execution platform available for shuffling the second data set, (e) an estimation of the location-based correlation of observation record attribute values of the second data set, or (f) an indication of a targeted time period within which the second data set is to be shuffled.

5. The system as recited in claim 1, wherein the one or more computing devices include a first execution platform of the machine learning service, a second execution platform of the machine learning service and a control-plane component of the machine learning service, wherein the control-plane component is configured to:
assign (a) a first task to shuffle observation records of at least a portion of the particular file to the first execution platform and (b) a second task to shuffle observation records of at least a portion of a different file of the plurality of files to the second execution platform.

6. A method, comprising:
performing, by one or more computing devices of a machine learning service:
receiving a shuffle request specification specifying a shuffle operation to be performed on a data set comprising a plurality of observation records collectively stored in one or more storage objects, wherein the shuffle request specification specifies a shuffle algorithm for the shuffle operation selected from a plurality of shuffle algorithms supported by the machine learning service, including a chunk-level shuffle algorithm and a record-level shuffle algorithm;
determining, according to the shuffle algorithm specified in the shuffle request specification, that the data set comprising the plurality of observation records is to be shuffled using the record-level shuffle algorithm;
generating, with respect to individual observation records of the plurality of observation records, respective representative values that are unique to individual ones of the observation records, wherein a particular representative value corresponding to a particular observation record of the plurality of observation records includes: (a) an identifier of a particular storage object within which the particular observation record is stored, (b) a key value corresponding to the particular observation record, wherein the key value corresponding to the particular observation record differs from respective key values of one or more other observation records stored in the particular storage object, and (c) a seed value associated with the data set;
sorting at least a subset of the respective representative values; and
providing, to a shuffle result destination, at least a subset of the plurality of observation records in an order based on a result of said sorting.

7. The method as recited in claim 6, wherein the one or more storage objects include a plurality of files located within one or more directories, and wherein the particular storage object is a particular file of the plurality of files, further comprising performing, by one or more computing devices:
generating, based at least in part on a lexicographic ordering of respective names of the plurality of files, the identifier of the particular file.

8. The method as recited in claim 6, wherein the key value corresponding to the particular observation record is based at least in part on an offset of the particular observation record within the particular storage object.

9. The method as recited in claim 6, wherein the one or more storage objects include a database table.

10. The method as recited in claim 6, wherein a size of the particular observation record differs from a size of another observation record of the plurality of observation records.

11. The method as recited in claim 6, wherein said generating the particular representative value comprises:
determining an order in which a plurality of token-contributor elements are to be concatenated, wherein the plurality of token-contributor elements include (a) the identifier of the storage object and (b) the key value;
concatenating the plurality of token-contributor elements; and
applying one or more hash functions to a result of said concatenating.

12. The method as recited in claim 11, wherein the one or more hash functions include one or more of: (a) a Murmur hash function (b) a Fowler-Noll-Vo (FNV) hash function (c) a Jenkins hash function, (d) a CityHash function, (e) a function based on a version of the Secure Hash Algorithm (SHA), or (f) an MD5 (Message Digest 5) function.

13. The method as recited in claim 6, further comprising performing, by one or more computing devices:
identifying the seed value based at least in part on one or more of (a) contents of the shuffle specification, (b) an identity of a client on whose behalf the data set is being shuffled, or (c) a timestamp.

14. The method as recited in claim 6, further comprising performing, by the one or more computing devices:
determining that a second data set comprising a second plurality of observation records is to be shuffled using the chunk-level shuffle algorithm;
selecting a chunk size with respect to the second data set;
identifying, based at least in part on the chunk size, a starting observation record and an ending observation record of a particular chunk of a plurality of chunks into which the observation records of the second data set are to be subdivided; and
providing, to a second shuffle result destination associated with the second data set, observation records of the particular chunk in an order in which the observation records appear in the particular chunk.

15. The method as recited in claim 6, further comprising performing, by the one or more computing devices:
determining that a second data set comprising a second plurality of observation records is to be shuffled using a hybrid chunk-and-record-level shuffle algorithm;
selecting a chunk size with respect to the second data set;
identifying, based at least in part on the chunk size, a starting observation record and an ending observation record of a particular chunk of a plurality of chunks into which the observation records of the second data set are to be subdivided;
generating respective representative values corresponding to at least a first subset of the observation records of the particular chunk, wherein a first representative value corresponding to a first observation record of the first subset is based at least in part on one or more of: (a) an identifier of a particular storage object within which the first observation record is stored or (b) a key value corresponding to the first observation record;

reordering the respective representative values corresponding to the first subset; and providing, to a second shuffle result destination associated with the second data set, observation records of the particular chunk in an order corresponding to a result of said reordering.

16. The method as recited in claim 15, wherein said reordering does not comprise sorting the respective representative values corresponding to the first subset.

17. A non-transitory computer-accessible storage medium storing program instructions that when executed on one or more processors implement at least a portion of a machine learning service and cause the machine learning service to:

determine, according a shuffle request specification received, that a data set comprising a plurality of observation records is to be shuffled using a record-level shuffling algorithm, wherein the shuffle request specification specifies a shuffle algorithm selected from a plurality of shuffle algorithms supported by a machine learning service, including a chunk-level shuffle algorithm and the record-level shuffle algorithm;

generate, with respect to individual observation records of the plurality of observation records, respective representative values that are unique to individual ones of the observation records, wherein a particular representative value corresponding to a particular observation record of the plurality of observation records includes: (a) an identifier of a particular storage object within which the particular observation record is stored, (b) a key value corresponding to the particular observation record, wherein the key value corresponding to the particular observation record differs from respective key values of one or more other observation records stored in the particular storage object, and (c) a seed value associated with the data set;

sort at least a subset of the respective representative values; and transmit, to a shuffle result destination, at least a subset of the plurality of observation records in an order based on a result of said sorting.

18. The non-transitory computer-accessible storage medium as recited in claim 17, wherein to generate the particular representative value, the instructions when executed on the one or more processors cause the machine learning service to:

apply one or more hash functions to an object formed by combining a plurality of token-contributor elements including (a) the identifier of the particular storage object and (b) the key value corresponding to the particular observation record.

19. The non-transitory computer-accessible storage medium as recited in claim 17, wherein the instructions when executed on the one or more processors cause the machine learning service to:

store, in a persistent repository, the respective representative values corresponding to the plurality of observation records; and in response to a determination that a subset of the data set is to be generated using a record-level split operation, identify a particular split subset into which the particular observation record is to be placed based at least in part on a value generated by mapping the particular representative value to a numeric value within a selected range.

20. The non-transitory computer-accessible storage medium as recited in claim 17, wherein the instructions when executed on the one or more processors cause the machine learning service to:

receive a request via a programmatic interface from a client of the machine learning service to train a machine learning model using the data set; and determine that the record-level shuffle algorithm is to be applied on the data set based at least in part on a training algorithm selected for the machine learning model, without receiving a request from the client to shuffle the data set.

21. The non-transitory computer-accessible storage medium as recited in claim 20, wherein the training algorithm comprises one or more of: (a) a stochastic gradient descent (SGD) algorithm, or (b) a multilayer perceptron (MLP) algorithm.

* * * * *